United States Patent
Klein

(10) Patent No.: US 11,131,090 B2
(45) Date of Patent: Sep. 28, 2021

(54) MODULAR ROLL-UP WALL SYSTEM

(71) Applicant: Joel Klein, Brooklyn, NY (US)

(72) Inventor: Joel Klein, Brooklyn, NY (US)

(73) Assignee: TUDELU LLC, Little Ferry, NJ (US)

( * ) Notice: Subject to any disclaimer, the term of this patent is extended or adjusted under 35 U.S.C. 154(b) by 322 days.

(21) Appl. No.: 15/964,001

(22) Filed: Apr. 26, 2018

(65) Prior Publication Data

US 2018/0313082 A1    Nov. 1, 2018

Related U.S. Application Data

(60) Provisional application No. 62/490,590, filed on Apr. 26, 2017, provisional application No. 62/491,036, filed on Apr. 27, 2017.

(51) Int. Cl.
  *E06B 9/40* (2006.01)
  *E04B 2/74* (2006.01)
  (Continued)

(52) U.S. Cl.
  CPC .............. *E04B 2/7409* (2013.01); *E06B 9/13* (2013.01); *E06B 9/171* (2013.01); *E06B 9/1703* (2013.01);
  (Continued)

(58) Field of Classification Search
  CPC ..... E06B 9/08; E06B 9/40; E06B 9/17; E06B 9/17007; E06B 9/171; E06B 9/42;
  (Continued)

(56) References Cited

U.S. PATENT DOCUMENTS

| 726,801 A | 4/1903 | Maxwell |
|---|---|---|
| D83,534 S | 12/1930 | Helsley |

(Continued)

FOREIGN PATENT DOCUMENTS

| AU | 2009212839 A1 | 3/2010 |
|---|---|---|
| EP | 0841442 B2 | 8/2000 |

(Continued)

OTHER PUBLICATIONS

Roller Shutter Tube Motors, available Apr. 26, 2016, accessed Apr. 9, 2020 from https://www.ellard.co.uk/roller-shutter-tube-motors/ (Year: 2016).*

(Continued)

*Primary Examiner* — Jerry E Redman
*Assistant Examiner* — Jeremy C Ramsey
(74) *Attorney, Agent, or Firm* — Law Office of Arthur M. Antonelli, PLLC

(57) ABSTRACT

A roll-up wall system including a frame having a longitudinal axis, a first roller disposed in the frame, a second roller disposed in the frame, and a tube disposed in the frame. A screen may be connected to the tube. The screen may be supported by the first roller and the second roller. Further, the screen may be movable between a first configuration and a second configuration. In the first configuration, the screen is rolled around the tube which is spaced a first distance from the first roller. In the second configuration, the screen forms a barrier adjacent the frame, and the tube is spaced a second distance from the first roller. The second distance may be less than the first distance. Also, the roll-up wall system may be an acoustic barrier which achieves a Sound Transmission Class rating ranging from approximately 31 STC to approximately 53 STC.

23 Claims, 41 Drawing Sheets

(51) Int. Cl.

| | | |
|---|---|---|
| *E06B 9/44* | (2006.01) | |
| *E06B 9/171* | (2006.01) | |
| *E06B 9/13* | (2006.01) | |
| *E06B 9/58* | (2006.01) | |
| *E06B 9/17* | (2006.01) | |
| *E06B 9/72* | (2006.01) | |
| *E06B 9/174* | (2006.01) | |
| *B32B 7/08* | (2019.01) | |
| *B32B 7/12* | (2006.01) | |
| *B32B 27/06* | (2006.01) | |
| *B32B 27/30* | (2006.01) | |
| *E04B 2/82* | (2006.01) | |

(52) U.S. Cl.
CPC .......... *E06B 9/174* (2013.01); *E06B 9/17007* (2013.01); *E06B 9/17046* (2013.01); *E06B 9/17076* (2013.01); *E06B 9/40* (2013.01); *E06B 9/44* (2013.01); *E06B 9/58* (2013.01); *E06B 9/72* (2013.01); *B32B 7/08* (2013.01); *B32B 7/12* (2013.01); *B32B 27/06* (2013.01); *B32B 27/304* (2013.01); *B32B 2250/03* (2013.01); *B32B 2250/40* (2013.01); *B32B 2307/102* (2013.01); *B32B 2307/4023* (2013.01); *B32B 2307/54* (2013.01); *B32B 2317/10* (2013.01); *B32B 2317/18* (2013.01); *B32B 2327/06* (2013.01); *B32B 2607/00* (2013.01); *E04B 2/827* (2013.01); *E06B 2009/1743* (2013.01); *E06B 2009/1746* (2013.01); *E06B 2009/405* (2013.01)

(58) Field of Classification Search
CPC ..... E06B 9/44; E06B 9/58; E06B 9/50; E06B 2009/405; E06B 9/72; E06B 9/174; E06B 9/1703; E06B 9/13; E06B 9/11; E06B 9/1705
See application file for complete search history.

(56) References Cited

U.S. PATENT DOCUMENTS

| | | | |
|---|---|---|---|
| 1,882,623 A * | 10/1932 | Kasper | E06B 9/50 |
| | | | 160/299 |
| 2,055,285 A | 9/1934 | Ford | |
| 2,280,358 A | 8/1939 | Tietig | |
| 2,247,634 A | 7/1941 | Houston | |
| 2,350,758 A | 6/1944 | Heuer | |
| 2,516,020 A | 7/1950 | Reed | |
| 2,831,222 A | 4/1958 | Anderson | |
| 3,292,685 A | 12/1966 | Clark | |
| D225,965 S | 1/1973 | Schmit | |
| 3,822,733 A | 7/1974 | Lindelow | |
| 3,900,063 A * | 8/1975 | Roller | E06B 9/17 |
| | | | 160/310 |
| D244,083 S | 4/1977 | Pfeiffer | |
| D250,391 S | 11/1978 | France | |
| 4,508,126 A | 4/1985 | Everard | |
| 4,519,434 A | 5/1985 | Forquer | |
| 4,720,647 A | 1/1988 | Plumer | |
| D297,111 S | 8/1988 | Thompson | |
| 5,220,721 A | 6/1993 | Thierry | |
| 5,323,831 A | 6/1994 | Manthei | |
| 5,374,791 A | 12/1994 | LeMarchand | |
| 5,429,558 A | 7/1995 | Lagarde | |
| 5,819,831 A * | 10/1998 | Schanz | E06B 9/174 |
| | | | 160/133 |
| D409,078 S | 5/1999 | Bolt | |
| 6,006,811 A | 12/1999 | Brutsaert | |
| D426,453 S | 6/2000 | Stearns et al. | |
| D431,770 S | 10/2000 | Willet | |
| D434,304 S | 11/2000 | Willet | |
| 6,145,571 A | 11/2000 | Snyder | |
| D439,137 S | 3/2001 | Ausillio | |
| D530,187 S | 10/2006 | Esbaugh | |
| D533,547 S | 12/2006 | Sergi | |
| D534,904 S | 1/2007 | Crawford | |
| D542,628 S | 5/2007 | Brassard | |
| D548,051 S | 8/2007 | Ruppert et al. | |
| D559,083 S | 1/2008 | Brassard | |
| D566,648 S | 4/2008 | Lee | |
| D571,188 S | 6/2008 | Brassard | |
| D575,220 S | 8/2008 | Pockalny | |
| D576,472 S | 9/2008 | Gaiardo | |
| D597,086 S | 7/2009 | Sergi | |
| D690,180 S | 9/2013 | Del Rossa | |
| D698,465 S | 1/2014 | Bill | |
| 9,044,090 B2 | 6/2015 | Drake et al. | |
| D733,531 S | 7/2015 | Tonthat et al. | |
| D764,070 S | 8/2016 | Lussier | |
| 9,428,955 B2 | 8/2016 | Fleischman | |
| 9,458,974 B2 | 10/2016 | Townsend, Jr. | |
| 9,803,421 B2 * | 10/2017 | Craney | E06B 9/13 |
| 2002/0020508 A1 | 2/2002 | Welfonder | |
| 2002/0020580 A1 | 2/2002 | Mukai et al. | |
| 2004/0016519 A1 | 1/2004 | Welfonder | |
| 2005/0087309 A1 | 4/2005 | Nien et al. | |
| 2006/0118356 A1 | 6/2006 | Beeson et al. | |
| 2007/0193697 A1 | 8/2007 | Horvath | |
| 2008/0016798 A1 | 1/2008 | Miller | |
| 2008/0035281 A1 | 2/2008 | Kirby | |
| 2009/0229767 A1 | 9/2009 | Mullet et al. | |
| 2011/0088317 A1 | 4/2011 | Goldberg | |
| 2011/0100570 A1 | 5/2011 | Licciardi Di Stefano | |
| 2011/0180219 A1 * | 7/2011 | Pereira | E06B 9/42 |
| | | | 160/89 |
| 2012/0097346 A1 | 4/2012 | Ng | |
| 2013/0048229 A1 | 2/2013 | Dwarka | |
| 2013/0048231 A1 | 2/2013 | Miller | |
| 2014/0041814 A1 | 2/2014 | Roberts | |
| 2014/0262084 A1 | 9/2014 | Fleischman | |
| 2015/0000849 A1 | 1/2015 | Barnes et al. | |
| 2016/0341443 A1 | 11/2016 | Ramos et al. | |
| 2017/0037616 A1 | 2/2017 | Fleischman et al. | |
| 2018/0163466 A1 * | 6/2018 | Hall | E06B 9/80 |

FOREIGN PATENT DOCUMENTS

| | | | |
|---|---|---|---|
| EP | 2343418 A1 | 7/2011 | |
| EP | 2392747 A2 | 12/2011 | |
| EP | 2489811 A1 | 8/2012 | |
| EP | 3000958 A1 | 3/2016 | |
| WO | WO 2014/145333 | 9/2014 | |
| WO | WO 2015/176047 | 11/2015 | |
| WO | WO 2017/139411 A1 | 8/2017 | |

OTHER PUBLICATIONS

Sound Transmission Class, available Feb. 10, 2016, accessed Apr. 9, 2020 from https://en.wikipedia.org/wiki/Sound_transmission_class (Year: 2016).*
International Search Report, PCT/US2015/031256, Jacob Fleischman and Joel Klein, pp. 2, dated Sep. 16, 2015.
Written Opinion of the International Searching Authority, PCT/US2015/031256, Jacob Fleischman and Joel Klein, pp. 8, dated Sep. 16, 2016.
International Search Report, PCT/US2014/030073, Jacob Fleischman, pp. 2, dated Aug. 11, 2014.
Written Opinion of the International Searching Authority, PCT/US2014/030073, Jacob Fleischman, pp. 5, dated Aug. 11, 2014.
"Model Reinforced Barrier B-10R" Sound Seal—Industrial Noise Control Products.
"Sound Absorption" Acoustical Surfaces, Inc.
Knee Brace Bracket, in U.S. Appl. No. 29/601,866.
Ford TTB Axle Pivot Bracket Replacement, in U.S. Appl. No. 29/601,866.
Custom architectural components, in U.S. Appl. No. 29/601,886.
Crossbar Hanger Bracket -6? Frame, in U.S. Appl. No. 29/601,886.

(56) References Cited

OTHER PUBLICATIONS

Crown Automotive 52040320 Front or Rear Main Eye Leaf Spring Hanger Bracket for 87-95 Jeep Wrangler YJ, in U.S. Appl. No. 29/601,886.
DCA Mercedes Axle Hanger Bracket Ride Height 250, in U.S. Appl. No. 29/601,886.
Hawaii State Safety Check License Plate Bracket Vertical Mount, in U.S. Appl. No. 29/601,887.
Biltwell Solution License Plate Bracket—Vertical—Black with Light Mount, U.S. Appl. No. 29/601,887.
Base Plate in Carbon Fibre Laminate, in U.S. Appl. No. 29/601,887.
International Search Report, PCT/US2018/029651, Joel Klein, pp. 2, dated Aug. 1, 2018.
Written Opinion of the International Searching Authority, PCT/US2018/029651, Joel Klein, pp. 6, dated Aug. 1, 2018.

\* cited by examiner

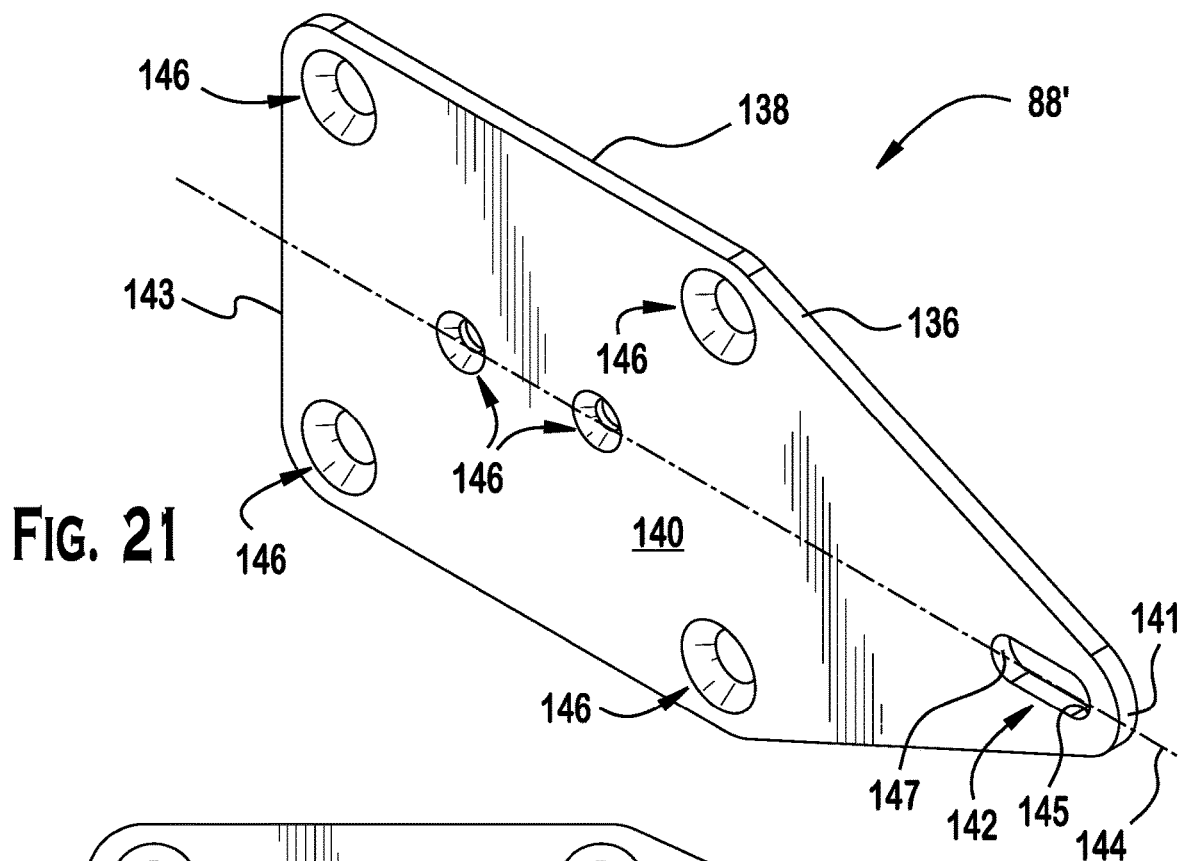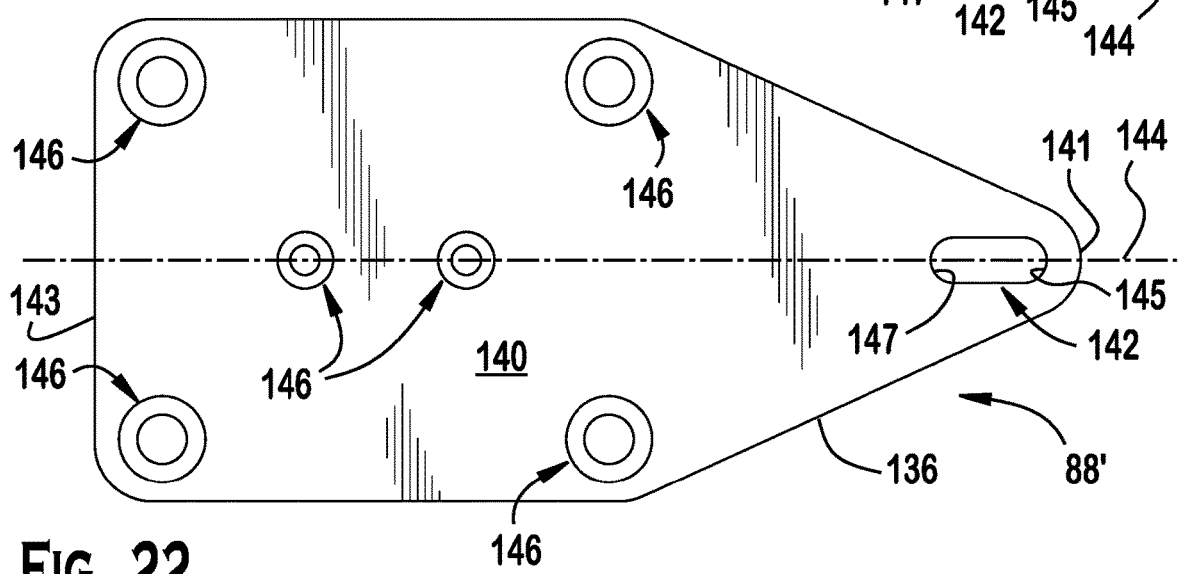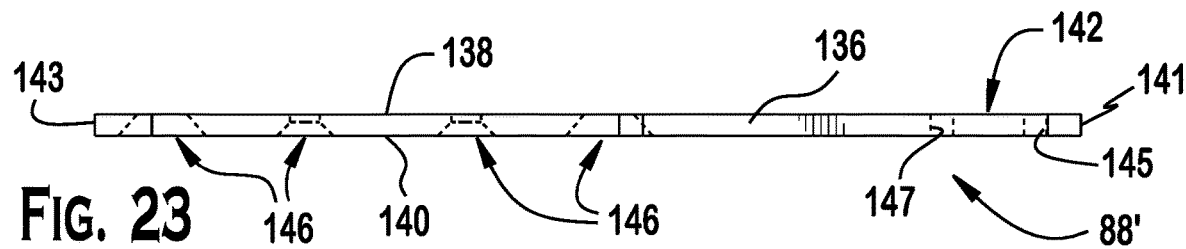

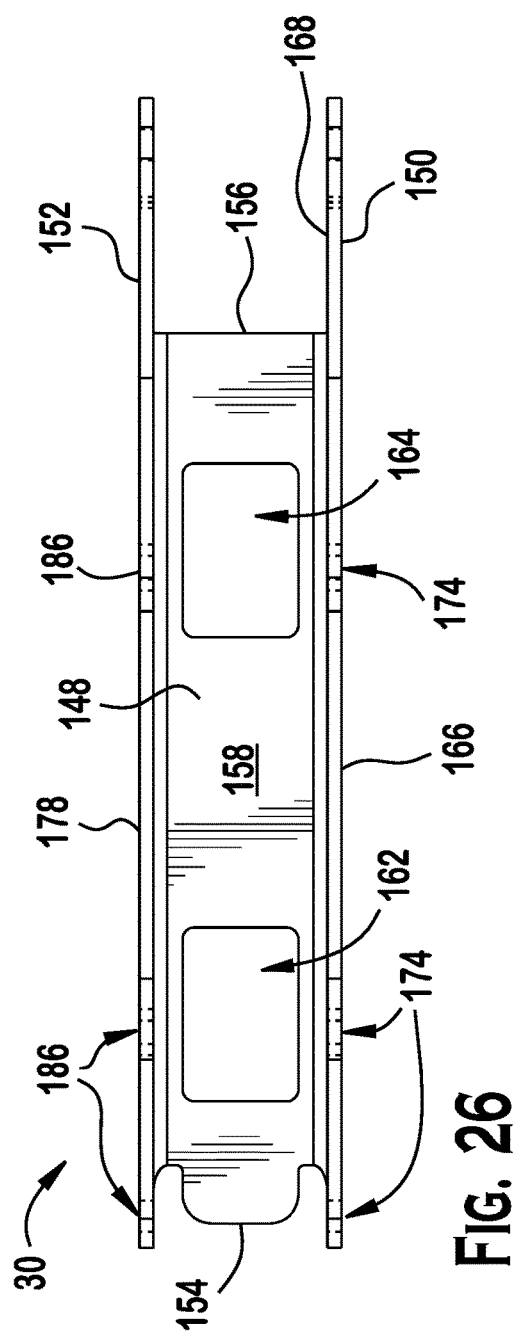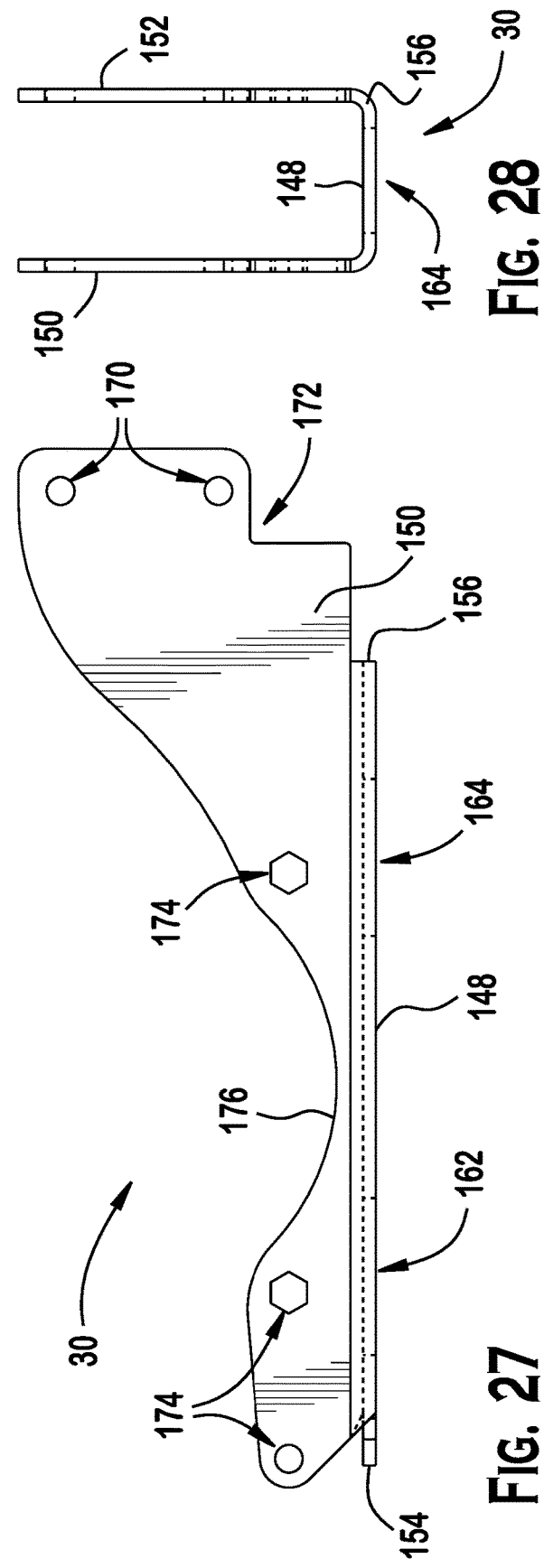

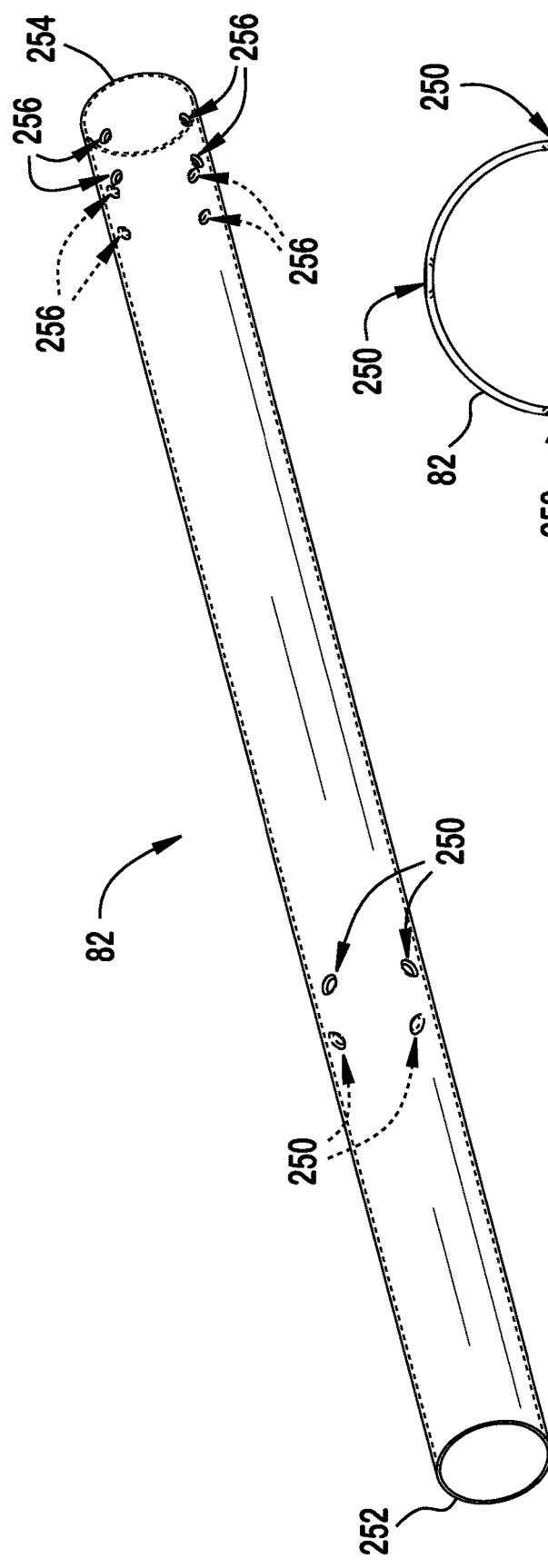
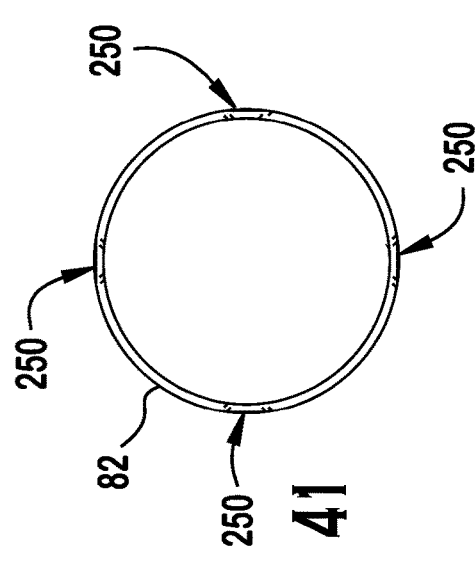
FIG. 41
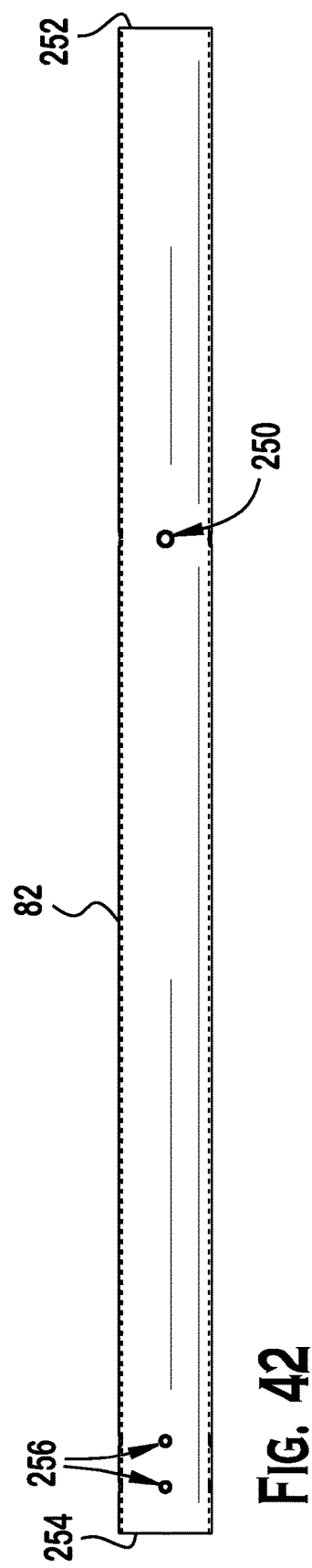
FIG. 40
FIG. 42

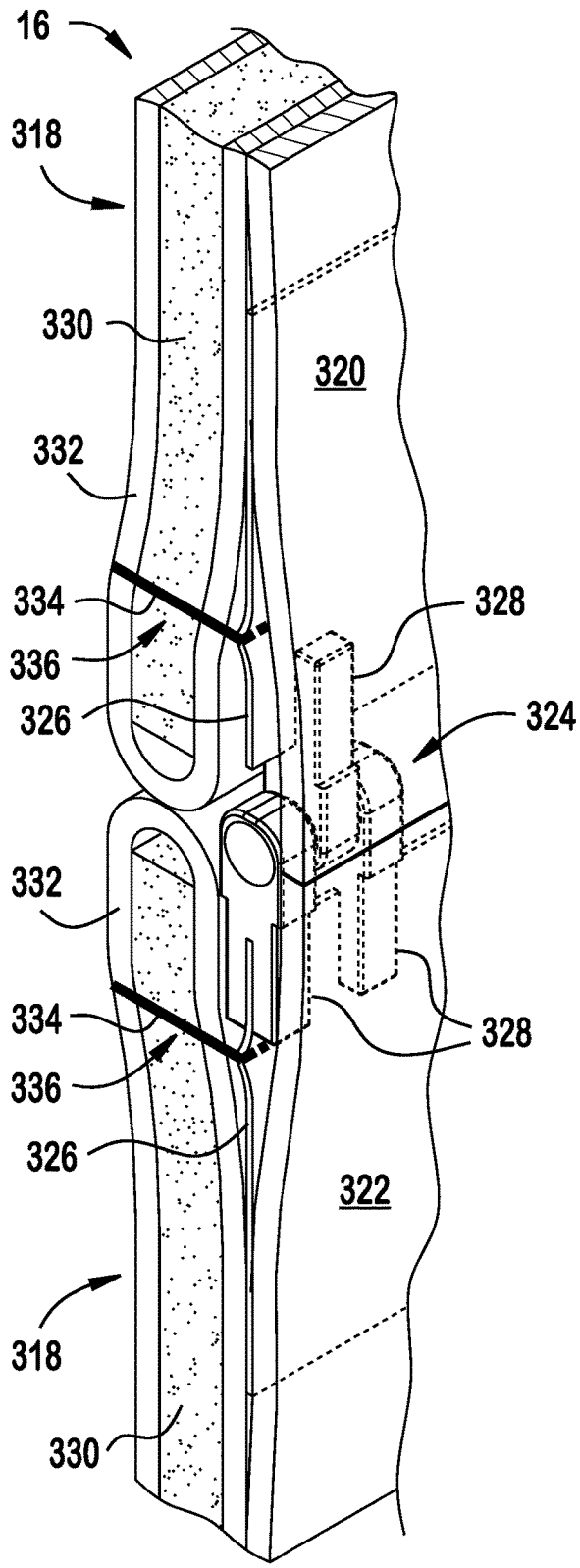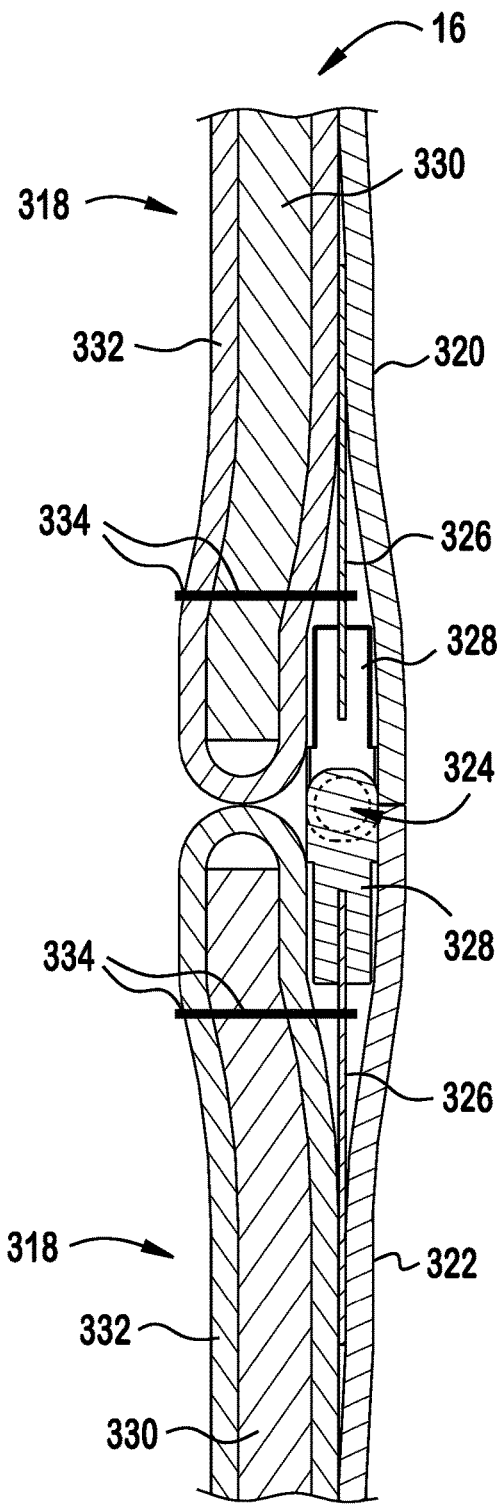
FIG. 54
FIG. 55

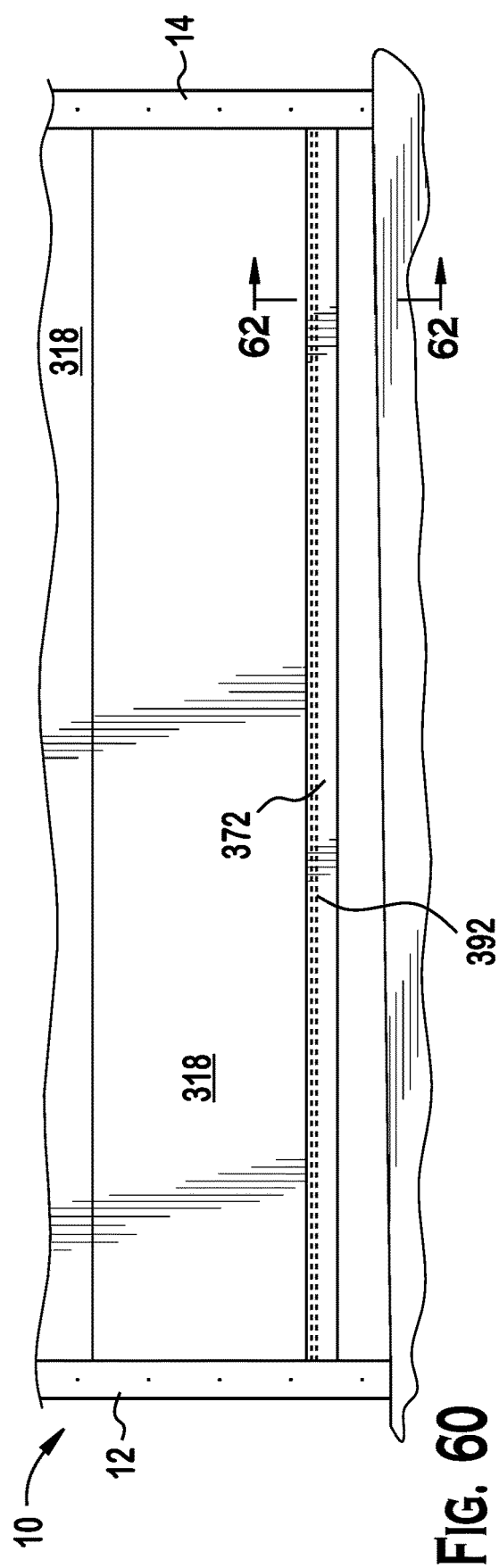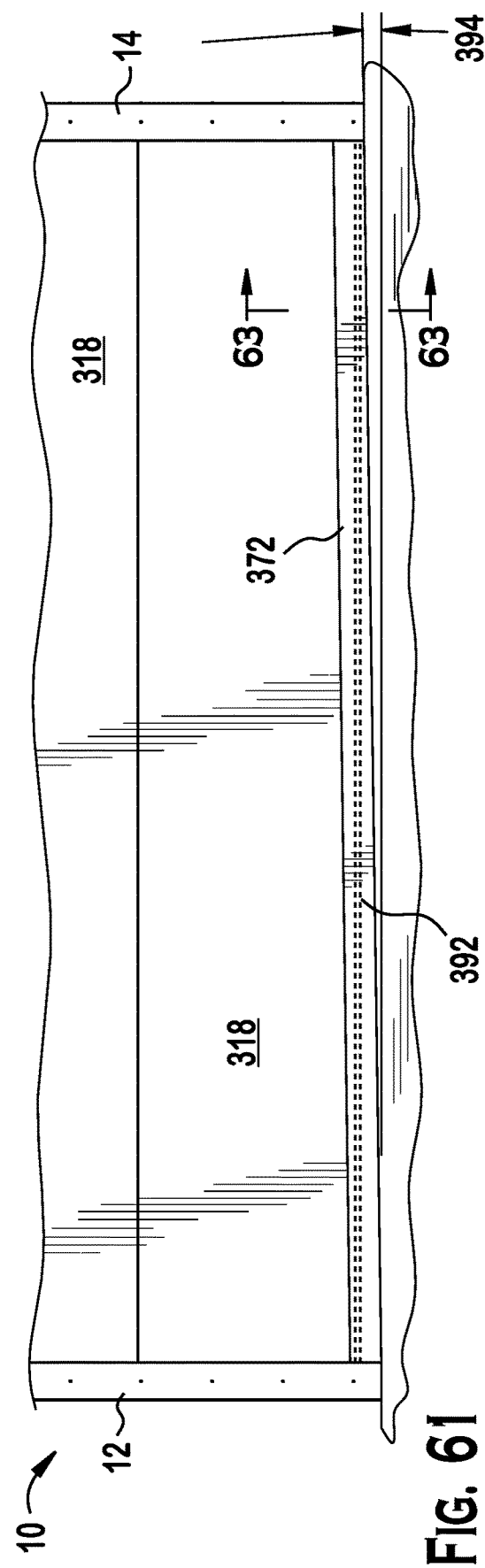

MODULAR ROLL-UP WALL SYSTEM

CROSS REFERENCE TO RELATED APPLICATIONS

This application claims the benefit of U.S. Provisional Application No. 62/490,590 filed on Apr. 26, 2017. This application claims the benefit of U.S. Provisional Application No. 62/491,036 filed on Apr. 27, 2017. The disclosure of each of these applications is incorporated by reference herein in their entirety.

FIELD OF THE INVENTION

The present invention generally relates to components for a retractable wall or partition system. More particularly, this invention relates to a modular roll-up wall system which may be used to divide a room or space, or create an acoustic barrier.

BACKGROUND

Retractable walls may provide the ability to divide a room. Still, a need exists for retractable wall systems that may be suitable for dividing larger rooms and interior public spaces.

SUMMARY

Hence, the present invention is directed to a roll-up wall system which may include a frame having a longitudinal axis, a first roller disposed in the frame, and a second roller disposed in the frame. The second roller may be spaced from the first roller along a first axis that is perpendicular to the longitudinal axis. The roll-up wall system further may include a tube disposed in the frame, the tube being spaced from the first roller and the second roller along a second axis, the second axis being perpendicular to the longitudinal axis and the first axis. Also, the roll-up wall may include a screen connected to the tube and supported by the first roller and the second roller. The screen may be movable between a first configuration and a second configuration. In the first configuration, the screen is rolled onto the tube and the tube is spaced a first distance from the first roller along the second axis. In the second configuration, the screen forms a barrier adjacent the frame and the tube is spaced a second distance from the first roller along the second axis. The second distance may be less than the first distance.

The frame further may include a first end, a second end spaced from the first end along the longitudinal axis, a first support arm adjacent the first end, and a second support arm located between the first support arm and the second end. The first roller may be supported by the first support arm and the second support arm. Also, the second roller may be supported by the first support arm and the second support arm. The second roller may be parallel to the first roller. Further, the second roller and the first roller may be substantially the same.

The first support arm may be configured and dimensioned to hold a tube motor. A tube motor may be disposed inside the tube and secured to the first support arm. An anti-rotation arm may be connected to the first support arm and the tube motor. The tube motor may be a 120 N-m tube motor. Also, the tube motor may be a 300 N-m tube motor. A plurality of support arms may be disposed between the second support arm and the second end of the frame. Each of the plurality of support arms may be spaced 24 inches apart from each other.

The screen may include mass loaded vinyl. For example, the screen may include a mass loaded vinyl core and a felt overlay. The screen further may include a vinyl fabric that is capable of receiving a print design. Also, the screen may include an upper panel and a lower panel, the upper panel and lower panel being connected by a zipper chain.

Also, the modular wall system may include a second roller system adjacent to the tube. A second screen may be connected to the second roller system. The second screen may include a mass loaded vinyl core and a felt overlay. The first screen and the second screen may provide an acoustic barrier with a Sound Transmission Class rating ranging from approximately 46 STC to 53 STC.

DESCRIPTION OF THE DRAWINGS

In the accompanying drawings, which form a part of the specification and are to be read in conjunction therewith and in which like reference numerals (or designations) are used to indicate like parts in the various views:

FIG. 21 is a perspective view of another embodiment of an anti-rotation arm of FIG. 2;

FIG. 22 is a front view of the anti-rotation arm of FIG. 21;

FIG. 23 is a top view of the anti-rotation arm of FIG. 21;

FIG. 26 is a top view of the support arm of FIG. 24;

FIG. 27 is a right side view of the support arm of FIG. 24;

FIG. 28 is a rear view of the support arm of FIG. 24;

FIG. 40 is a perspective view of a motor tube of FIG. 2;

FIG. 41 is a cross-sectional view of the motor tube of FIG. 40 along line 41-41;

FIG. 42 is a side view of the motor tube of FIG. 40;

FIG. 54 shows a rear, right side perspective view of the flexible barrier material of FIG. 53;

FIG. 55 is a cross-sectional view of the flexible barrier material of FIG. 54 along line 55-55;

FIG. 60 shows a front view of a modular wall system of FIG. 1, with a self-adjusting lateral track in a partially raised configuration;

FIG. 61 shows a front view of the modular wall system of FIG. 1, with a self-adjusting lateral track in a lowered configuration;

DESCRIPTION

Figure 1:
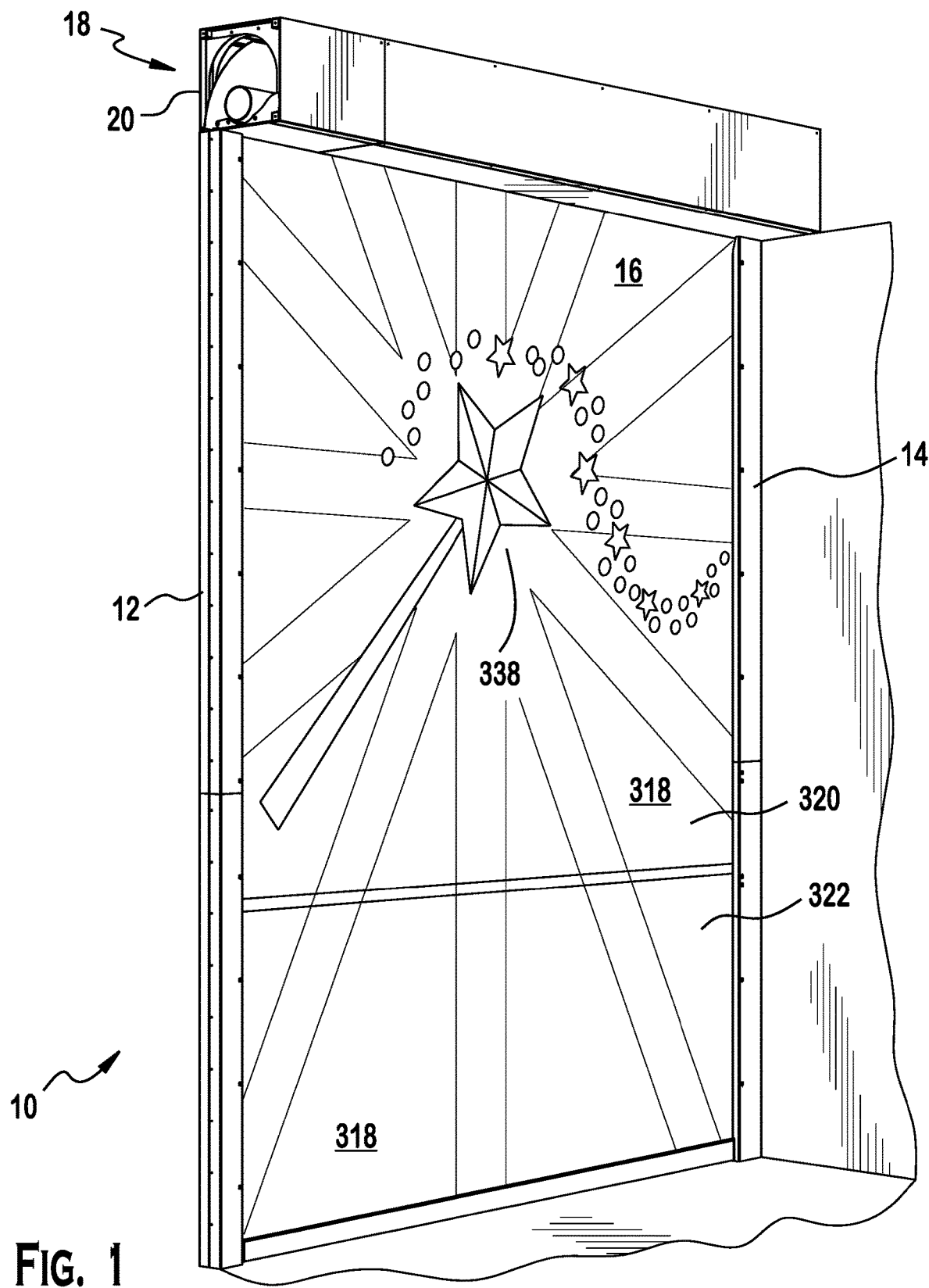
FIG. 1 is a perspective view of an exemplary embodiment of a modular wall system.

FIG. 1 depicts an exemplary modular wall system 10 in accordance with the present invention. The modular wall system 10 may include a first vertical post 12, and a second vertical post 14. Disposed between the first and second vertical posts is a screen (or flexible barrier material) 16. The screen 16 is set up on a roller system 18. The roller system 18 may be mounted in a frame 20 above the vertical posts. The frame 20 may be secured to a structure (not shown) above an opening in which the modular wall system 10 is to be installed.

Figure 2:
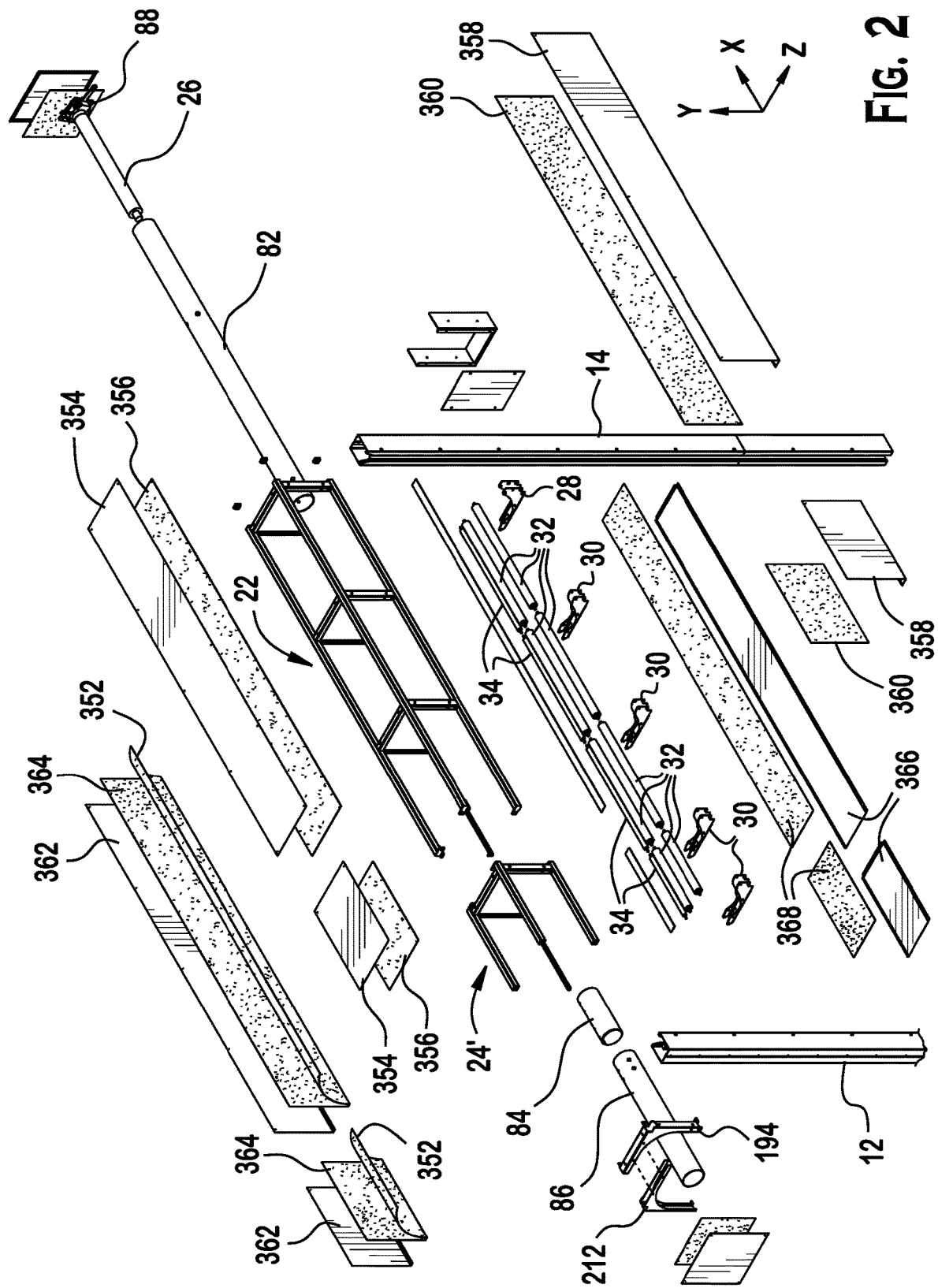
FIG. 2 is an exploded view of the modular wall system of FIG. 1.
Figure 59:
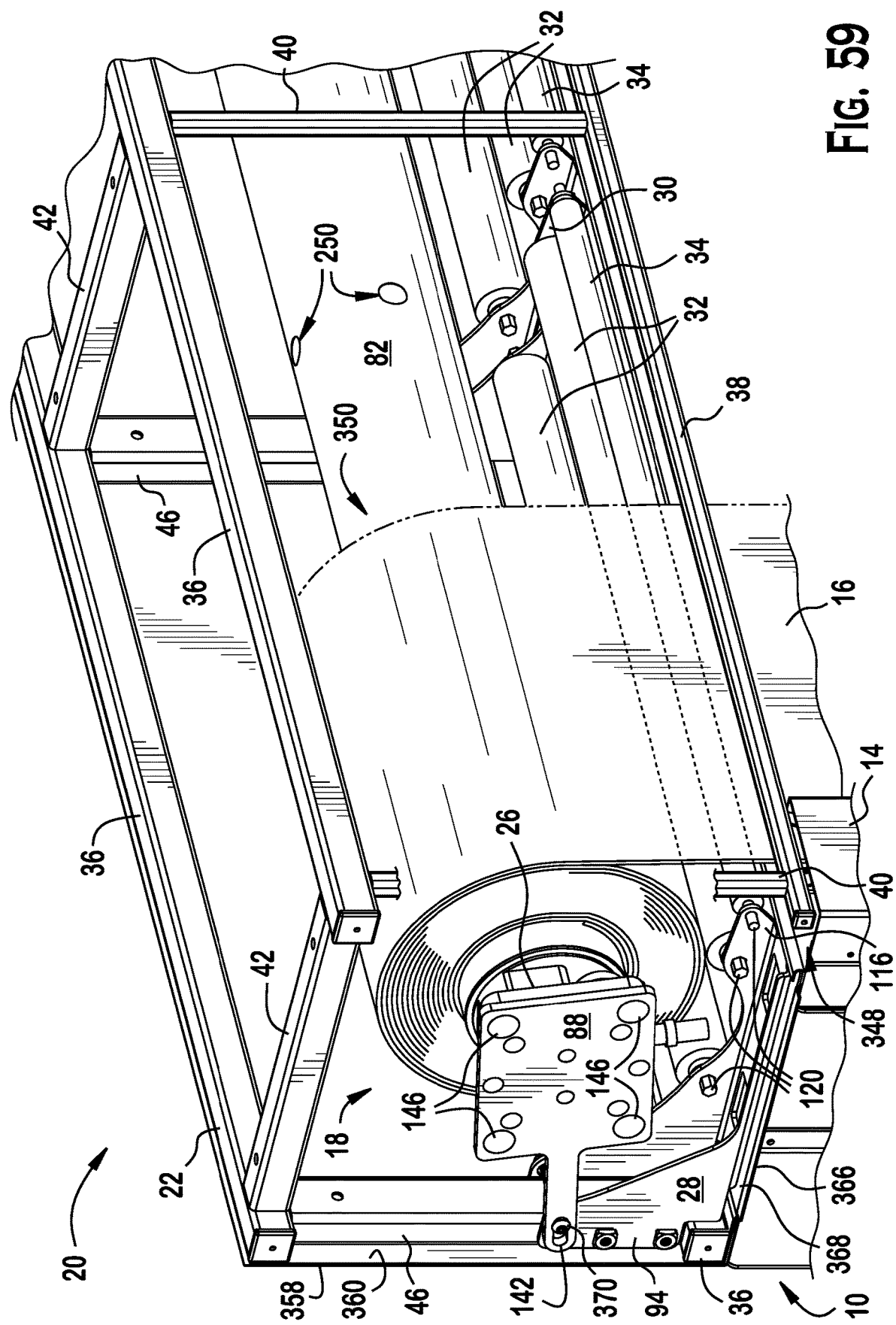
FIG. 59 shows a perspective view of components of the modular wall system of FIG. 1, with flexible barrier material in a partially lowered configuration.

Referring to FIG. 2, the frame 20 may be formed from one or more components, including a motor frame 22 and a center frame 24. The motor frame 22 may house a motor 26, a motor support arm 28, and one or more support arms 30. A plurality of rollers may be disposed between the motor support arm 28 and the adjacent support arm 30. The rollers may be steel rollers manufactured by Miller Bearing Company, Inc of Bromfield, Ohio. For example, as shown in FIG. 59, a pair of 1.375-inch diameter rollers 32 and one 0.75-inch diameter roller may be supported on one end by a motor support arm 28 and on the other end by a support arm 30. Additionally, each pair of adjacent support arms 30 may support a pair of 1.375-inch diameter rollers 32 and one 0.75-inch diameter roller 34.

Referring to FIGS. 3, 4, 5, 6 and 7, a description of structural members which may form an exemplary motor weldment frame are presented in Table 1 (below). Referring to FIG. 2, the length of the frame 20 may be increased by connecting a center frame 24 to the motor frame 22. For example, a flange(s) 54 with one (or more) fastener hole(s) 56 on one end of the motor frame 22 (see e.g., FIG. 3 and FIG. 5) may be bolted to an opposing flange(s) 54 and fastener hole(s) 56 on the center frame 24. In a similar manner, another center frame 24 may be fixed to the other end of the center frame 24. Further still, a center frame 24 may be measured, cut to a desired length, and then secured to a preceding motor frame 22 (see e.g., FIG. 2) or a preceding center frame 24 to create a custom and intermediate length end frame 24. Accordingly, the length of the frame 20 may be determined by the number of modular sections of center frames and end frames connected to the motor frame.

TABLE 1

Exemplary Motor Weldment Frame Elements

| No. (a) | Quantity | Description | Length (inches) | Material |
|---|---|---|---|---|
| 36 | 3 | 1 × 1 × 0.065 (Square tube) | 76.945 | Carbon Steel |
| 38 | 1 | 0.5 × 0.5 × 0.065 (Square tube) | 76.945 | Carbon Steel |
| 40 | 3 | 0.5 × 0.5 × 0.065 (Square tube) | 10.29 | Carbon Steel |
| 42 | 3 | 1 × 1 × 0.065 (Square tube) | 9.79 | Carbon Steel |
| 44 | 1 | HR BAR 0.125 × 0.500 | 1.000 | Carbon Steel |
| 46 | 3 | 1.5 × 1 × 0.065 (Rectangular tube) | 9.79 | Carbon Steel |
| 48 | 1 | HR BAR 0.125 × 1.000 | 2.000 | Carbon Steel |
| 50 | 2 | HR BAR 0.125 × 1.000 | 2.000 | Carbon Steel |
| 52 | 2 | HR BAR 0.125 × 1.000 | 2.000 | Carbon Steel |

Notes:
(a) Reference element number
(b) HR = Hot Rolled Bar

Figure 8:
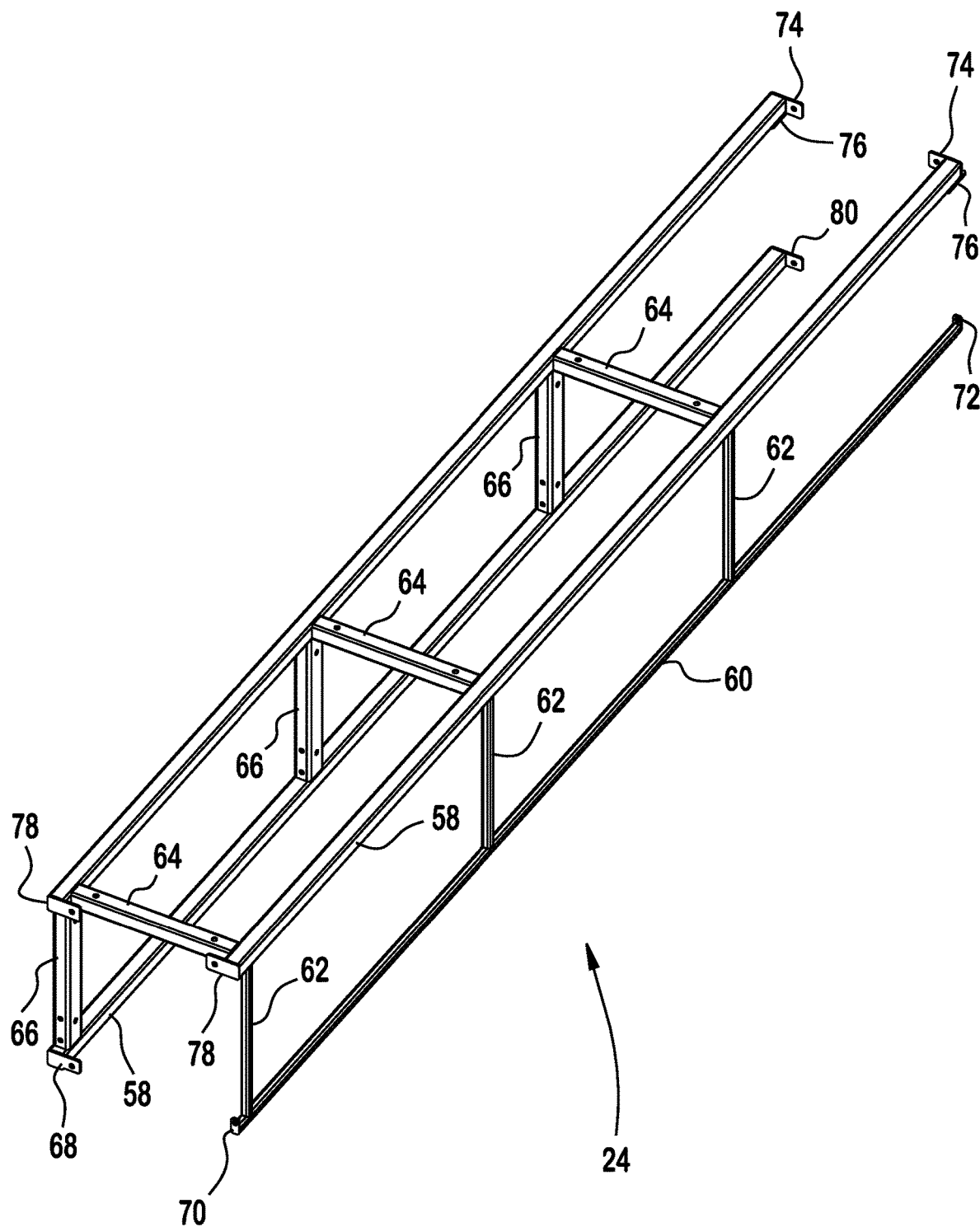
FIG. 8 is a perspective view of an end frame component of FIG. 2.

Referring to FIG. 8, a description of structural members which may form an exemplary center weldment frame are presented in Table 2.

TABLE 2

Exemplary Center Weldment Frame Elements

| No. (a) | Quantity | Description | Length (inches) | Material |
|---|---|---|---|---|
| 58 | 3 | 1 × 1 × 0.065 (Square tube) | 76.97 | Plain Carbon Steel |
| 60 | 1 | 0.5 × 0.5 × 0.065 (Square tube) | 76.97 | Plain Carbon Steel |
| 62 | 3 | 0.5 × 0.5 × 0.065 (Square tube) | 10.29 | Plain Carbon Steel |
| 64 | 3 | 1 × 1 × 0.065 (Square tube) | 9.79 | Plain Carbon Steel |
| 66 | 3 | 1.5 × 1 × 0.065 (Rectangular tube) | 9.79 | Plain Carbon Steel |
| 68 | 1 | HR BAR 0.125 × 1.000 | 2.000 | Plain Carbon Steel |
| 70 | 1 | HR BAR 0.125 × 0.500 | 1.000 | Plain Carbon Steel |
| 72 | 1 | HR BAR 0.125 × 0.500 | 1.000 | Plain Carbon Steel |
| 74 | 2 | HR BAR 0.125 × 1.000 | 2.000 | Plain Carbon Steel |
| 76 | 2 | HR BAR 0.125 × 1.000 | 2.000 | Plain Carbon Steel |
| 78 | 2 | HR BAR 0.125 × 1.000 | 2.000 | Plain Carbon Steel |
| 80 | 1 | HR BAR 0.125 × 0.500 | 2.000 | Plain Carbon Steel |

Notes:
(a) Reference element number
(b) HR = Hot Rolled Bar

Although the motor frame 22 and center frame 54 may be weldment frames formed from square and rectangular members, as well as hot rolled steel bars, other structural shapes and members (e.g., channel, angle, T, I or other thin wall structural members) and joint construction may be used to create a substantially rigid load bearing frame that may support and house components of a roll-up wall. Similarly, although the embodiments of the structural members disclosed in Table 1 and Table 2 are formed from carbon steel, other metals, alloys, or other materials may be used to modify or optimize engineering properties of the frame for a given application. For example, a titanium alloy may be used to reduce weight and enhance strength of the frame to facilitate modular wall systems having increased tube lengths or multiple roller assemblies (see e.g., FIGS. 66, 67, 68 and 69). In another example, a corrosion resistant alloy may be selected for use in installations near the ocean.

Figure 9:
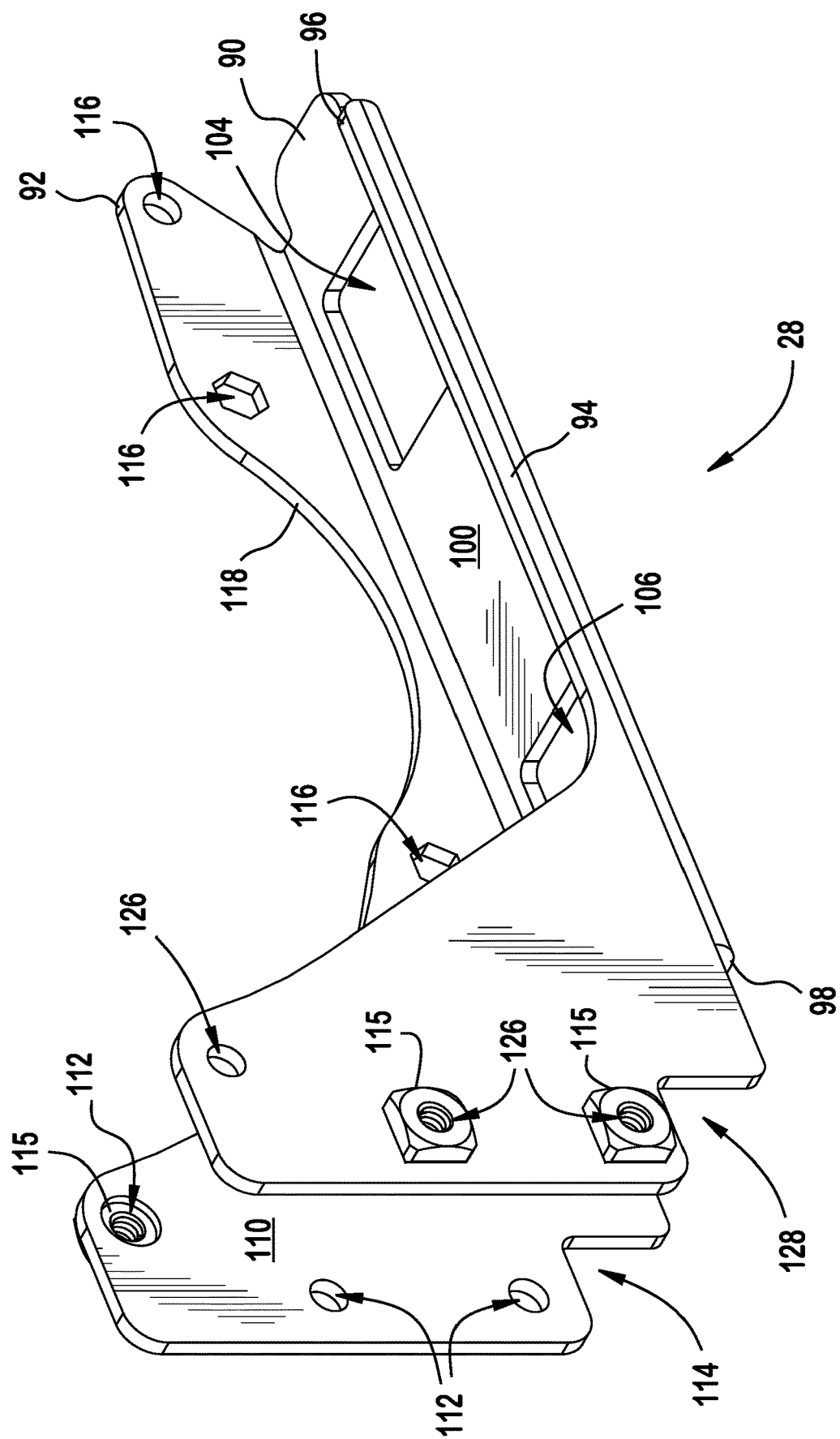
FIG. 9 is a perspective view of a motor support arm of FIG. 2.

Referring to FIG. 9, a motor support arm 28 may include a stem 90, an interior bracket 92 and an exterior bracket 94.

Figure 10:
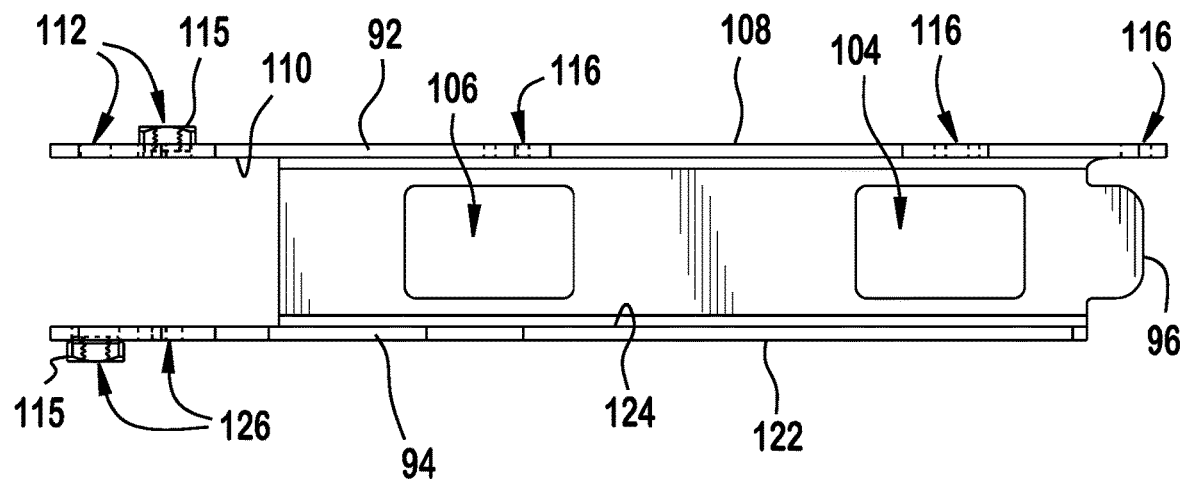
FIG. 10 is a top view of the motor support arm of FIG. 9.
Figure 11:
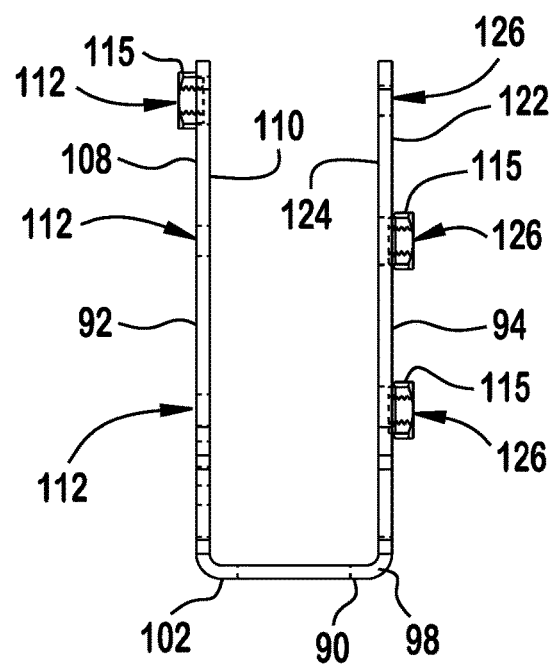
FIG. 11 is a rear view of the motor support arm of FIG. 9.
Figure 12:
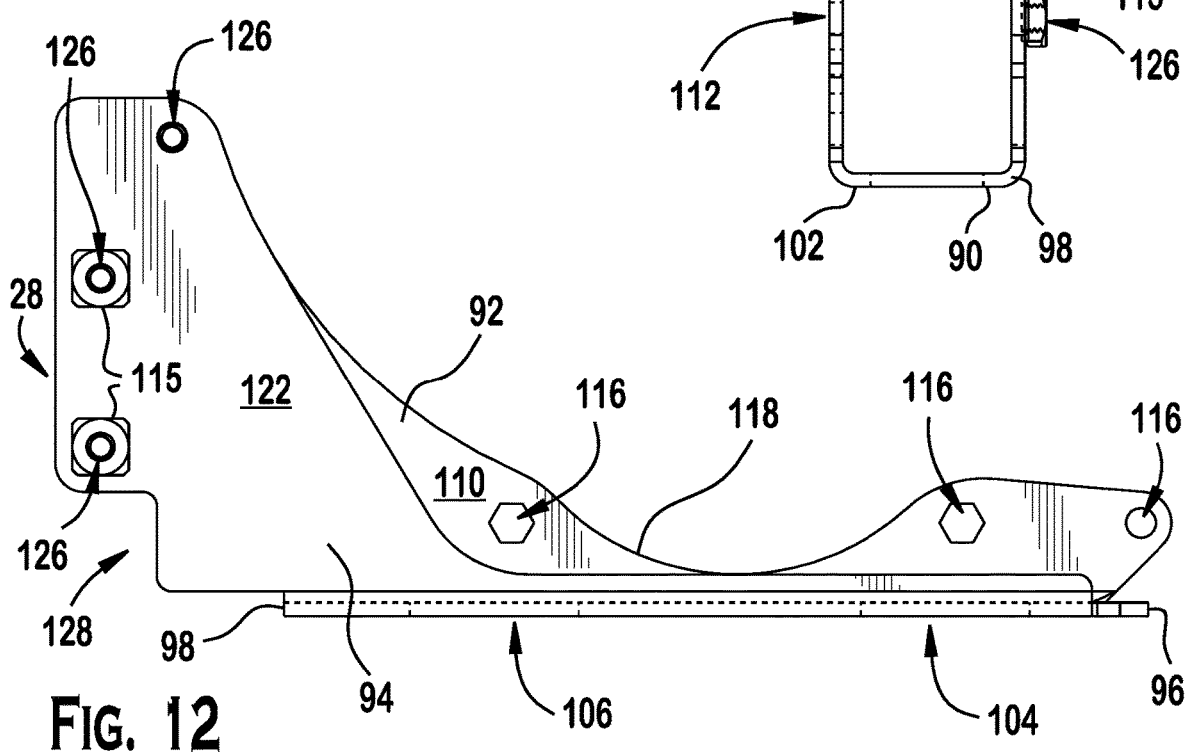
FIG. 12 is a left side view of the motor support arm of FIG. 9.
Figure 13:
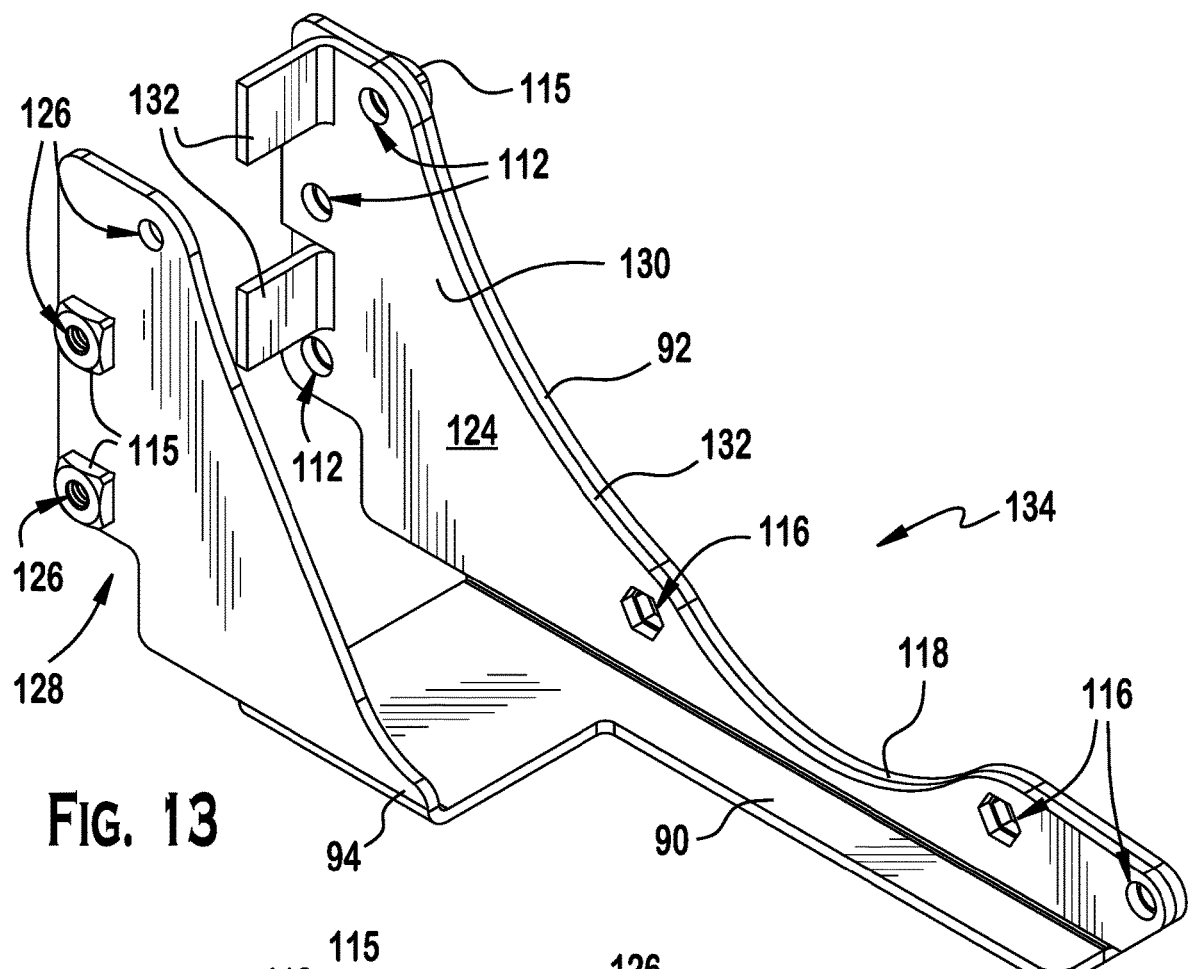
FIG. 13 is a perspective view of another embodiment of a motor support arm.
Figure 14:
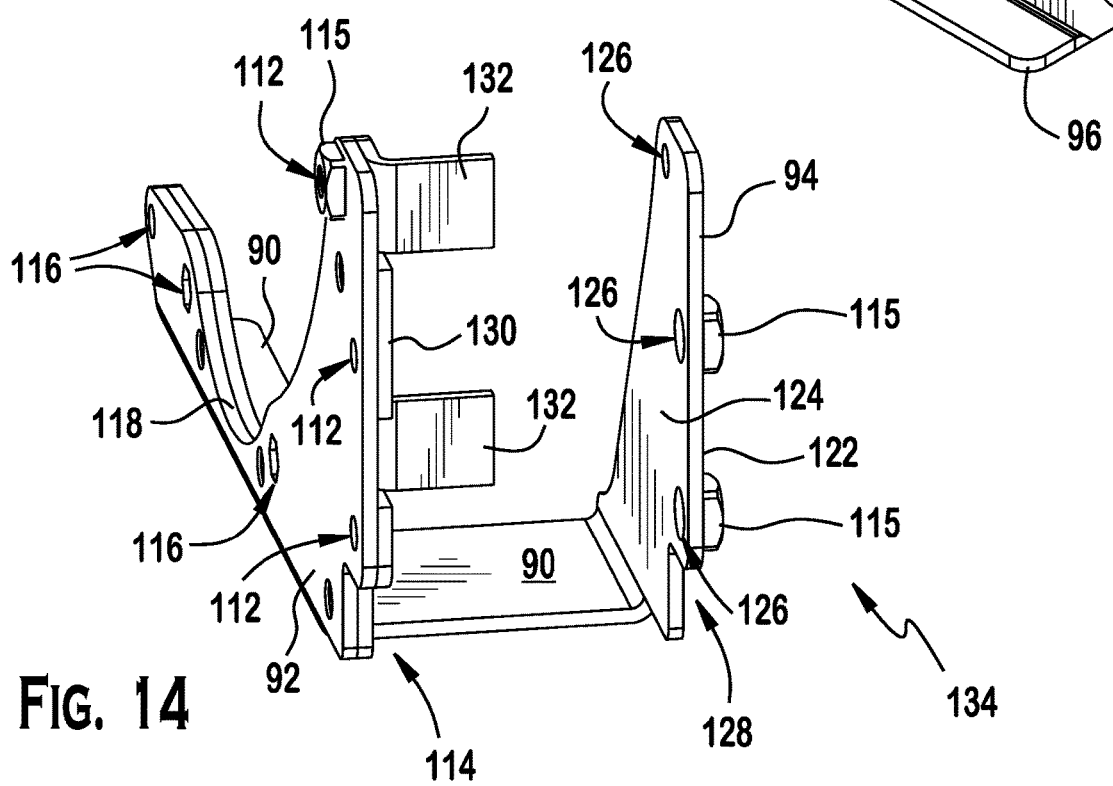
FIG. 14 is another perspective view of the motor support arm of FIG. 13.
Figure 15:
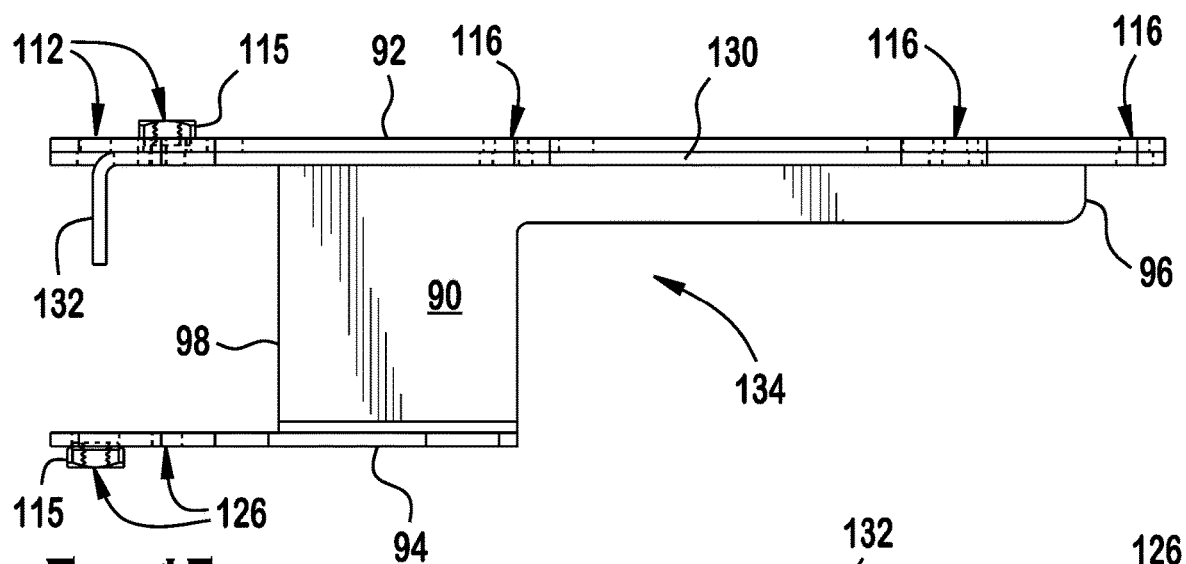
FIG. 15 is a top view of the motor support arm of FIG. 13.
Figure 16:
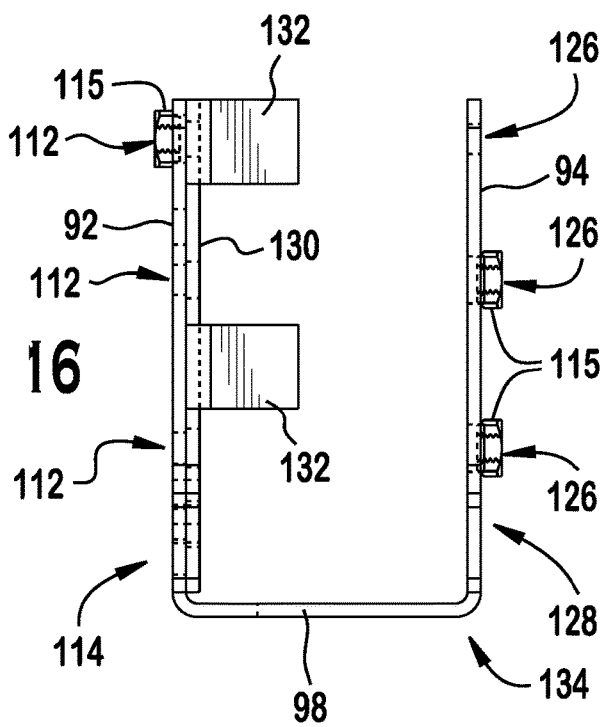
FIG. 16 is a rear view of the motor support arm of FIG. 13.
Figure 17:
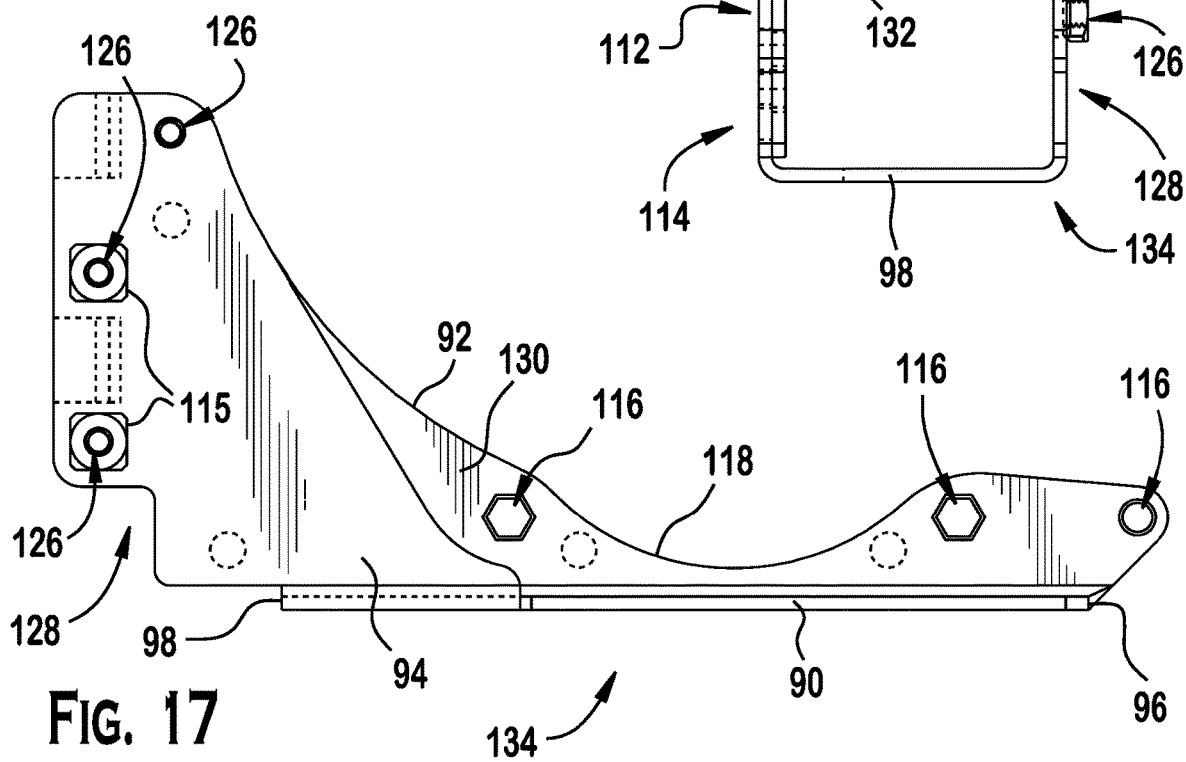
FIG. 17 is a left side view of the motor support arm of FIG. 13.

The stem may include a front end 96 and a rear end 98. An upper surface 100 may extend from the front end of the stem to the rear end of the stem. The upper surface may be planar and smooth. Referring to FIG. 11 and FIG. 12, the stem 90 further may include a lower surface 102. Referring to FIG. 10, the stem may include a front aperture 104 situated adjacent to the front end. The front aperture 104 may extend from the upper surface to the lower surface. The stem may include a rear aperture 106 situated adjacent to the rear end. The rear aperture may extend from the upper surface 100 to the lower surface 102.

Figure 56:
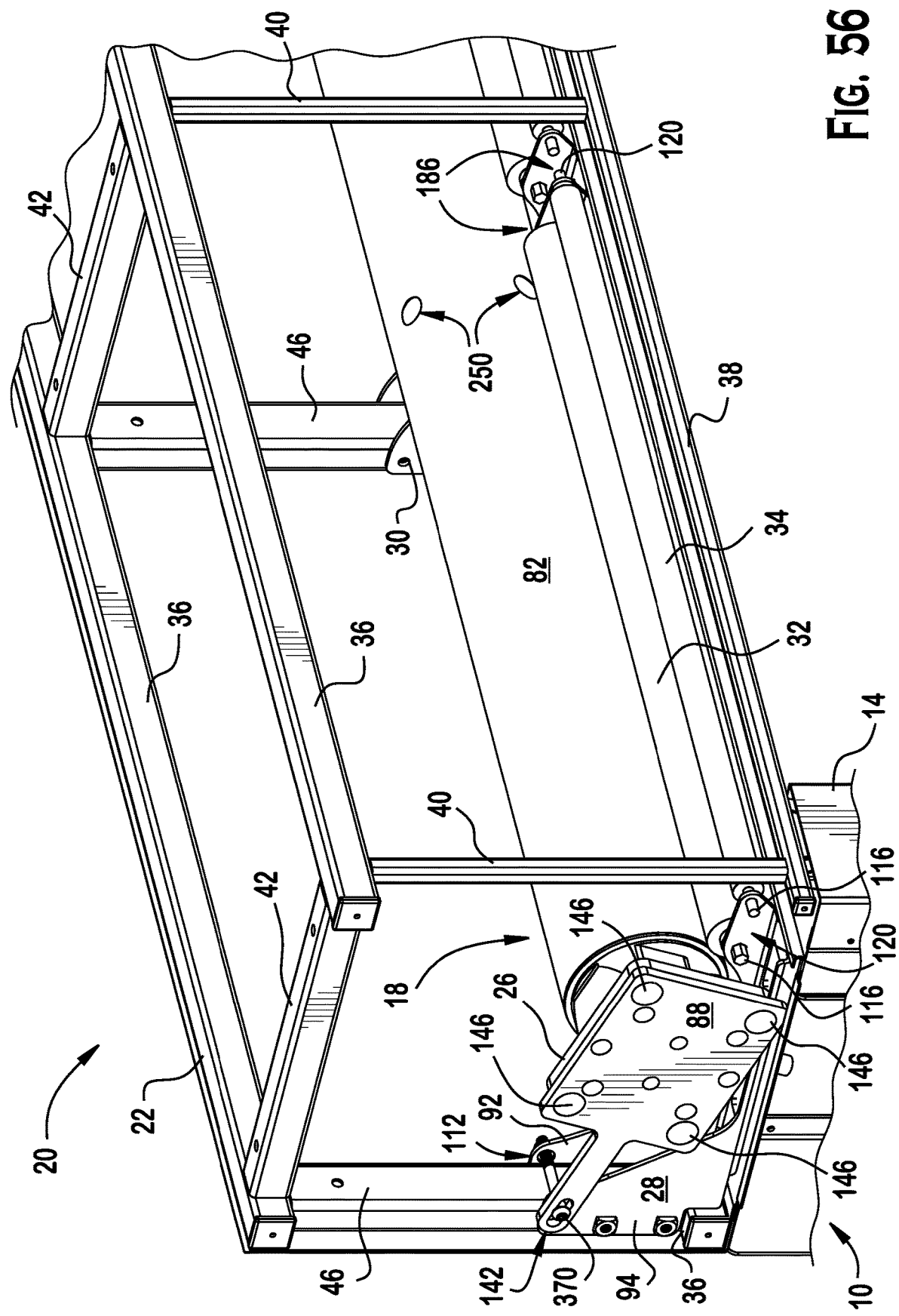
FIG. 56 shows a perspective view of components of the modular wall system of FIG. 1, without the flexible barrier material.

The interior bracket 92 may connect to the stem 90 on the port side (or left side) of the motor support arm 28. Referring to FIG. 11, the interior bracket 92 may be planar having a generally flat and smooth outer surface 108 and a generally flat and smooth inner surface 110. The inner surface and outer surface of the interior bracket may be substantially parallel to one another. The interior bracket 92 further may include three fastener receiving holes 112. Each fastener receiving hole 112 may extend from the inner surface to the outer surface. As shown in FIG. 9, two fastener receiving holes may be aligned vertically above a generally square notch 114 located at the lower rear portion of the interior bracket 92. The other fastener receiving hole may include a weldment nut 115 on the outer surface 108. The interior bracket 92 further may include three horizontally aligned spindle receiving bores 116. One spindle receiving bore may be situated adjacent the front end 96 of the stem. The other two spindle receiving bores 116 may be disposed on opposite sides of a recessed profile segment 118. The recessed profile segment 118 may extend below the adjacent spindle receiving bores. The recessed profile segment 118 may be concave. One or more of the spindle receiving bores 116 may possess a central axis and the bore may define a cross-sectional area normal to the central axis of the bore. The cross-sectional area may be uniform along the central axis. The cross-sectional area may have a geometric shape. For example, one or more spindle receiving bores may each define a cross-sectional area having a hex shape. In another example, a spindle receiving bore may define a cross-sectional area having a circular shape. Although, the spindle receiving bores 116 shown in FIGS. 9, 10, 11 and 12 define a cross-sectional area having a circular shape or a hex shape, any shape may be used provided that the bore securely holds a roller spindle 120 (see e.g., FIG. 56).

The exterior bracket 94 may connect to the stem on the starboard side (or right side) of the motor support arm 28. Referring to FIG. 11, the exterior bracket 94 may be planar having a generally flat and smooth outer surface 122 and a generally flat and smooth inner surface 124. The inner surface and outer surface of the exterior bracket may be substantially parallel to one another. The exterior bracket 94 further may include three fastener receiving holes 126. Each fastener receiving hole 126 may extend from the inner surface 124 to the outer surface 122. As shown in FIG. 9, two fastener receiving holes may be aligned vertically above a generally square notch 128 located at the lower rear portion of the exterior bracket. Each of the two vertically aligned fastener receiving bores 126 may include a weldment nut 115 on the outer surface 122. The exterior bracket further may include another fastener receiving hole 126 located forward and above the pair of vertically aligned fastener receiving holes. The fastener receiving holes 126 on the exterior bracket 94 and the fastener receiving holes on the interior bracket 92 may be aligned. Each respective pair of aligned fastener receiving holes may be used to hold and receive a fastener (e.g., a bolt or rivet).

FIGS. 13, 14, 15, 16 and 17 show another embodiment of a motor arm support 134 in which the interior bracket 92 includes a second plate 130 that is fixed to the interior bracket. The second plate 130 may include two rear tabs 132. The rear tabs 132 may be planar. The rear tabs 132 may be vertically aligned. The rear tabs 132 further may be disposed approximately at a right angle to the inner surface 124 of the interior bracket. Also, the stem 90 may be generally L-shaped. The stem 90 shown in FIGS. 13, 14, 15, 16 and 17 may be wider than the stem 90 shown in FIGS. 9, 10, 11 and 12. Due to the thicker interior bracket 92 and wider stem 90 of the motor arm support 134 shown in FIGS. 13, 14, 15, 16 and 17, this embodiment may accommodate larger motors and heavier tubes than the motor arm support 28 shown in FIGS. 9, 10, 11 and 12. The motor arm support 132 of FIGS. 13, 14, 15, 16 and 17 may be referred to as a wide motor arm support. Other features of the wide motor arm support 134 generally are similar to the features of the motor arm support shown in FIGS. 9, 10, 11 and 12.

Figure 18:
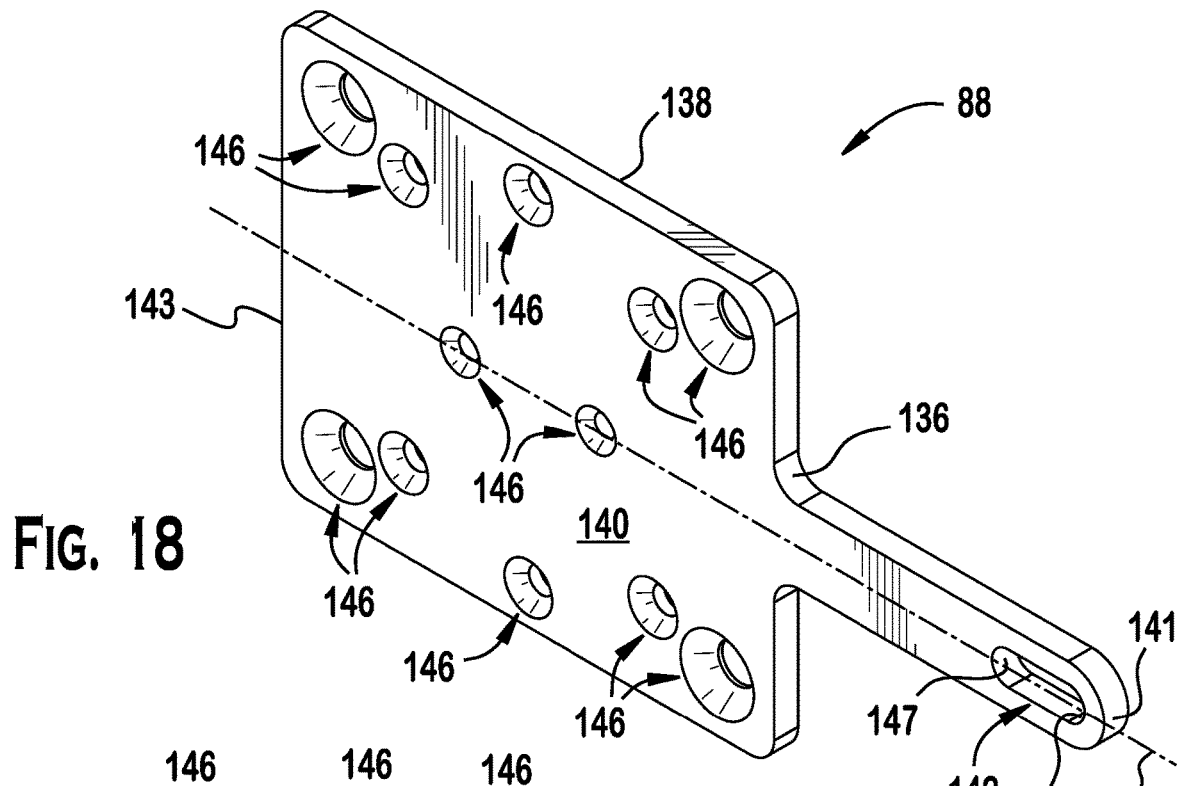
FIG. 18 is a perspective view of an anti-rotation arm of FIG. 2.
Figure 19:
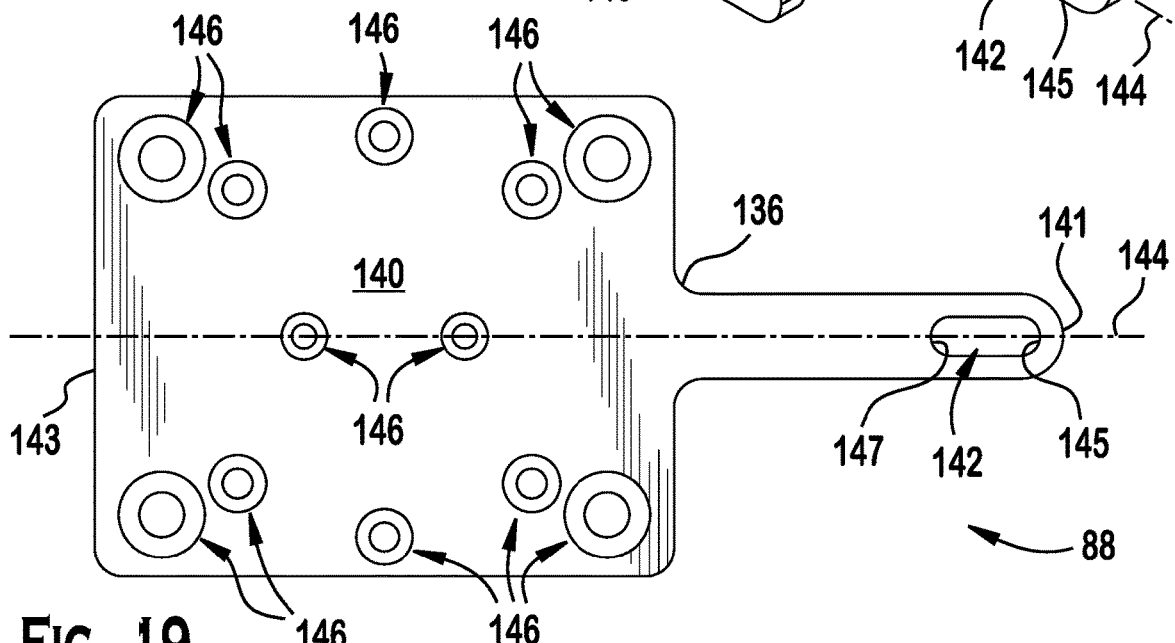
FIG. 19 is a front view of the anti-rotation arm of FIG. 18.
Figure 20:
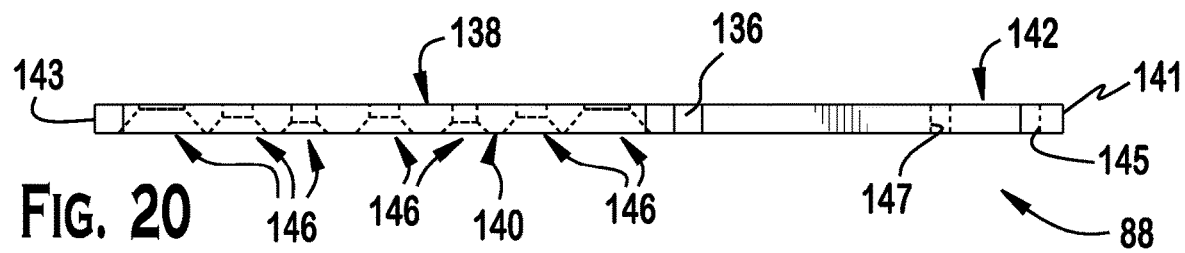
FIG. 20 is a top view of the anti-rotation arm of FIG. 18.
Figure 24:
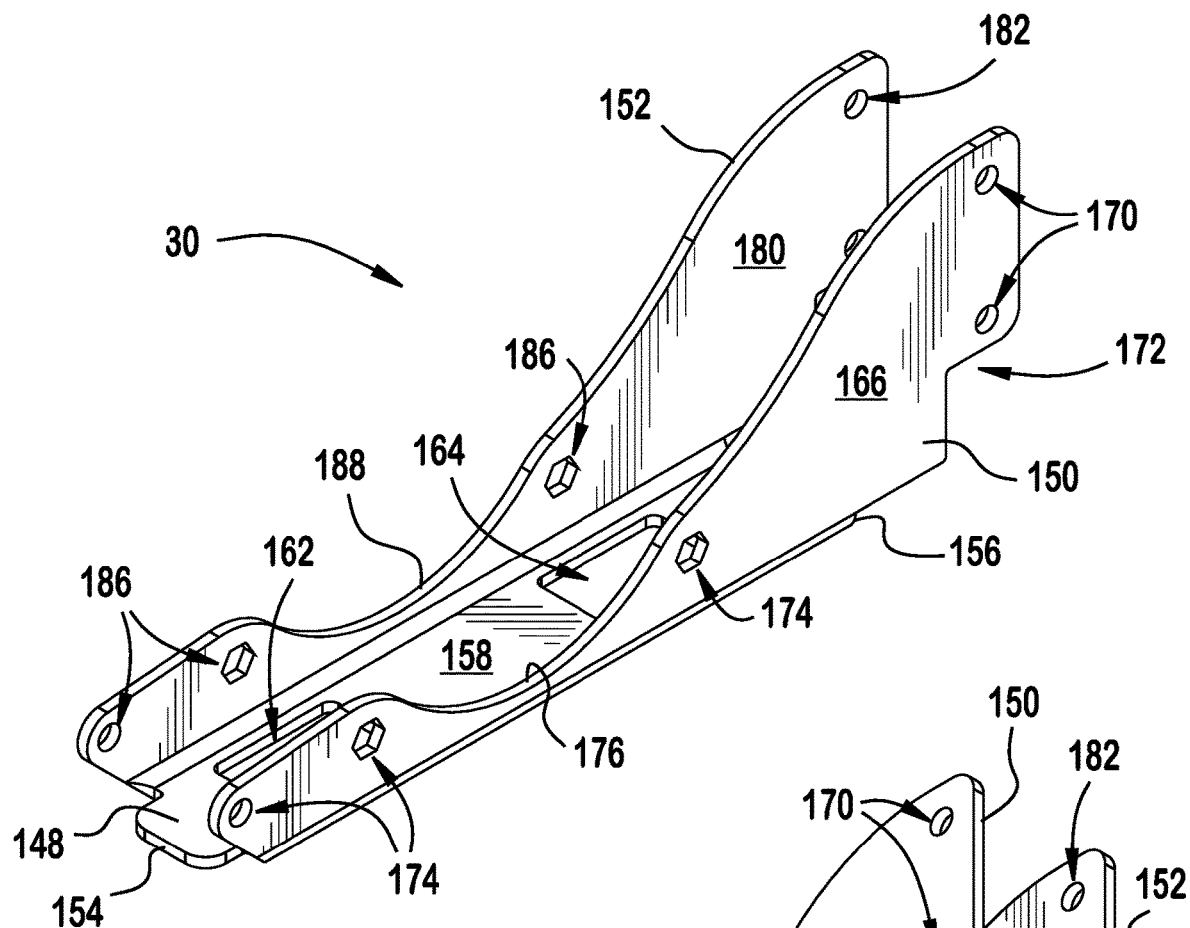
FIG. 24 is a perspective view of a support arm of FIG. 2.
Figure 25:
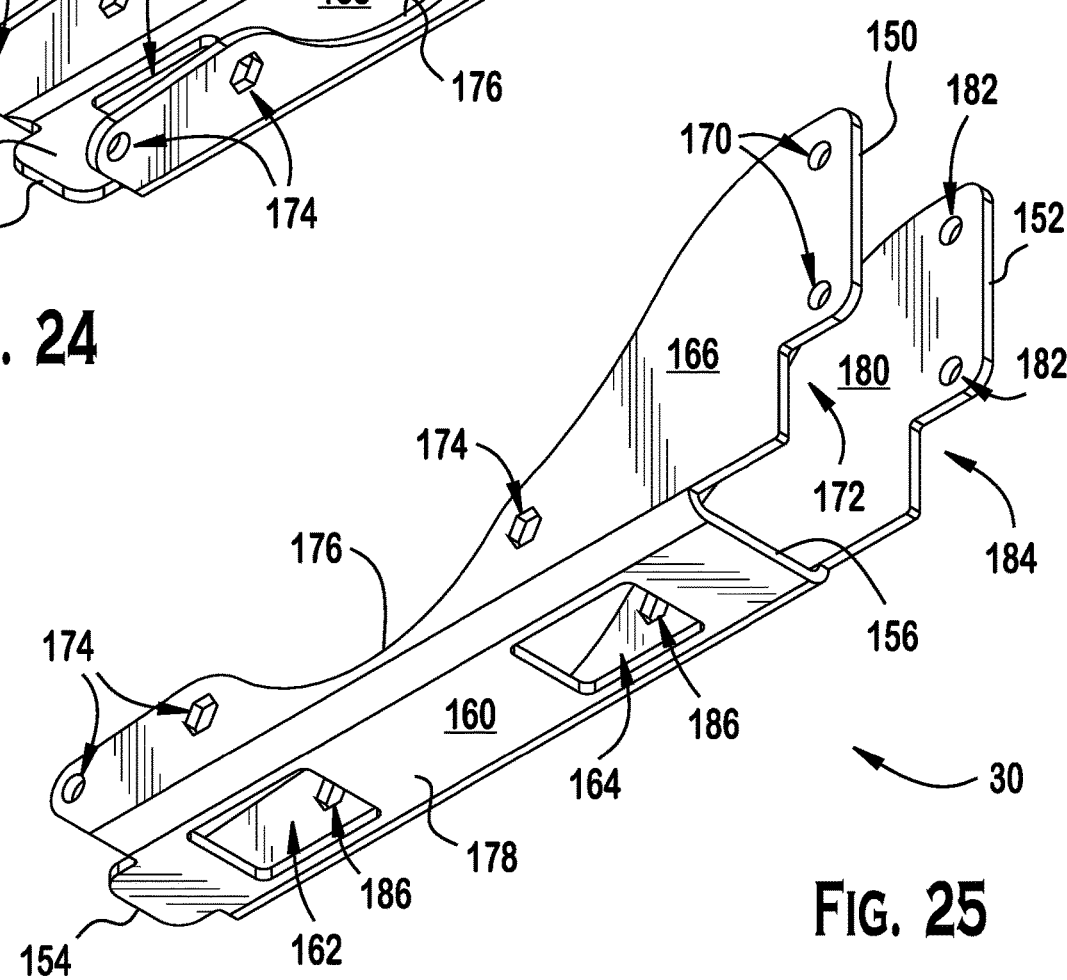
FIG. 25 is another perspective view of the support arm of FIG. 24.

Referring to FIGS. 18, 19 and 20 and FIGS. 21, 22 and 23, the modular wall system 10 (see e.g., FIG. 2) may include an anti-rotation arm 88, 88'. In FIGS. 18, 19 and 20, the anti-rotation arm 88 may be described as possessing a generally paddle shape. By contrast, in FIGS. 21, 22 and 23, the anti-rotation arm 88' may be described as possessing a generally triangular shape. In both embodiments, however, the anti-rotation arm 88, 88' may include a plate 136. The plate 136 may include a motor mounting side surface (e.g., a first side surface) 138 and a fastener receiving side surface (e.g., a second side surface) 140. The plate 136 may include a frame securement opening 142. The frame securement opening 142 may extend from the motor mounting side surface 138 to the fastener receiving side surface 140. The frame securement opening 142 may be elongated along a longitudinal axis 144. The longitudinal axis may be a line of symmetry for the plate. Although the plate may possess reflectional symmetry, the plate may be asymmetric. In the embodiment shown in FIG. 20 and FIG. 23, the plate includes a proximal end surface 141 and a distal end surface 143. Also, in the embodiments disclosed in FIG. 20 and FIG. 23, the frame securement opening 142 includes a proximal end 145 and a distal end 147.

The plate further may include a plurality of motor fastener receiving holes 146. Although each of the disclosed motor fastener receiving holes disclosed in FIGS. 18, 19 and 20 and FIGS. 21, 22 and 23 are counter sunk holes, other hole configurations may be used. For example, the motor fastener receiving hole may be a counter bore hole. Moreover, the motor fastener receiving holes may form a plurality of bolt patterns. For example, the two motor fastener receiving holes 146 that are bisected by the longitudinal axis 144 may be used to secure the plate 136 to one motor; whereas, the four motor fastener receiving holes having a diameter great than the other motor fastener receiving holes may be used to secure another motor to the plate 136. Hence, one bolt pattern may require two motor fastener receiving holes, and another bolt pattern may require four motor fastener receiving holes.

Preferably, the anti-rotation arm 88, 88' may be formed from carbon steel, although other metals and metal alloys may be used Referring to FIGS. 24, 25, 26, 27 and 28, the modular wall system 10 may include a plurality of support arms 30. The support arm 30 may include a stem 148, a port side bracket 150 and a starboard side bracket 152. The stem 148 may be similar to the stem 90 of the motor support arm 28. The stem 148 may include a starboard side bracket 150, a port side bracket 152, a front end 154, a rear end 156, an upper surface 158, a lower surface 160, a front aperture 162, and a rear aperture 164.

The port side 150 bracket may be similar to the interior bracket 92 of the motor support arm 28. The port side bracket 150 may include an outer surface 166, an inner surface 168, fastener receiving holes 170, a square notch 172, spindle receiving bores 174, and a recessed profile segment 176. Also, the starboard side bracket 152 may include an outer surface 178, an inner surface 180, fastener receiving holes 182, a square notch 184, spindle receiving bores 186, and a recessed profile segment 188. Further still, each support arm 30 may be configured and dimensioned to attach to a vertical structural member of the motor frame 22 (or center frame 24).

In a preferred embodiment, one support arm 30 may be secured to a vertical structural member of the motor frame 22 or center frame 24 at a spacing of approximately 24 inches. Also, one support arm 30 may be secured to an end bracket on the left side of the motor frame 22 (or center frame 24).

Figure 29:
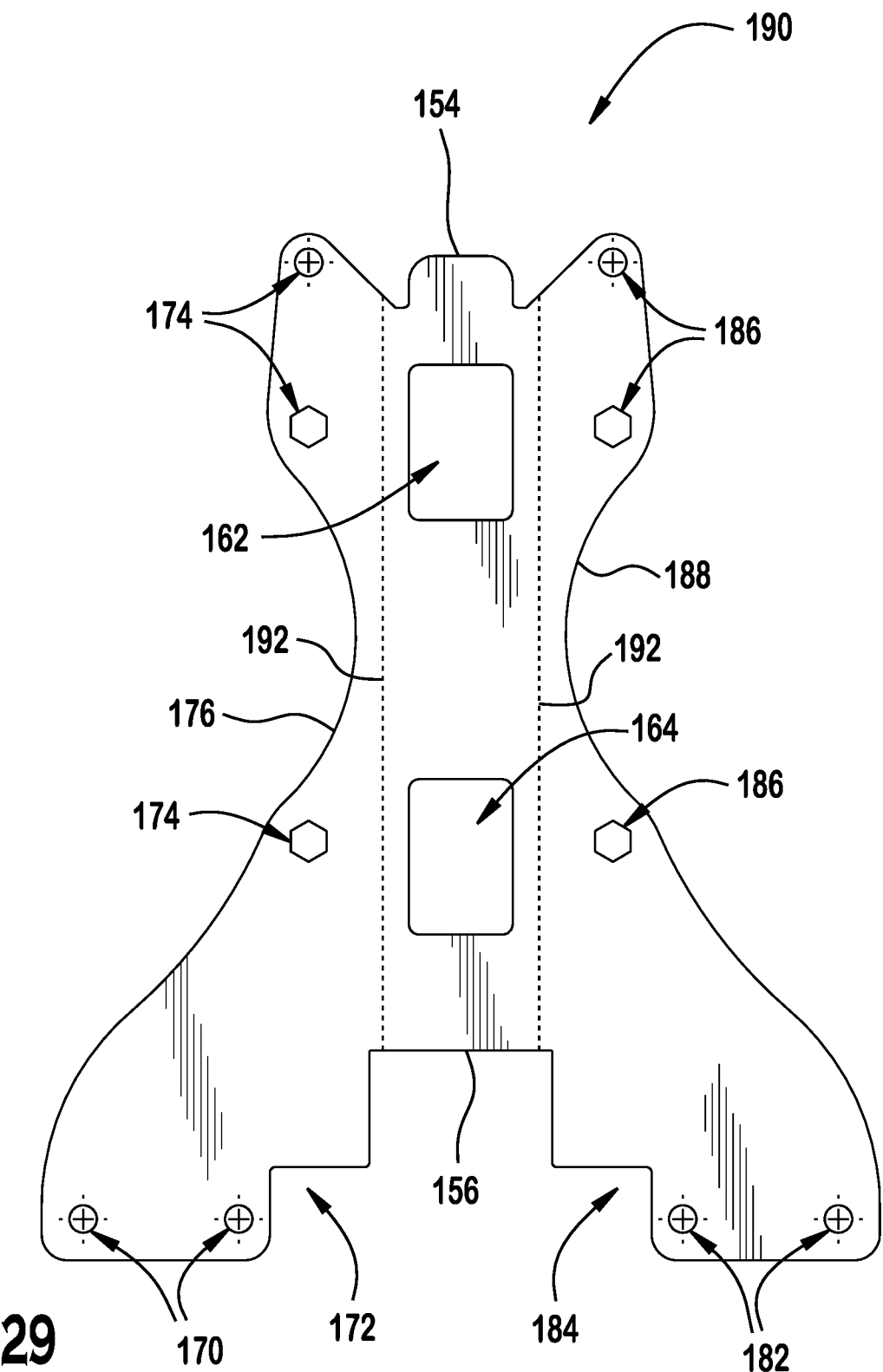
FIG. 29 is a flat pattern for fabricating the support arm of FIG. 24.

FIG. 29, shows a flat pattern 190 for forming the support arm 30. The flat pattern 190 includes two parallel bend lines 192. The direction of each bend is down. The bend angle for each of the bend lines is approximately 90 degrees. In one embodiment, the work piece may be an 11 gauge sheet of carbon steel.

Figures 30, 31:
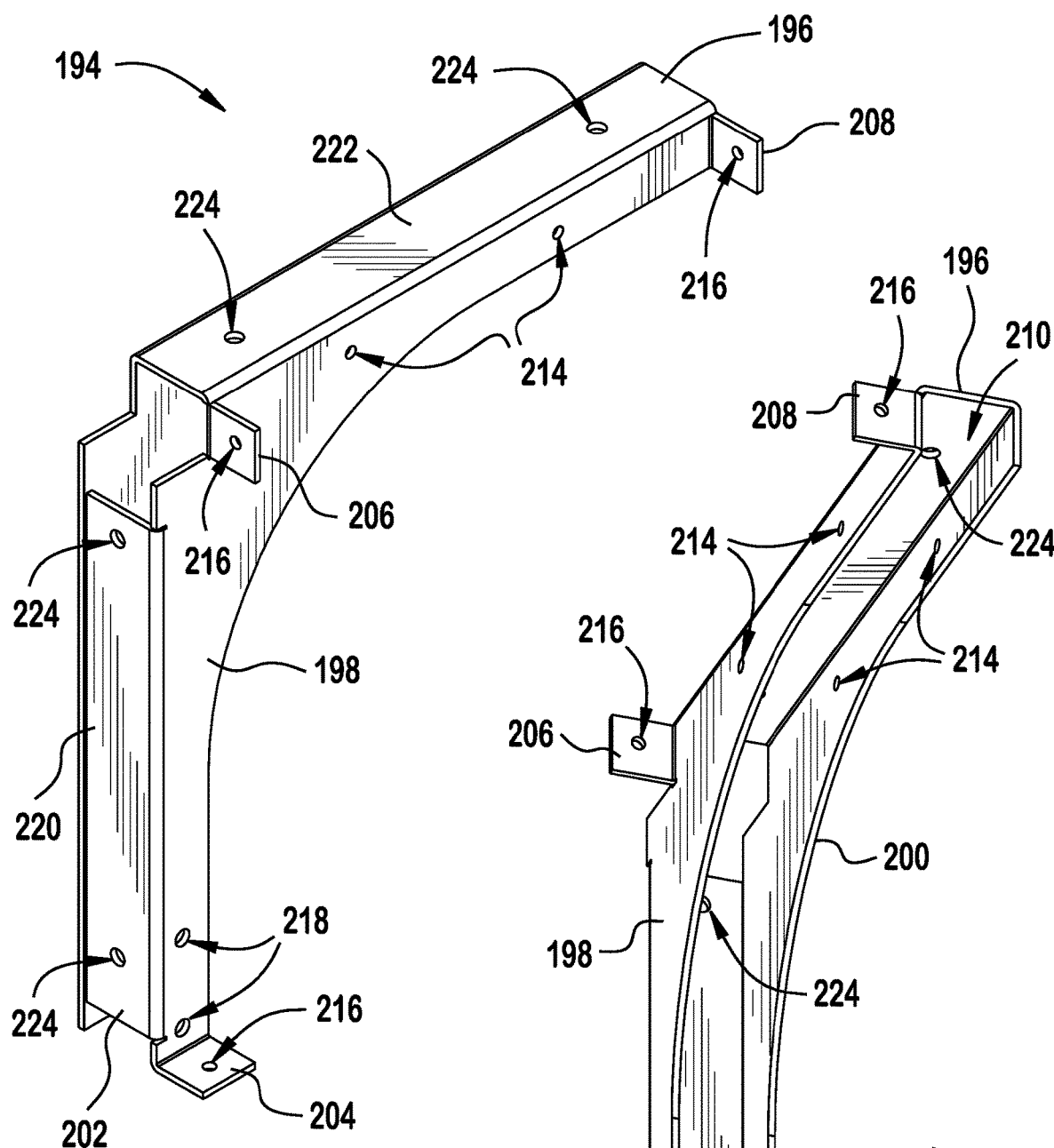
FIG. 30 is a perspective view of a rear end support of FIG. 2.
FIG. 31 is another perspective view of the rear end support of FIG. 30.
Figure 32:
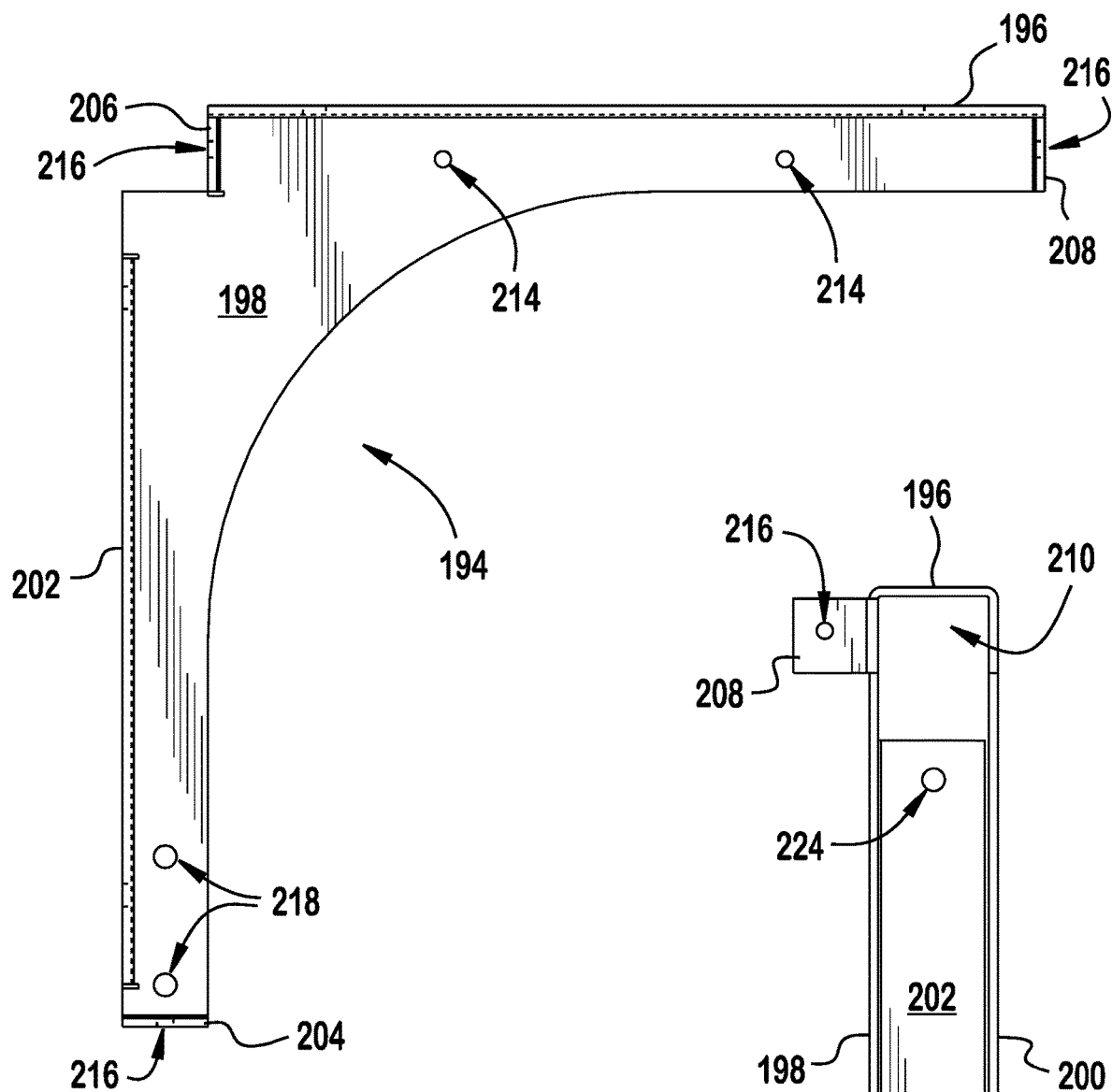
FIG. 32 is a left side view of the rear end support of FIG. 30.
Figure 33:
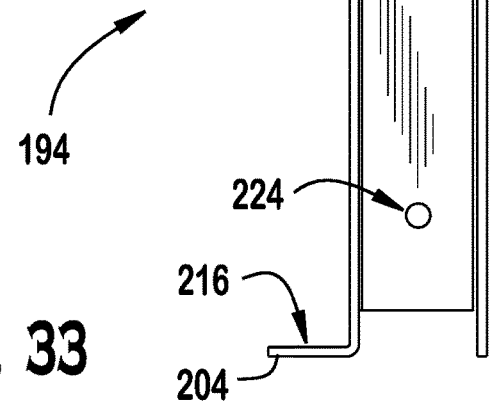
FIG. 33 is a front view of the rear end support of FIG. 30.

Referring to FIGS. 30, 31, 32 and 33, rear end support 194 may include a cap 196, an interior arched member 198, an exterior arched member 200, and a back plate 202. The interior arched member 198 may include a lower tab 204, a rear tab 206, and a front tab 208. As shown in FIG. 31, the interior arched member 198, the cap 196, and the exterior arched member 200 may form a horizontal channel 210. The horizontal channel 210 may be configured and dimensioned to slidably receive the front end support 212 (see e.g., FIG. 2 and FIGS. 35, 36, 37 and 38). The vertical sides of the horizontal channel 210 may include fastener receiving holes 214 for fixing the front end support 212 (not shown) within the horizontal channel 210. Additionally, the lower tab 204, the front tab 208, and rear tab 206 may each include a fastener receiving hole 216 for securing the rear end support 194 to the motor frame 22 (or center frame 24) end. Further still, the base of the interior arch 198 and the base of the exterior arch 200, respectively, may include a pair of support arm fastener receiving holes 218. The support arm fastener receiving holes 218 may be used to secure a support arm 30 to the motor frame 22 (or center frame 24) end. Also, the rear surface 220 and the upper surface 222 may each include cover fastener receiving holes 224. The cover fastener receiving holes 224 may be used to secure the rear cover and the cover top to the motor frame (or center frame) end.

Figure 34:
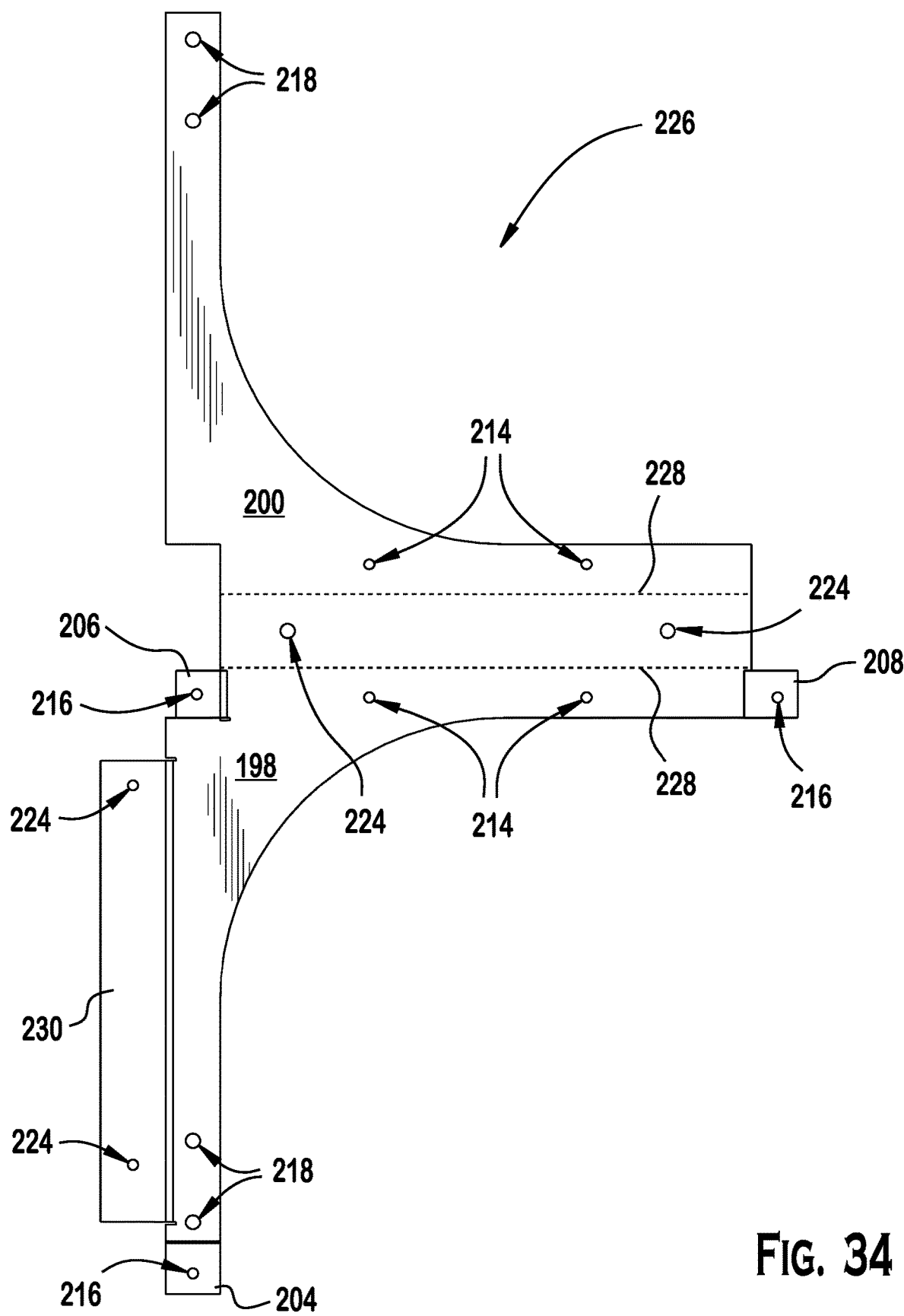
FIG. 34 is a flat pattern for fabricating the rear end support of FIG. 30.

FIG. 34, shows a flat pattern 226 for forming the rear end support 194. The flat pattern 226 includes two parallel bend lines 228 and a back plate tab 230. The direction of bend for each of these features is down. By contrast, the direction of bend for the lower tab 204, the rear tab 206, and the front tab 208 is up. The bend angle is approximately 90° for all bends. In one embodiment, the work piece may be a 12 gauge sheet of carbon steel.

Figure 35:
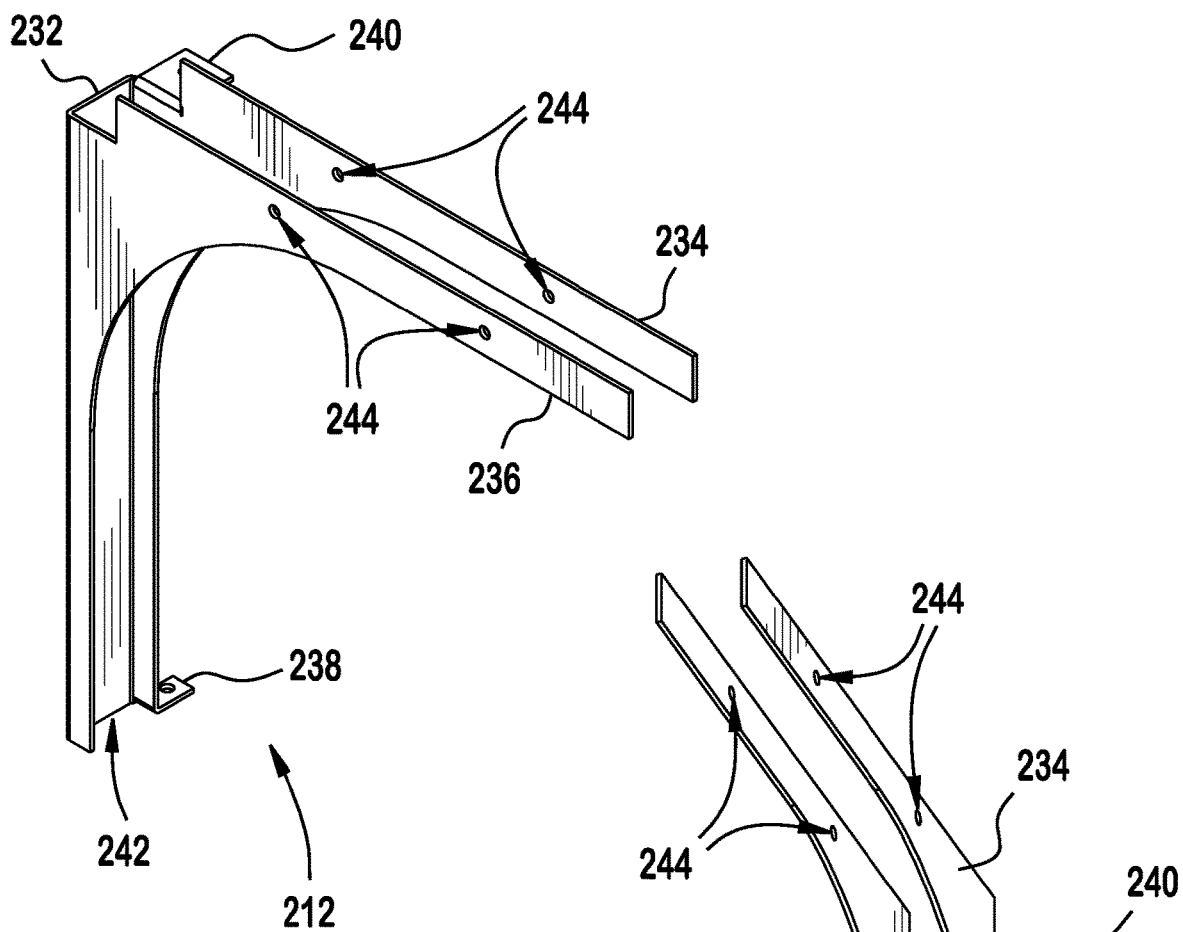
FIG. 35 is a perspective view of a front end support of FIG. 2.
Figure 36:
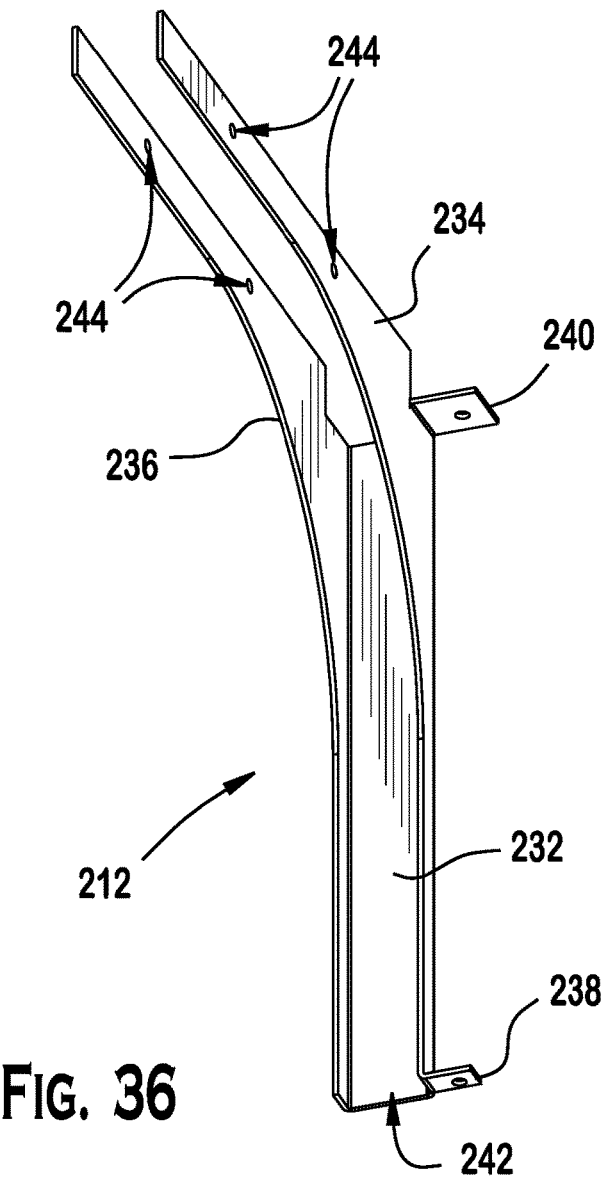
FIG. 36 is another perspective view of the front end support of FIG. 35.
Figure 37:
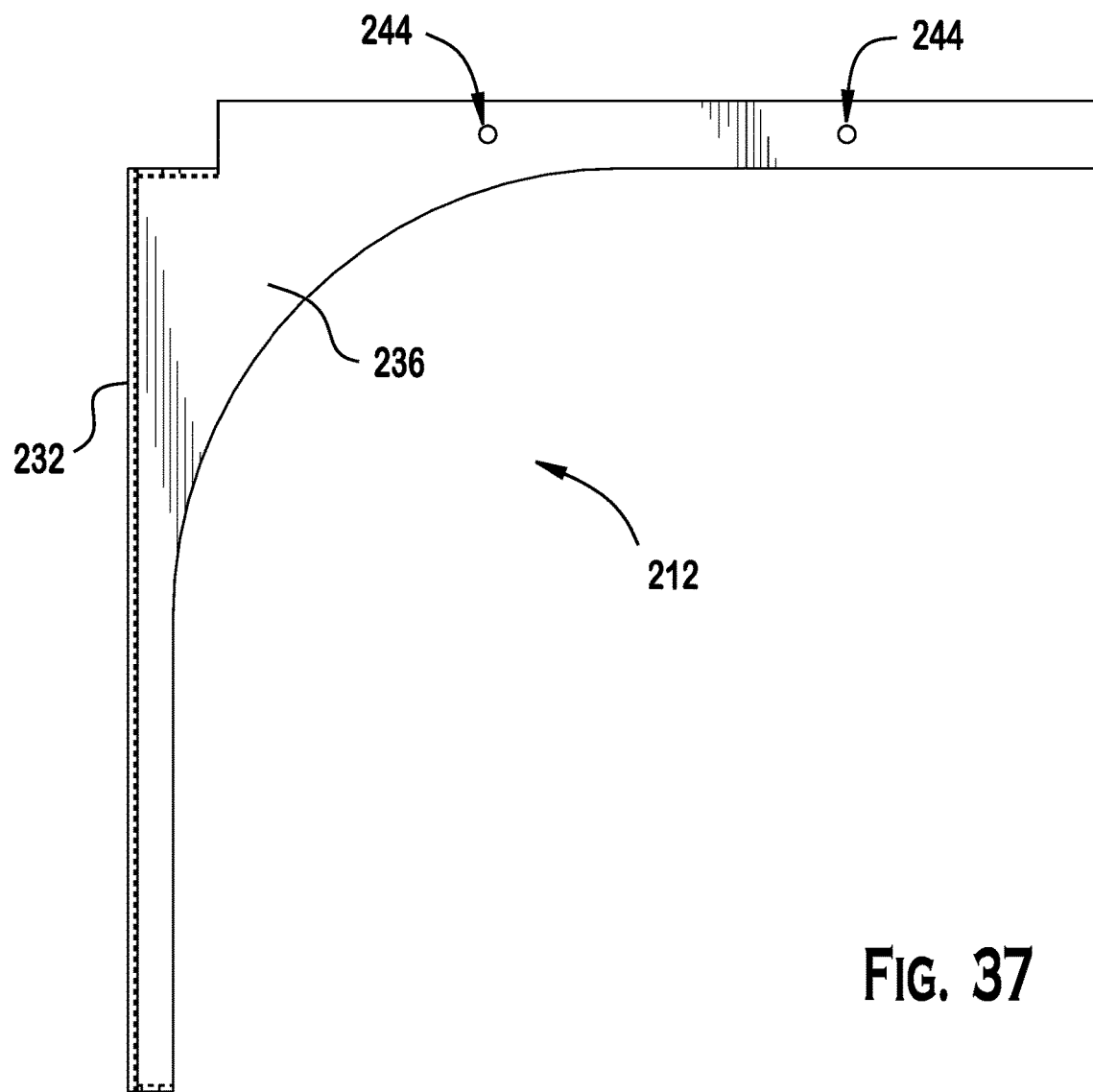
FIG. 37 is a right side view of the front end support of FIG. 35.
Figure 38:
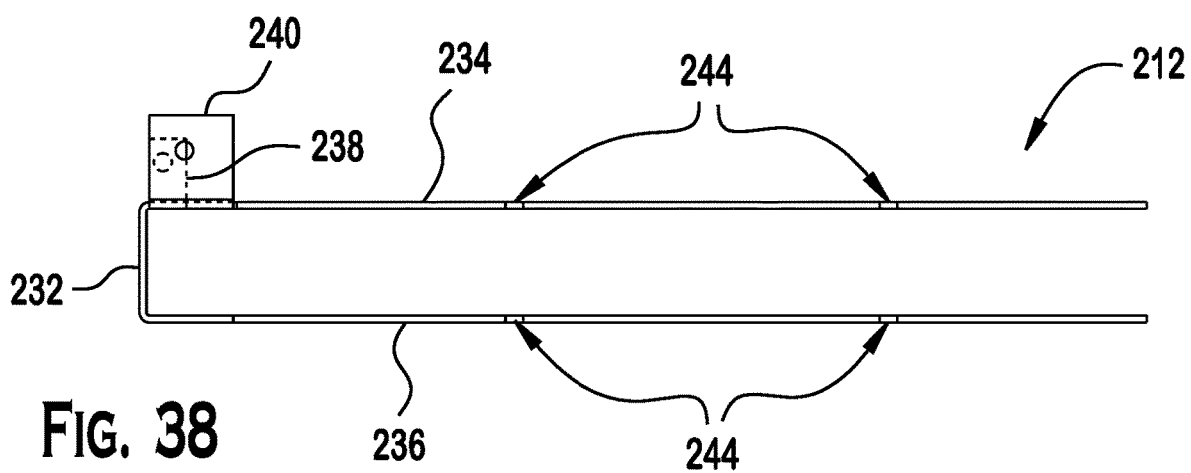
FIG. 38 is a top view of the front end support of FIG. 35.

Referring to FIGS. 35, 36, 37 and 38, front end support 212 may include a spine 232, an interior arched member 234, and an exterior arched member 236. As shown in FIG. 35, the interior arched member 234 may include a lower tab 238, and an upper tab 240. The interior arched member 234, spine 232, and the exterior arched member 236 may form a vertical channel 242. The interior arched member 234 and the exterior arched member 236 may each include fastener receiving holes 244 for fixing the front end support 212 within the horizontal channel 210 of the rear end support 194.

Figure 39:
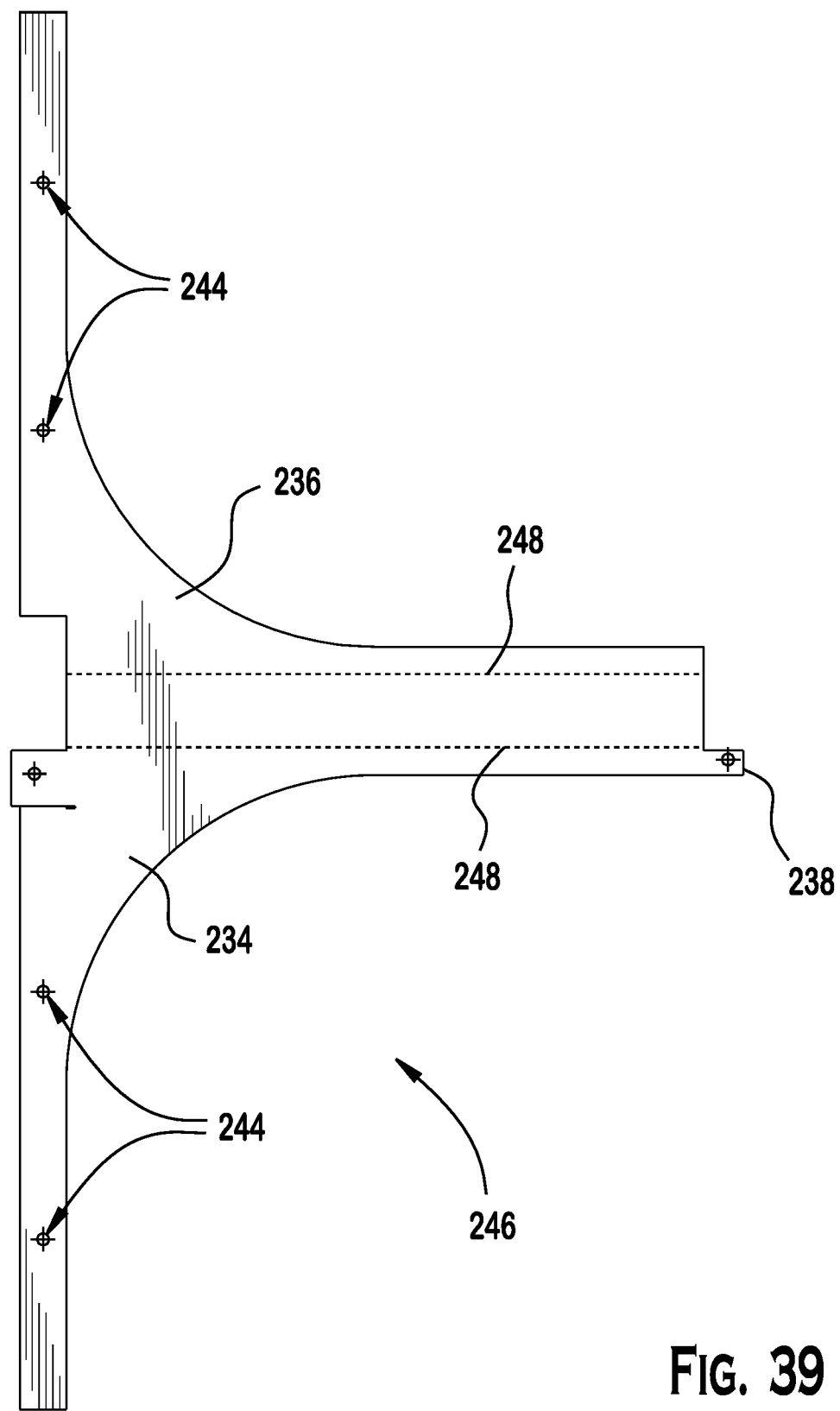
FIG. 39 is a flat pattern for fabricating the front end support of FIG. 35.

FIG. 39, shows a flat pattern 246 for forming the front end support 212. The flat pattern 246 may include two parallel bend lines 248, an upper tab 240, and a lower tab 238. The direction of bend for each of the bend lines down. By contrast, the direction of bend for the upper tab 240 and the lower tab 238 is up. The bend angle is approximately 90° for all bends. In one embodiment, the work piece may be a 12 gauge sheet of carbon steel.

Referring to FIGS. 40, 41 and 42, the motor tube 82 may be a hollow circular cylindrical member. The motor tube may include a central axis. As shown in FIG. 41, the motor tube may have a substantially constant outer diameter and a substantially constant inner diameter. In a preferred embodiment, the outer diameter is approximately 4.00 inches and the inner diameter is approximately 3.76 inches. In the preferred embodiment, the motor tube may have a length of approximately 95.5 inches. The motor tube 82 further may include four motor fastener receiving holes 250. The motor fastener receiving holes may be equally spaced around the circumference of the motor tube. The motor fastener receiving holes may be spaced approximately 23.88 inches from one end of the motor tube. The one end 252 of the motor tube 82 may receive the motor 26. Fasteners (not shown) may be inserted into the motor fastener receiving holes 256 and advanced to fixedly secure the motor 26 with respect to the motor tube 82. The other end 254 of the motor tube may include two rings of tube coupling fastener receiving holes 256. The tube coupling fastener receiving holes 256 may be equally spaced around the circumference of the motor tube. In a preferred embodiment, the first ring of tube coupling fastener receiving holes 256 is approximately 2.00 inches from the other end 254 of the motor tube 82. The second ring of tube coupling fastener receiving holes 256 is approximately 4.00 inches from the other end 254 of the motor tube 82. Preferably, the motor tube 82 is formed from carbon steel. Other metals or alloys may be used to form the motor tube. For example, a titanium alloy may be used to reduce weight and enhance strength of the frame to facilitate modular wall systems having increased tube lengths or multiple roller assemblies (see e.g., FIGS. 65, 66, 67, 68 and 69). In another example, a corrosion resistant alloy may be selected for use in installations near the ocean.

Figure 43:
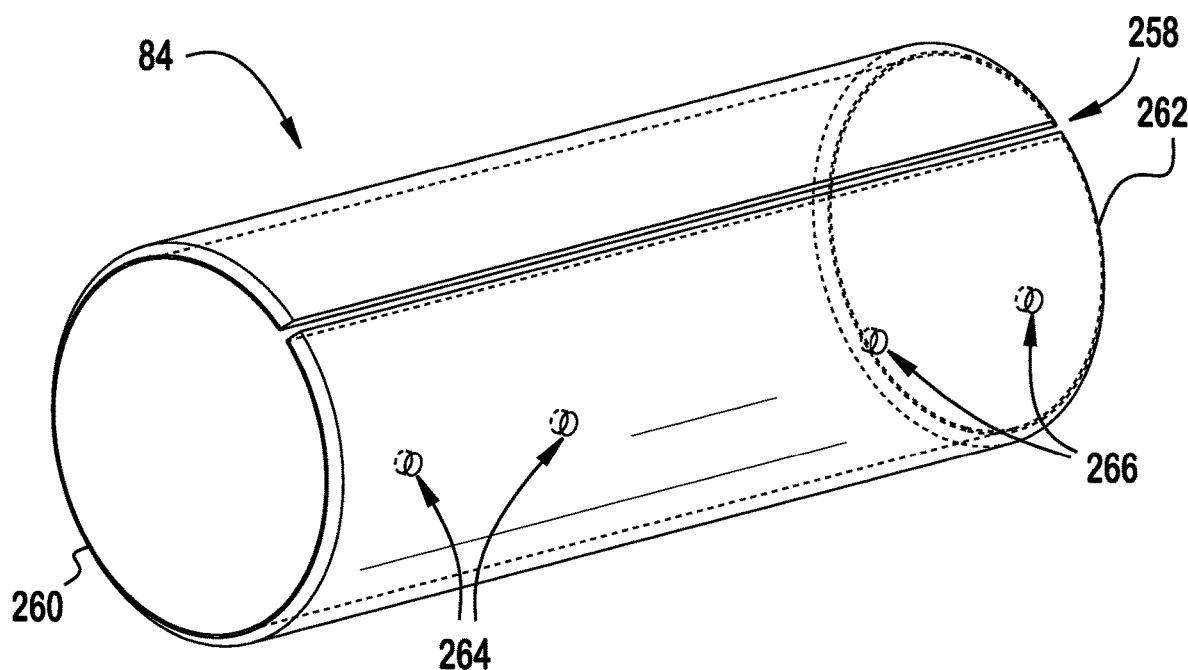
FIG. 43 shows a perspective view of a tube coupling of FIG. 2.
Figure 44:
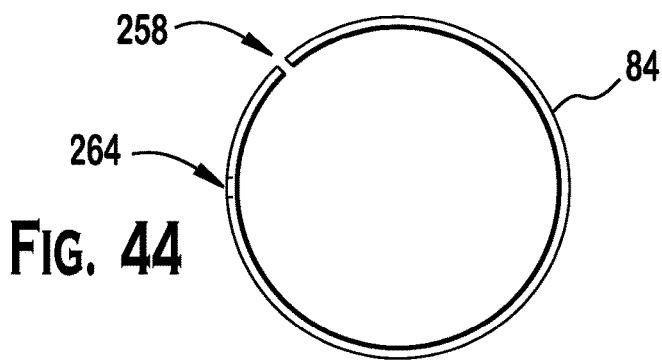
FIG. 44 is a cross-sectional view of the tube coupling of FIG. 43 along line 43-43.
Figure 45:
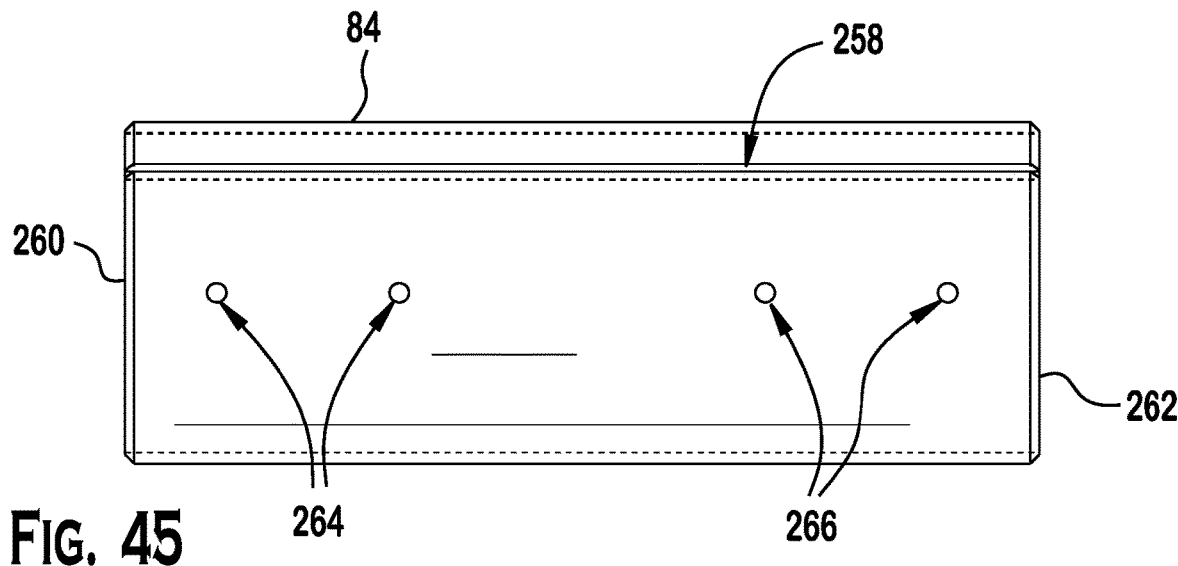
FIG. 45 is a side view of the tube coupling of FIG. 43.

Referring to FIGS. 43, 44 and 45, a coupling tube 84 may connect to the motor tube 82. The coupling tube 84 generally may be a hollow circular cylindrical member that includes a slot 258 which extends from one end 260 of the coupling member to the other end 262. A pair of fastener receiving holes 264, 266 may be situated near each end of the coupling tube. One fastener receiving hole may be spaced approximately 1.00 inch from the one end, and a second fastener receiving hole may be spaced approximately 2.00 inches from the one fastener receiving hole. The other end 262 may include the same fastener hole configuration. The coupling tube 84 may have an outer diameter of approximately 3.75 inches and an inner diameter of approximately 3.5 inches. In a preferred embodiment, the coupling tube 84 may have a length from the one end 260 to the other end 262 of approximately 10.0 inches and the slot may have a width of approximately 0.13 inches. Preferably, the coupling tube 84 may be formed from an aluminum alloy. Other metals or alloys, however, may be used for the coupling tube.

Figure 46:
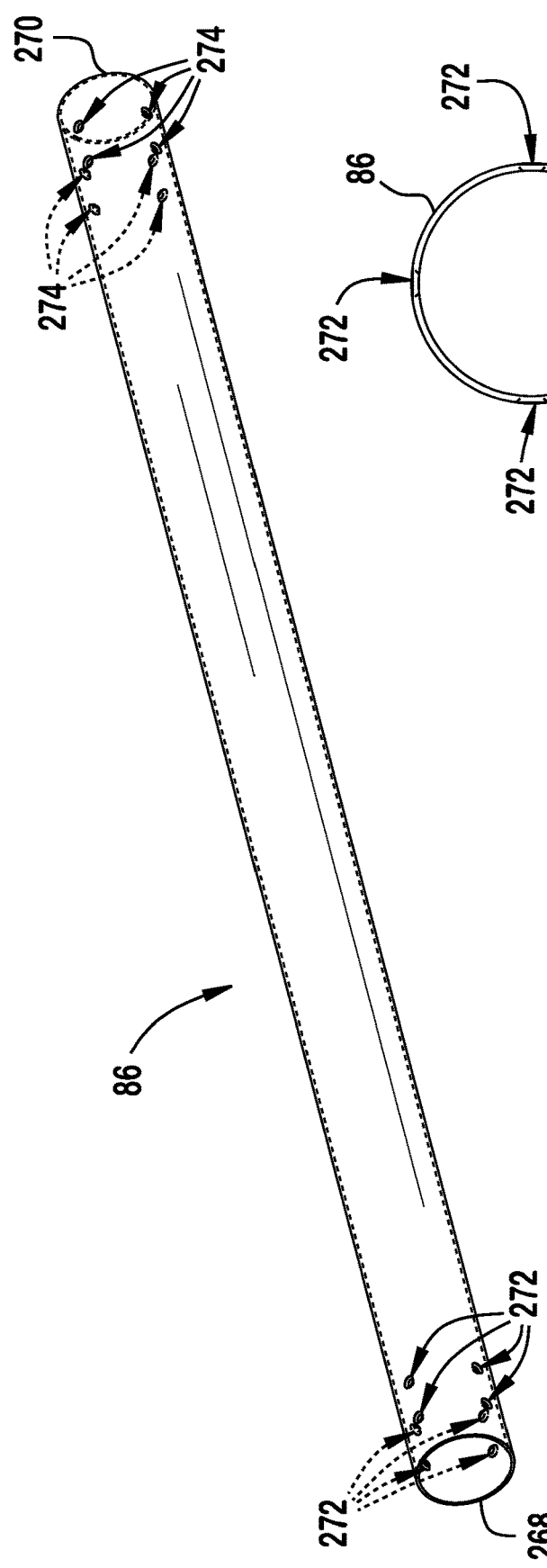
FIG. 46 shows a perspective view of a center tube of FIG. 2.
Figure 47:
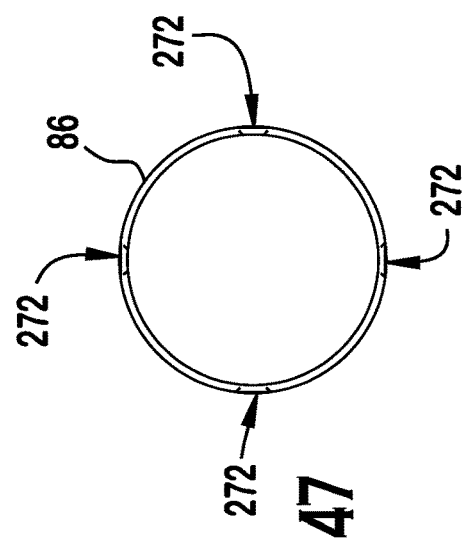
FIG. 47 is a cross-sectional view of the center tube of FIG. 46 along line 47-47.
Figure 48:
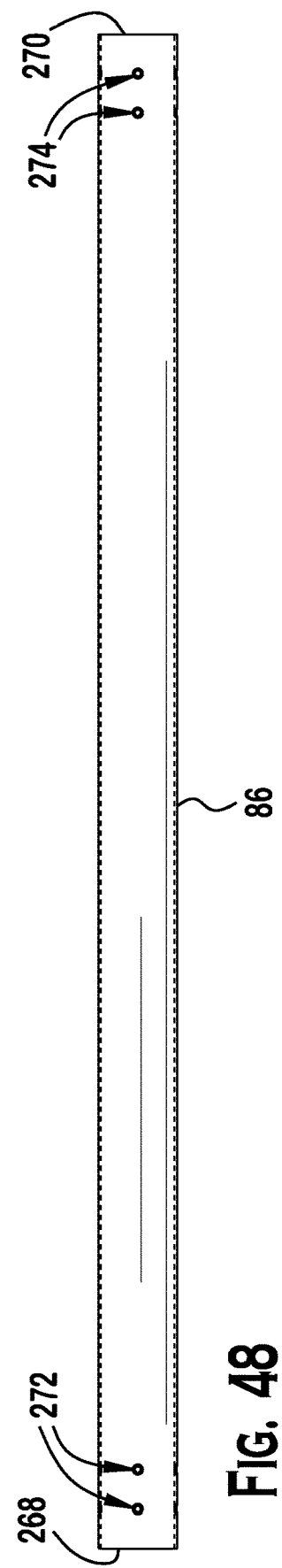
FIG. 48 is a side view of the center tube of FIG. 46.

Referring to FIGS. 46, 47 and 48, a center tube 86 may connect to the other side of the coupling tube 84. The center tube 86 may be a hollow circular cylindrical member. The center tube 86 may include a first end 268 and a second end 270. The first end 268 may include a first pair of fastener receiving holes 272. The second end 270 may include a second pair of fastener receiving holes 274. The center tube 86 may have an outer diameter of approximately 4.00 inches and an inner diameter of approximately 3.76 inches. In a preferred embodiment, the center tube 86 may have a length from the first end 268 to the second end 270 of approximately 95.5 inches. Preferably, the center tube 86 may be formed from carbon steel. Other metals or alloys, however, may be used for the center tube. The center tube 86 may be cut to length, used at its designated length, or connected with another coupling tube 84 for assembly with yet another center tube 86.

Figure 3:
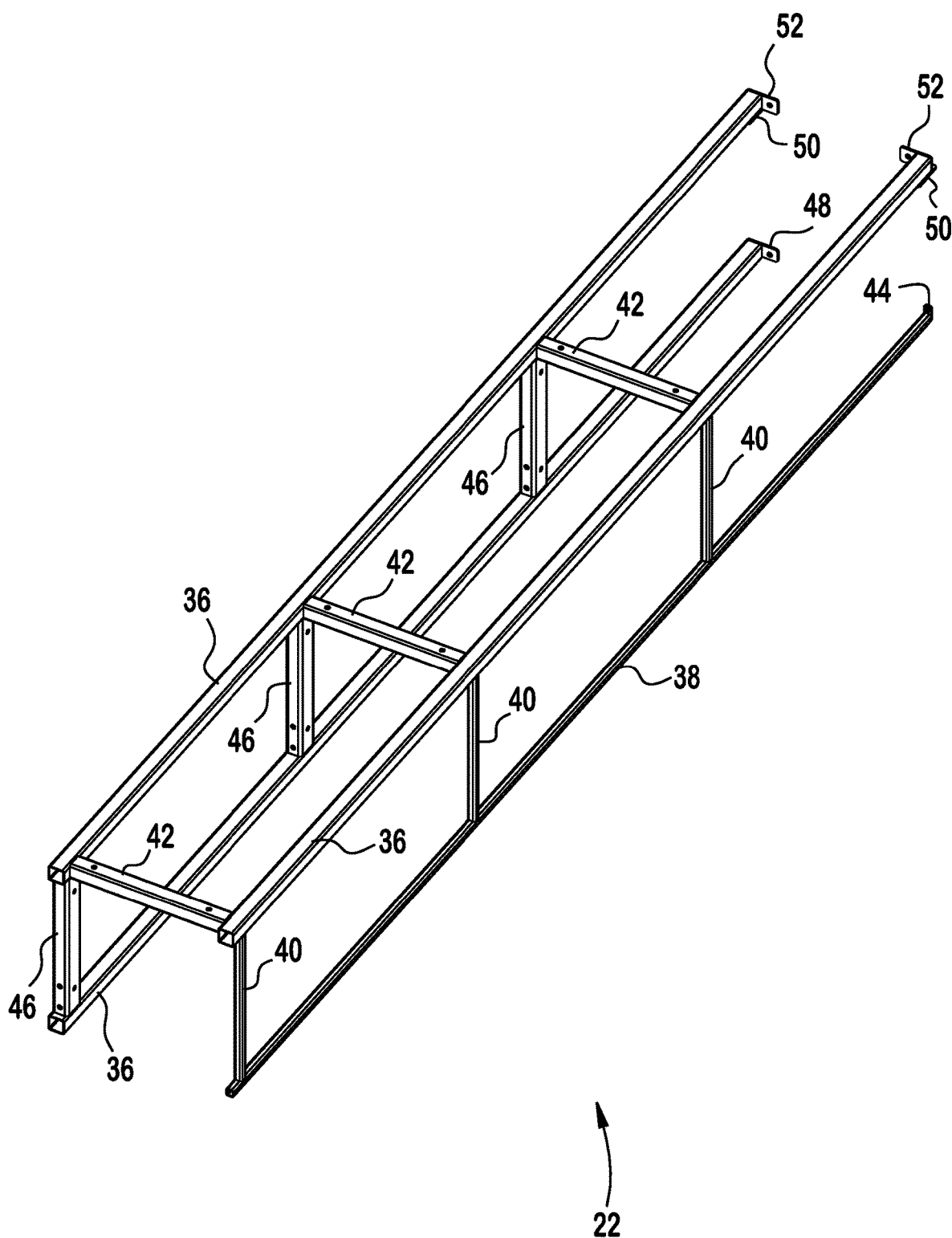
FIG. 3 is a perspective view of a base frame component of FIG. 2.
Figure 4:
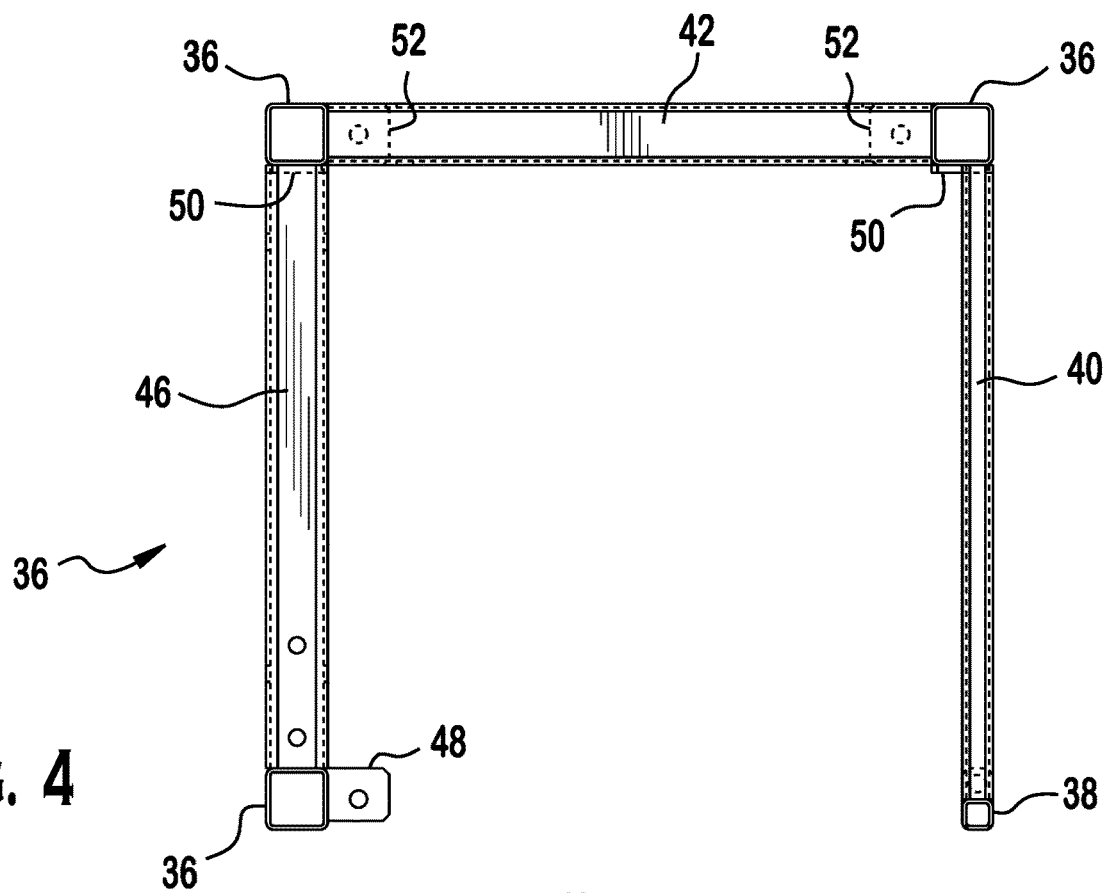
FIG. 4 is a left side view of the base frame component of FIG. 3.
Figure 5:
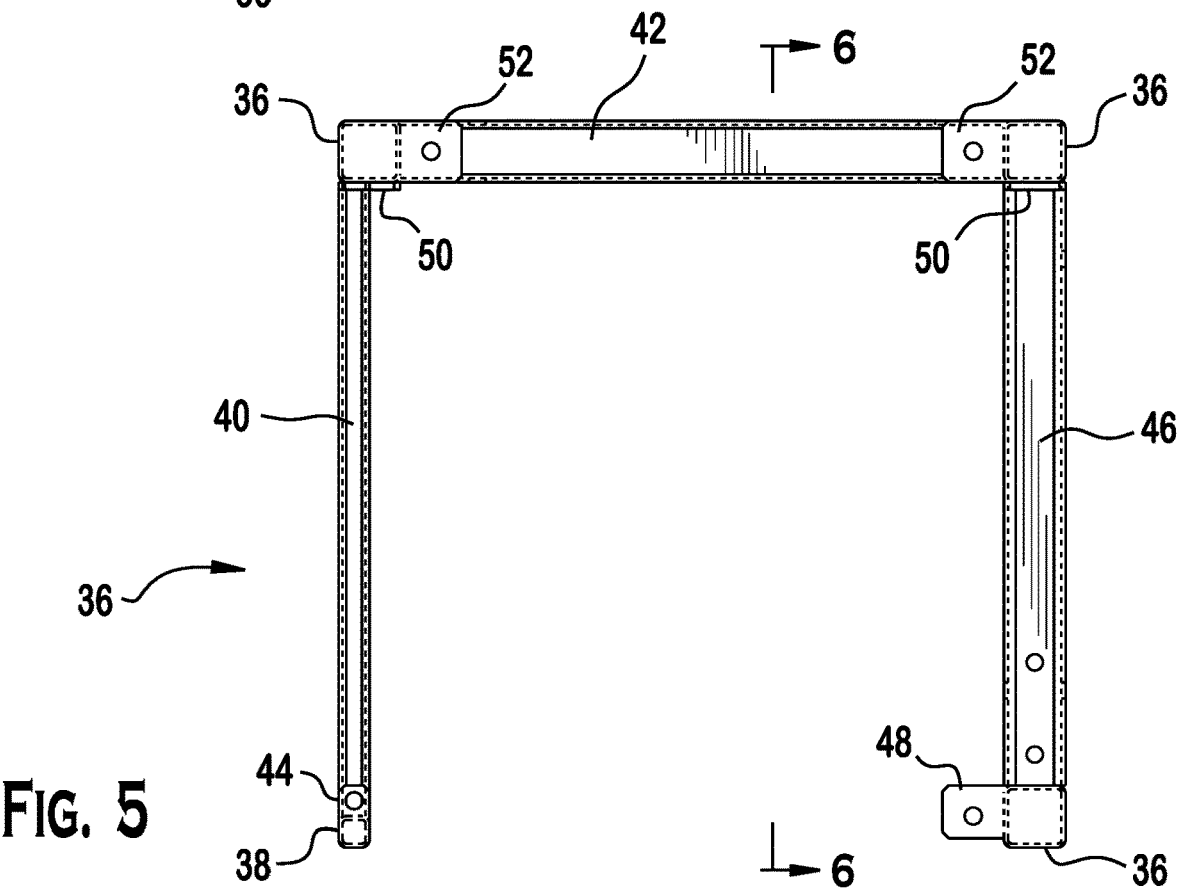
FIG. 5 is a right side view of the base frame component of FIG. 3.
Figure 6:
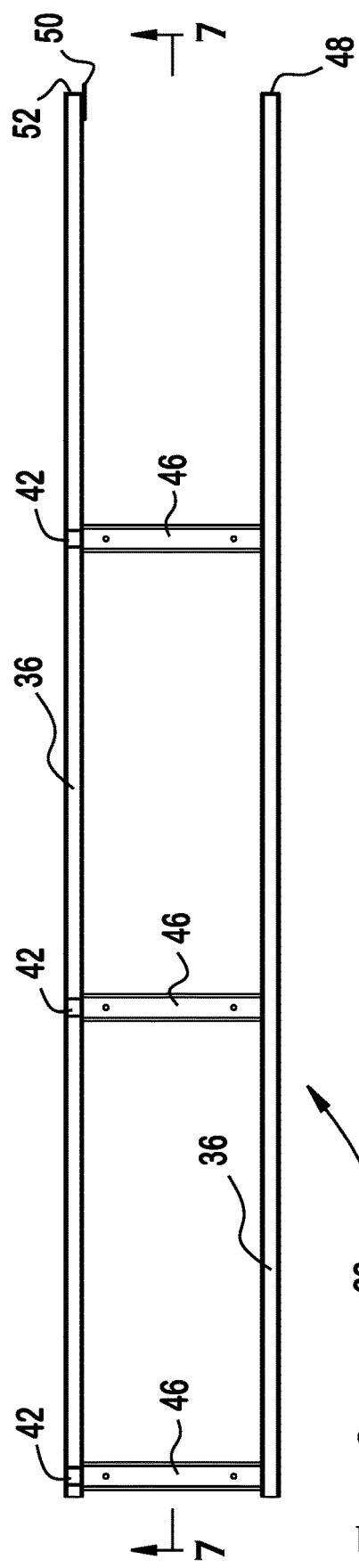
FIG. 6 is a cross-sectional view of the base frame component of FIG. 5 along line 6-6.
Figure 7:
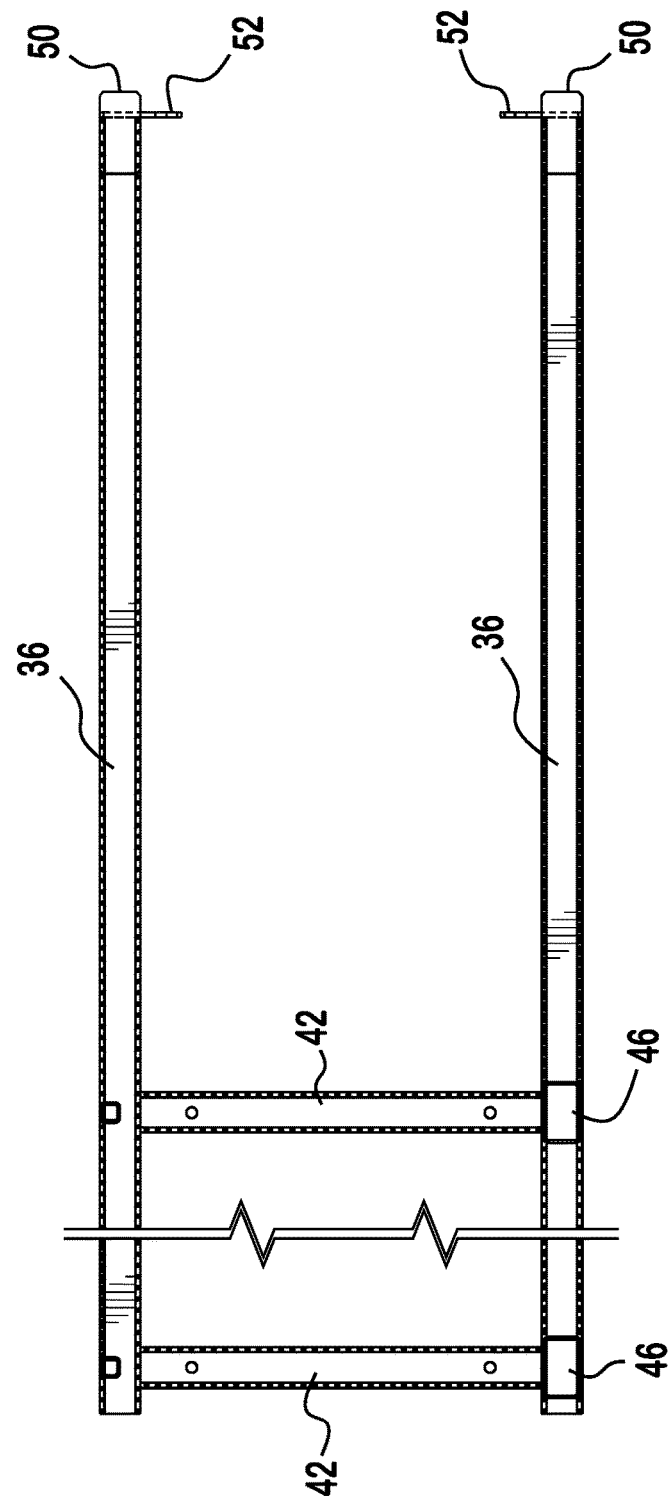
FIG. 7 is a cross-sectional view of the base frame component of FIG. 6 along line 7-7.
Figure 49:
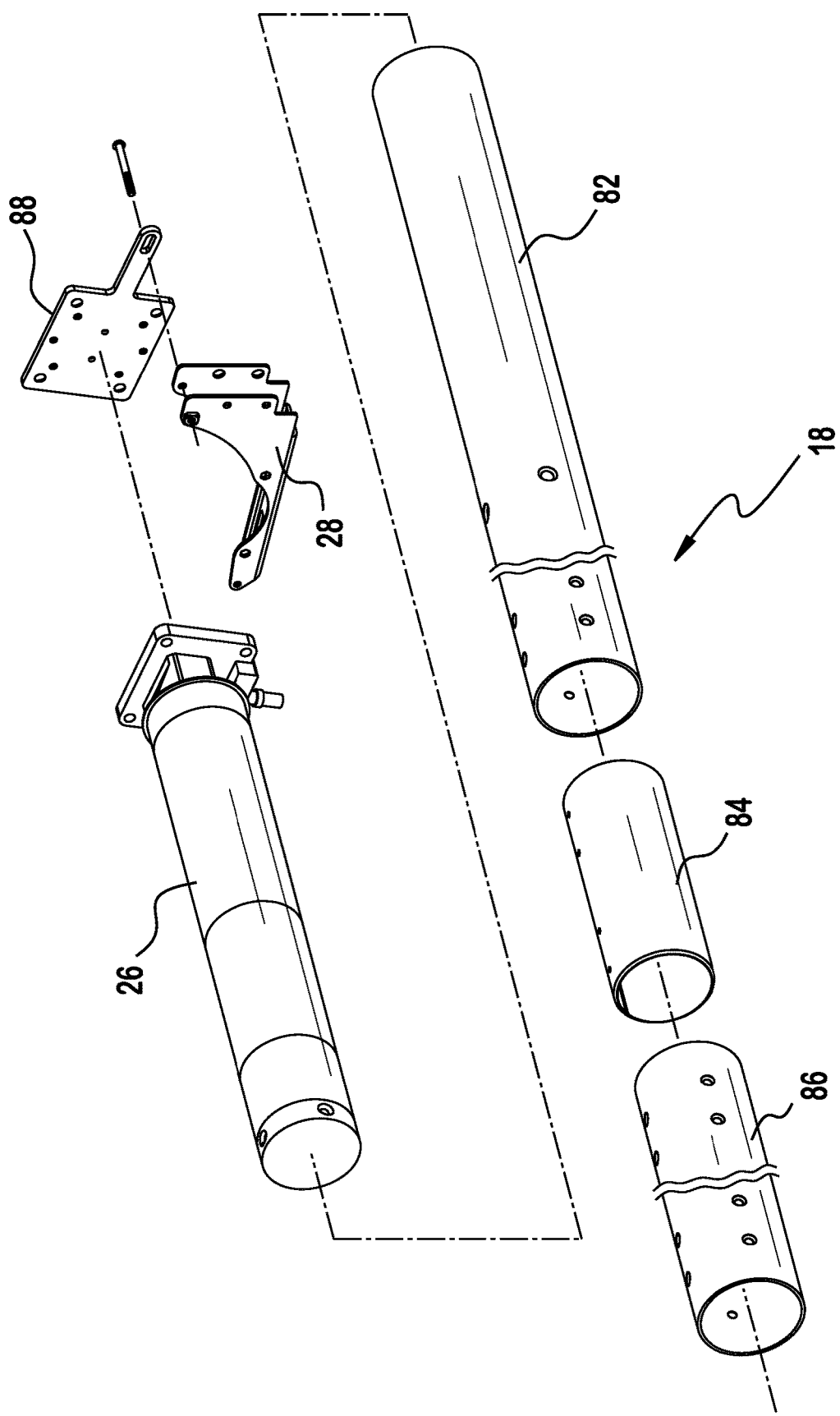
FIG. 49 shows an exploded view of a motor and tube assembly of FIG. 2.
Figure 57:
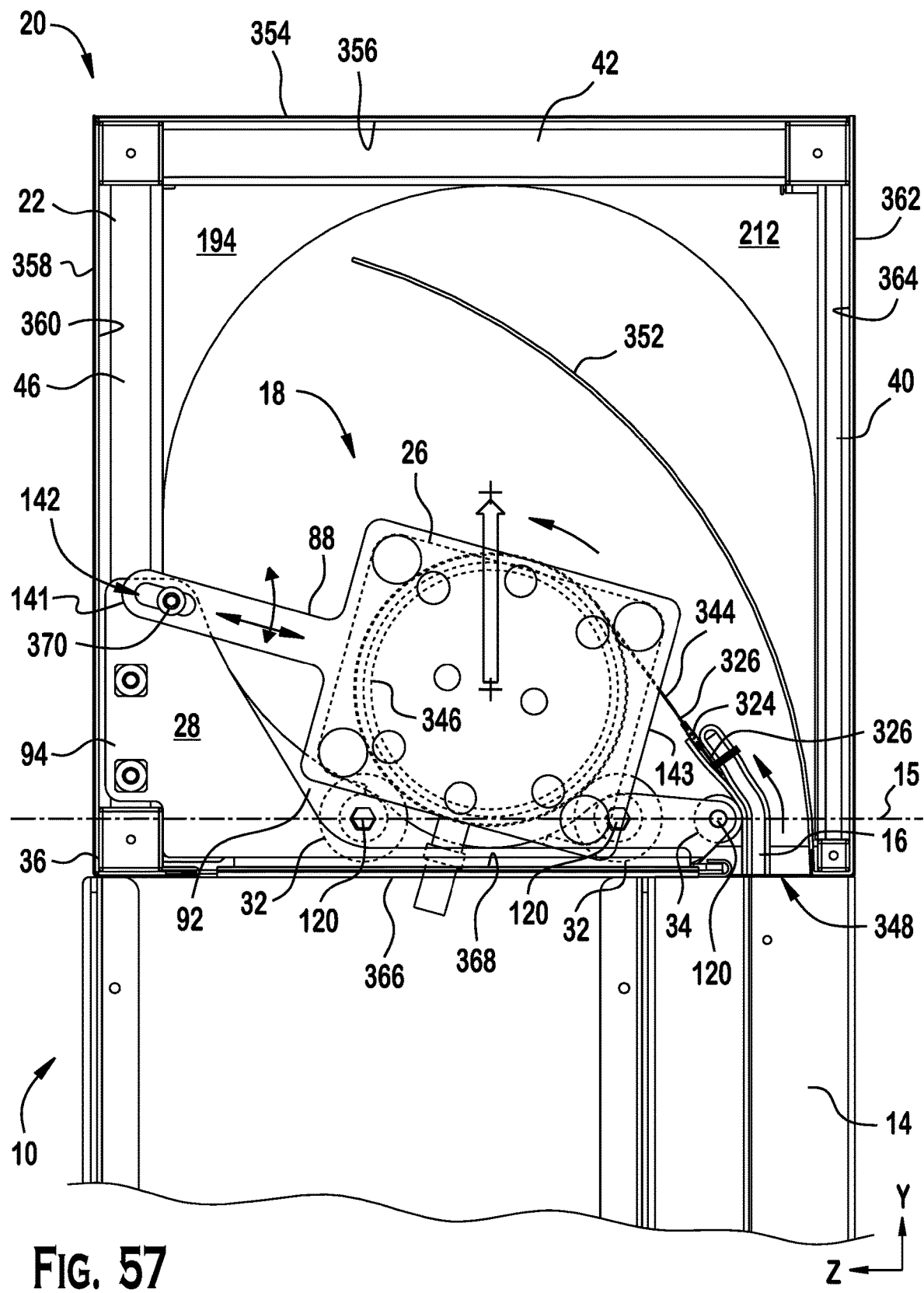
FIG. 57 shows a perspective view of components of the modular wall system of FIG. 1, with flexible barrier material.

Referring to FIG. 2 and FIG. 49, the roller system 18 may include a motor 26, a motor tube 82, a tube coupling 84, a center tube 86 and an anti-rotation arm 88. In one example, the motor 26 may be a 120 N-m tube motor. In another example, the motor 26 may be a 300 N-m tube motor. The motor 26 may be connected to the anti-rotation arm 88 with fasteners. The motor support arm 28 may be secured to the motor frame 22 with fasteners as well. Referring to FIG. 3 and FIG. 57, the motor support arm 28 may rest above a horizontal structural member 36 and wrap around an adjacent vertical structural member 46 located at the right side of the motor frame 22. The motor support arm 28 may be fixed to the motor frame 22 by one or more fasteners (e.g., threaded bolt and mating nut).

Figures 50, 51:
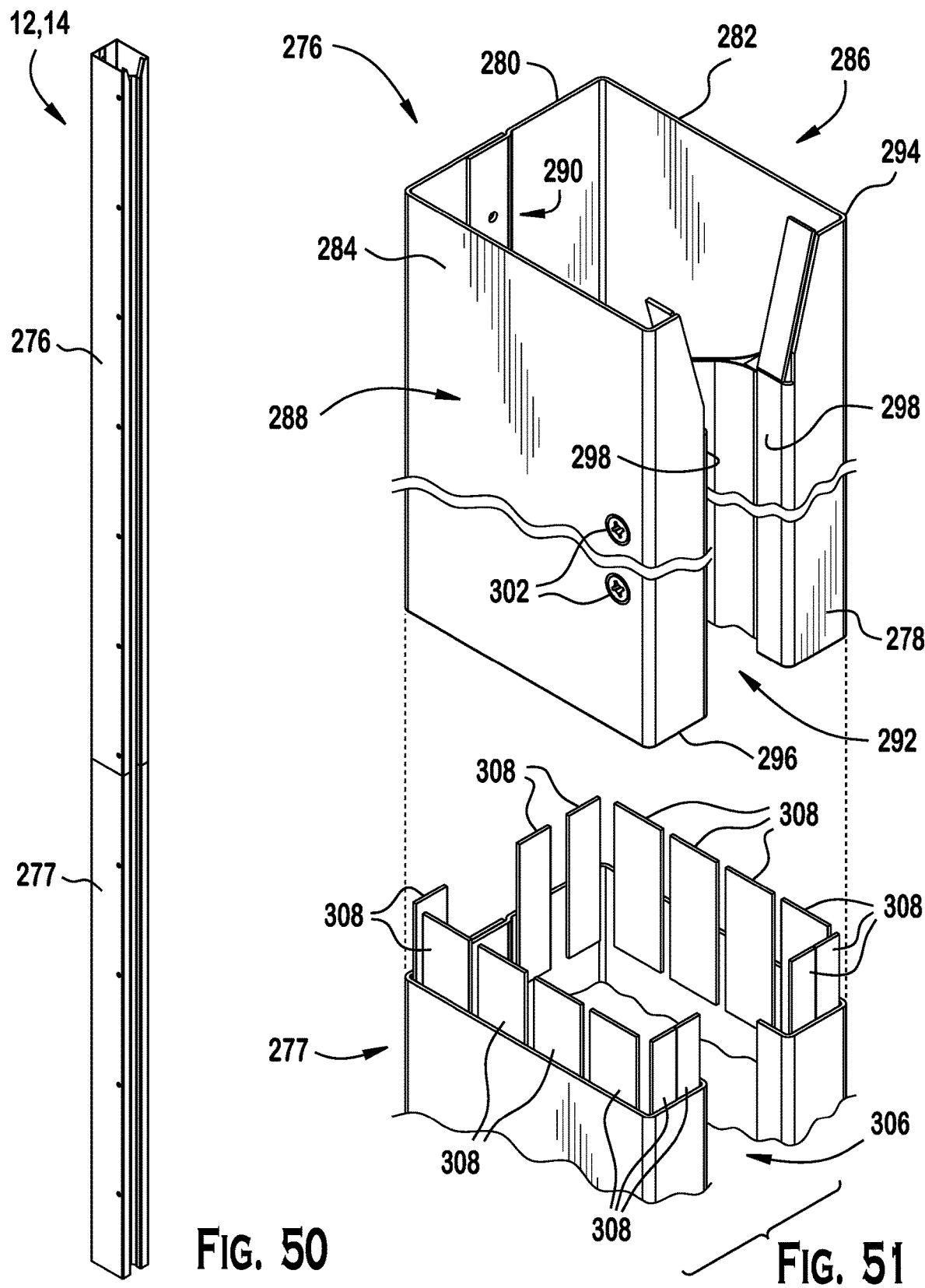
FIG. 50 shows a perspective view of an embodiment of a vertical track of FIG. 2.
FIG. 51 shows a partially exploded view of the vertical track of FIG. 50.

As shown in FIG. 1, the modular wall system 10 may include a first vertical post 12 and a second vertical post 14. Referring to FIG. 50 and FIG. 51, the first and second vertical posts 12, 14 may be constructed from an upper modular track section 276 and a lower modular track section 277. As shown in FIG. 51, the upper modular track section 276 may include a front side 278, a rear side 280, a port side 282, and a starboard side 284. The modular track section 276 may be constructed from two half-pieces 286, 288. The half-pieces 286, 288 may include a plurality of fastener receiving holes 290 on the rear side 280. Fasteners (not shown) may be advanced through the fastener receiving holes 290 to fix the half-pieces 286, 288 together and form a unitary structure. Additionally, the front side 278 of the upper modular track section 276 may include a slot 292. The slot 292 may extend from the top 294 of the upper modular track section to the bottom 296 of the upper modular track section 276. The slot 292 generally may have a fixed width, as well as smooth opposing faces 298. The width of the slot 292 may widen near the top 294 of the upper modular track section from a generally fixed width at the bottom 296 of the modular track. The upper modular track section 276 further may include an insert or resilient flap 300 adjacent each side of the slot 292. The insert or resilient flap 300 may be fastened to each respective half-piece 286, 288 with one or more screws 302, rivets or another fastening system. The lower modular track 304 section may be substantially the same as the upper modular track section 276, except that the slot may have a fixed width along the entire length of the track. Also, the top of the lower modular track 304 section may include a plurality of tabs 308 which may be received within the bottom 296 of the upper modular track section 278 to form a single track. The upper modular track section 276 and the lower modular track section 304 may be formed from carbon steel. Other metals or alloys, however, may be used for the upper and lower modular track sections. The upper modular track section 276 may be cut to length to provide a custom length single track.

Figure 69:
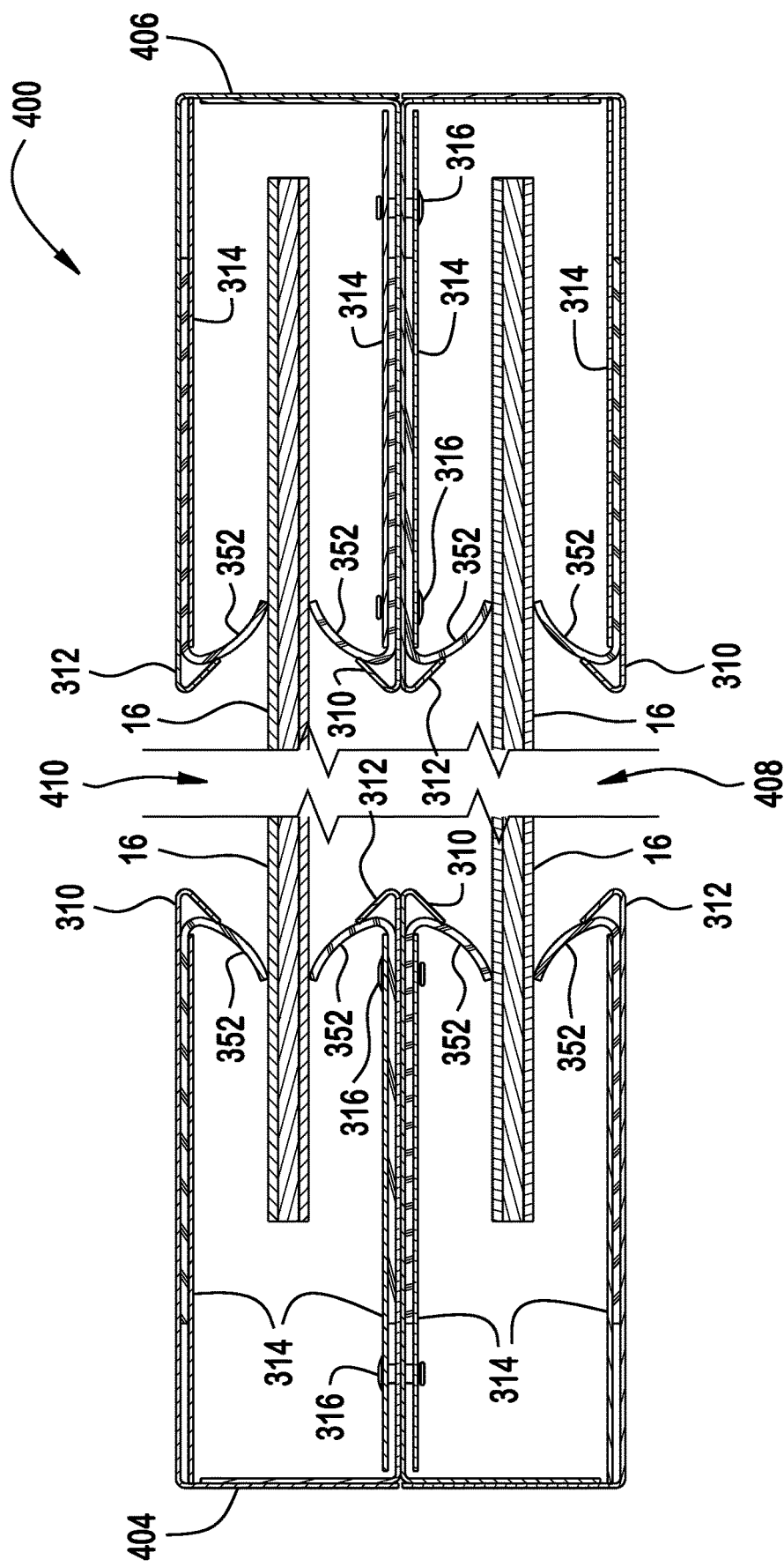
FIG. 69 is a cross-sectional view of components of the modular wall system of FIG. 64 along line 69-69.

Referring to FIG. 69, in another embodiment, the first and second vertical posts 12, 14 may be constructed from a port side half-piece 310 and a starboard side half-piece 312. Additionally, the first and second vertical posts 12, 14 may include one interior panel 314 secured to the port side half-piece 310 and another interior panel 314 secured to the starboard side half-piece 312. For example, the interior panel 314 may be secured with a screw or rivet 316 to the port side half-piece 310 or starboard side half-piece 312. Insulation material 352 may be disposed between the interior panel 314 and a respective half-piece 310, 312. For example, the insulation material may be a sheet of mass loaded vinyl.

Figure 53:
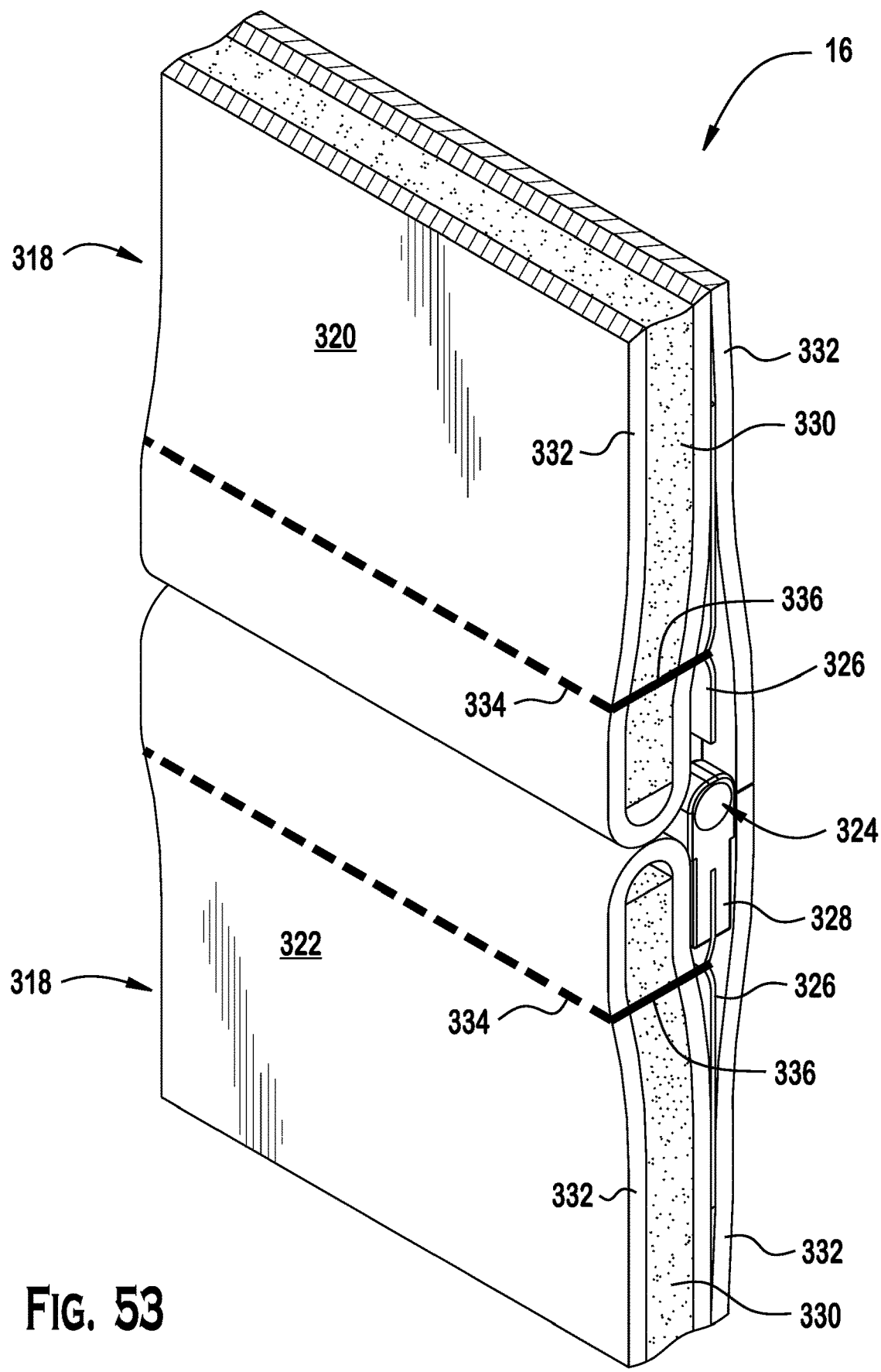
FIG. 53 shows a front, right side perspective view of an embodiment of a composite screen or flexible barrier material for use with the roll-up wall system of FIG. 2.

As shown in FIG. 1, the screen (or flexible barrier material) 16 of the modular wall system 10 may be formed from one or more segments or panels 318. For example, the screen 16 may be formed from an upper panel 320 and a lower panel 322. As shown in FIGS. 53, 54 and 55, two panels 318 may be fastened together using mechanical fasteners. For example, two panels 318 may be joined together by a zipper chain 324, as each panel 318 may include a zipper ribbon 326 with zipper teeth 328. Also, each panel 318 may include a mass loaded vinyl core 330 and a felt overlay 332.

Figure 52:
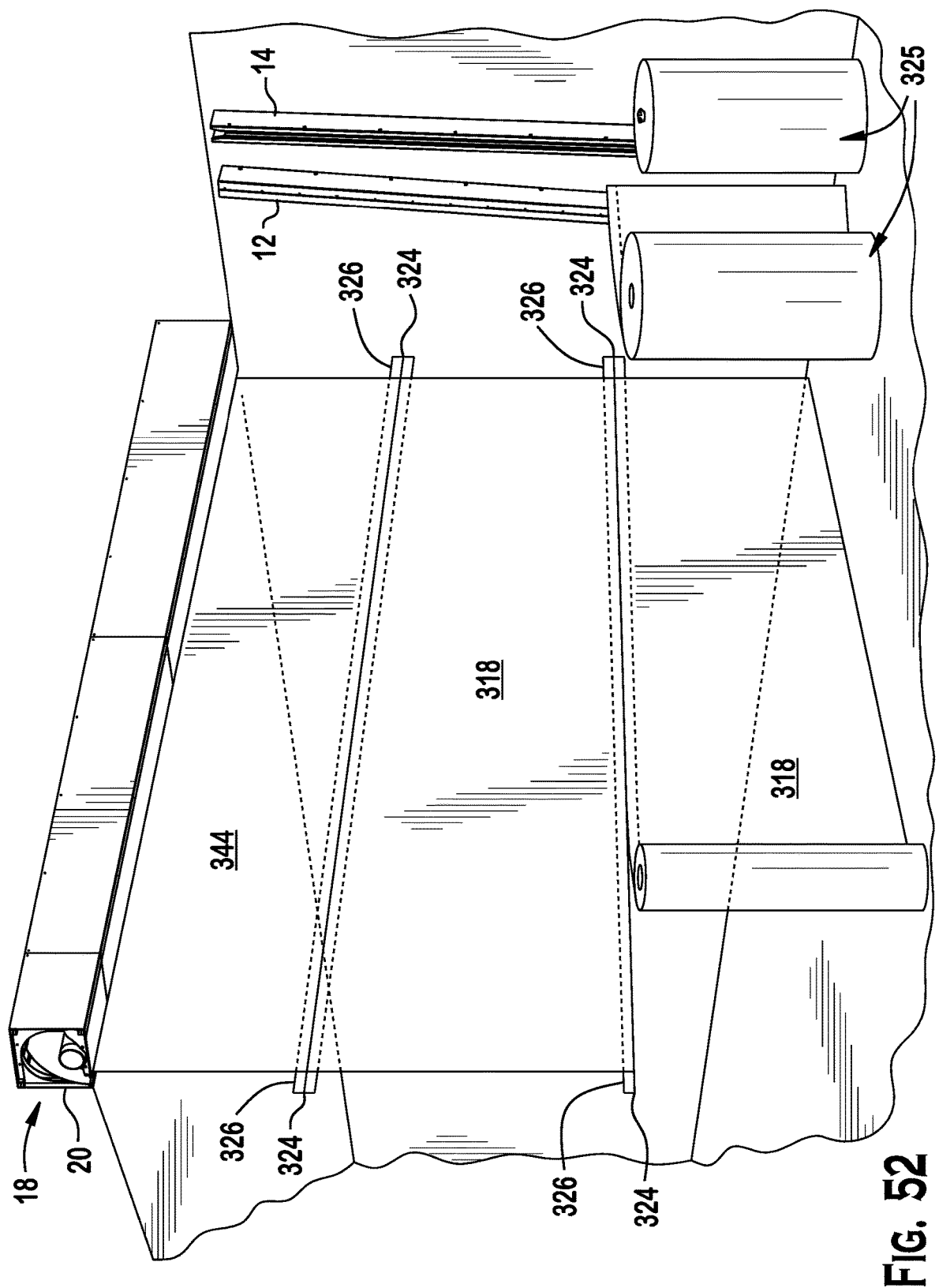
FIG. 52 is a perspective view of components of the modular wall system of FIG. 1, including uninstalled rolls of flexible barrier material.

Referring to FIG. 52, a screen or flexible barrier material 16 for a modular wall system 10 may be constructed from two or more rolls 325 of flexible barrier member segments or panels 318. In one embodiment, the flexible barrier material 16 may be constructed from mass loaded vinyl (e.g., 0.5 to 3 lbs./sf) which is wrapped in felt. As described further with respect to FIGS. 53, 54 and 55, the felt and mass loaded vinyl may be bonded together with adhesive and stitched together to form a flexible barrier material that may be fashioned into a wall segment or panel 318. Each wall segment 318 further may include a zipper ribbon 326 along one or more edges. Also, a wall segment or panel 318 further may include another layer of material on the finish side of the wall segment. For example, a vinyl layer material with a graphic print may be applied to the finish side of the wall segment. (See e.g., FIG. 1). Thus, in one embodiment the flexible barrier material 16 may include a vinyl fabric that is capable of receiving a print design. Also, in another embodiment, the flexible barrier material 16 may include a different outer layer of fabric (e.g., cotton, polyester, or rayon). As illustrated in FIG. 52, each wall segment or panel 318 may be packaged for transport as a shrink-wrapped roll. For example, a wall segment or panel 318 may be unfurled, covered by a sheet of brown packaging paper, wound into a roll, and shrink wrapped. The roll further may be marked with identifying indicia.

Referring to FIGS. 53, 54 and 55, the mass loaded vinyl 330 may be one pound per square foot sheet of flexible mass loaded vinyl (e.g., B-10 R Noise Barrier manufactured by Sound Seal, Inc. of Agawam, Mass.) 16. The mass loaded vinyl may be a flexible, reinforced loaded vinyl noise barrier with a nominal thickness of approximately 0.130 inches. The mass loaded vinyl may have a tensile strength of approximately 1470 pounds per square inch per ASTM D638. The mass loaded vinyl may have hardness of approximately 85+/−3, shore "A" per ASTM D2240. In other examples, without limitation, the mass loaded vinyl may be a one and one-half pound per square foot sheet of flexible mass loaded vinyl, or a two pound per square foot sheet of flexible mass loaded vinyl. Additionally, the felt 332—which generally is a textile material that is produced by matting, condensing and pressing fibers together—may be made of natural fibers such as wool, or from synthetic fibers such as petroleum-based acrylic or acrylonitrile or wood pulp-based rayon. Blended fibers may also be used.

A wall segment or panel 318 may be constructed by rolling a sheet of felt material 332 out on a flat surface. A sheet of mass loaded vinyl 330 may then be placed over the felt material. The mass loaded vinyl material may be positioned such that the felt material extends beyond the limits of the mass loaded vinyl sheet. An adhesive material may be uniformly applied to the exposed surface of the mass loaded vinyl sheet. One suitable adhesive for bonding the mass loaded vinyl and felt fabric is a water based adhesive having product code WZ-0866 manufactured by Worthen Industries, 3 E. Spit Brook Road, Nashua, N.H. 03060. The adhesive may be a milky white liquid having a specific gravity of 1.0304.

Each wall segment 318 may include a zipper ribbon 326. Felt material 332 on one end of the mass loaded vinyl sheet 330 may then be fold around the mass loaded vinyl and adhered to the exposed surface of the mass loaded vinyl. For example, the felt material may be folded over to form a band several inches thick on one end of the exposed surface of the mass loaded vinyl sheet. The same roll of felt material may then be folded over the opposite end of the mass loaded vinyl sheet and adhered to the remaining surface of the exposed mass loaded vinyl sheet. The felt from the opposite end of the mass loaded vinyl sheet may overlap the band of felt at one end of the mass loaded vinyl sheet. A zipper ribbon 326 may then be positioned along the band of felt and heat welded or adhesively secured to the felt band. The zipper teeth 328 may extend beyond the edge of the felt covered mass loaded vinyl sheet such that when it is connected to a mating zipper teeth of an abutting wall segment or panel 318, the edges of the panels 318 may touch.

Wall segments 318 may be joined by mating zipper teeth 328 at one respective edge of each segment or panel. The felt from the opposite end of the mass loaded vinyl may be trimmed such that the felt material extends to roughly the end of the zipper. Nylon (or other suitable material) stitching 334 may then be used to sew the layers of material together. The stitching 334 may include one or more rows. The stitching may extend around the side edges 334 of the panel. The felt and mass loaded vinyl may be bonded together with adhesive and stitched together to create a wall segment. A screen or flexible barrier material 16 for a roll-up wall may be formed from one or more segments.

As depicted in FIG. 1, a wall segment or panel 318 may include another outer layer of material. For example, a layer of a vinyl material 338 with a graphic print 340 may be applied to the vinyl exterior of the wall segment. In another example, the other layer of material may be a fabric (e.g., cotton, polyester, or rayon) or suitable wall paper. In yet another embodiment, the flexible barrier material 16 may be a vinyl fabric that is capable of receiving a print design.

Referring to FIG. 57, the frame 20 of a modular wall system 10 may be pre-assembled and transported to the site where the modular wall system is to be erected. The frame 20 may include a motor frame 22, a motor support arm 28, and a support arm 30 spaced (e.g., every 24 inches) along the longitudinal axis of the frame. The motor support arm 28 may be fastened to the port side vertical support member 46 of the motor frame 22. The support arms 30 may be fastened to the remaining vertical support members 46 of the motor frame 22. The starboard side support member (see e.g., FIG. 2) may be fastened to an end support 342 (not shown) that may be constructed from the rear end support 194 and front end support 212 as described above (see e.g., FIG. 2, FIG. 30 and FIG. 35).

A smaller diameter roller (e.g., 0.75 diameter roller) 34 may be positioned between the motor support arm 28 and the adjacent support arm 30. For example, one end of the spindle 120 of the smaller diameter roller 34 may be positioned within the spindle receiving bore 116 of the motor support arm 28 and the other end of the spindle 120 may be within the spindle receiving bore 186 of the support arm 30. Additionally, one end of the spindle 120 of each larger diameter roller 32 may be positioned within a spindle receiving bore 116 of the motor support arm 28 and the other end of each spindle 120 may be within an opposing spindle receiving bore 186 of the support arm 30. A tube assembly 18 may be positioned on the large diameter rollers 32 such that the motor tube 82 is adjacent to the port side of the frame 20. The motor 26 may be partially received within and fastened to the motor tube 82. The motor 26 further may be secured to the anti-rotation arm 88 by fasteners attached to motor fastener receiving holes 146. The anti-rotation arm 88 further may be secured to the motor support arm 28 by a fastener passing through a fastener receiving hole 126 (see e.g., FIG. 9) on the exterior bracket 94 of the motor support arm 28, the frame securement opening 142 of the anti-rotation arm 88, and a fastener receiving hole 112 on the interior bracket 92 of the motor support arm 28.

Figure 58:
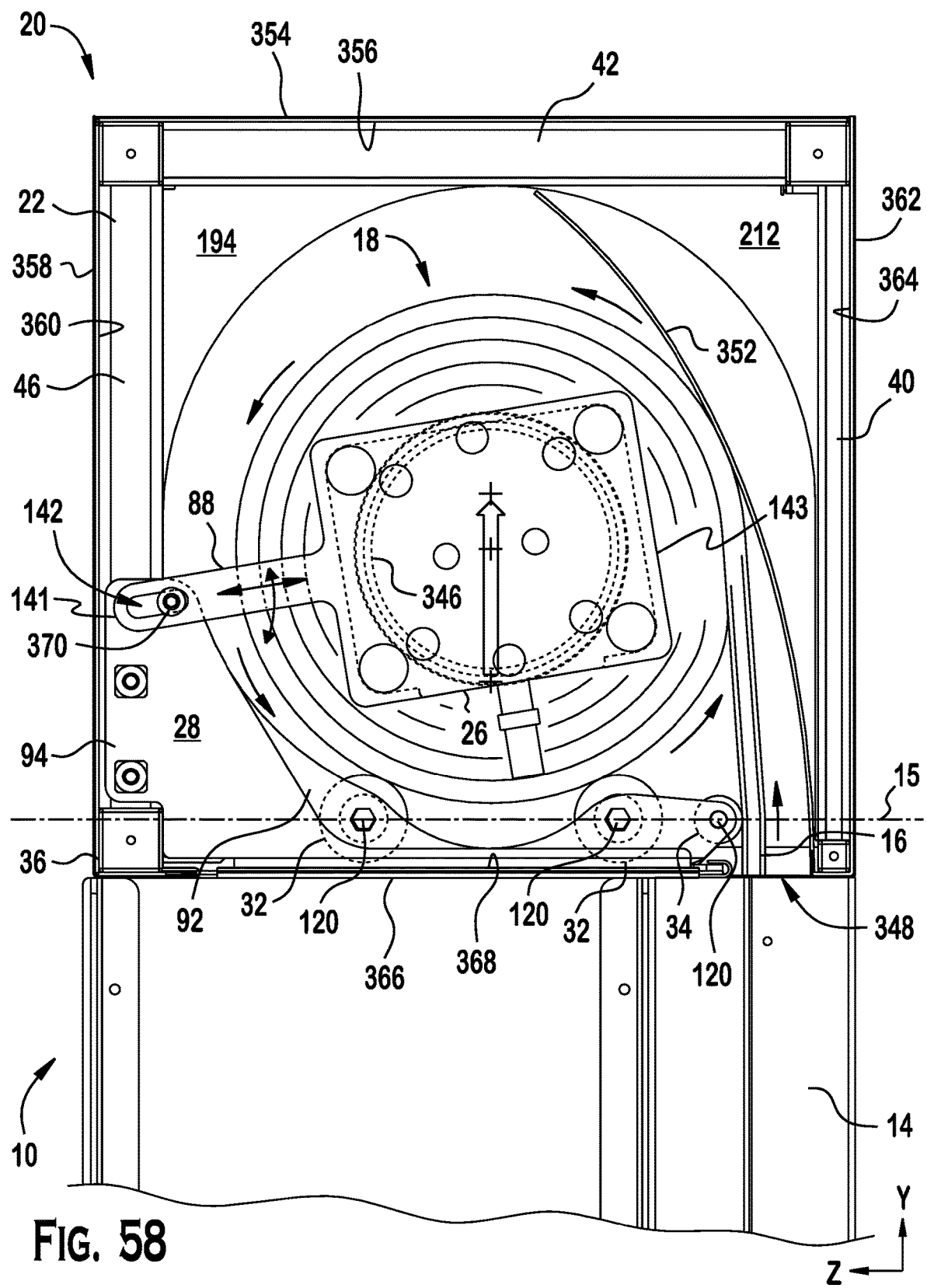
FIG. 58 shows a side view of components of the modular wall system of FIG. 1, with flexible barrier material in a raised configuration.

Referring to FIG. 57, the flexible barrier material 16 may be connected to the tube assembly 18 via a banner 344 of vinyl material that is wound on to the tube 346. Notably, the tube 346 may include a motor tube 82 and one or more tube coupling 84 and center tube 86 extensions. In this fashion, the width of the tube 346 (and hence the roll-up wall) may be adapted and extended to fit a custom sized opening. The banner 344 may include a zipper ribbon 324 along one of the long edges of the banner. The zipper teeth 328 of the banner 344 and the zipper teeth 328 of the adjacent flexible barrier material segment or panel 318 may be interlocked with a zipper pull (not shown) to form a zipper chain 324. In FIG. 57 and FIG. 58, spindles 120 of the 1.375-inch rollers 32 are arranged in a plane (e.g., a first plane) 15. In this embodiment, the plane 15 is parallel to the X-Z plane.

Referring to FIG. 2 and FIG. 58, the modular wall system 10 may include a sound or vibration reducing flap 352, a top cover 354 and insulation panel 356, a rear cover 358 and insulation panel 360, a front cover 362 and insulation material 364, and a bottom cover 366 and insulation material 368. Generally, the cover panels may be fabricated from sheet metal, and the insulation material may be cut to size and secured to the interior surface of each respective sheet metal cover with adhesive. The sheet metal cover panels further may be powder coated. The insulation may be cut from a sheet of mass loaded vinyl.

Referring to FIGS. 58 and 59, the screen or flexible barrier membrane 16 may be wound around the tube 346. The flexible barrier material 16 may pass through a screen feed gap 348 in the frame 20. The take-up roll 350 of flexible barrier material 16 may rest on the two larger dimeter rollers 32 that are secured to the frame 20. As the frame 20 may be secured above the structural opening in which modular wall system is to be installed, the modular wall system 10 may span longer distances than may otherwise be feasible because the tube 346 is supported along its length. Moreover, a smaller diameter roller 34 may be positioned to feed and unwind the flexible barrier material 16 from the tube 346. The anti-rotation arm 88 may oscillate about the fastener 370 that secures the anti-rotation arm 88 to the frame 22. Movement of the anti-rotation arm 88 may include rotation or translation of the anti-rotation arm 88 with respect to the fastener 370. The front and rear apertures 104, 106 of the motor bracket may provide access for electrical wires, including electrical wires that may power or control the motor. Generally, the motor may range from an approximately 120 N-m torque tube motor to an approximately 300 N-m torque tube motor.

Figure 62:
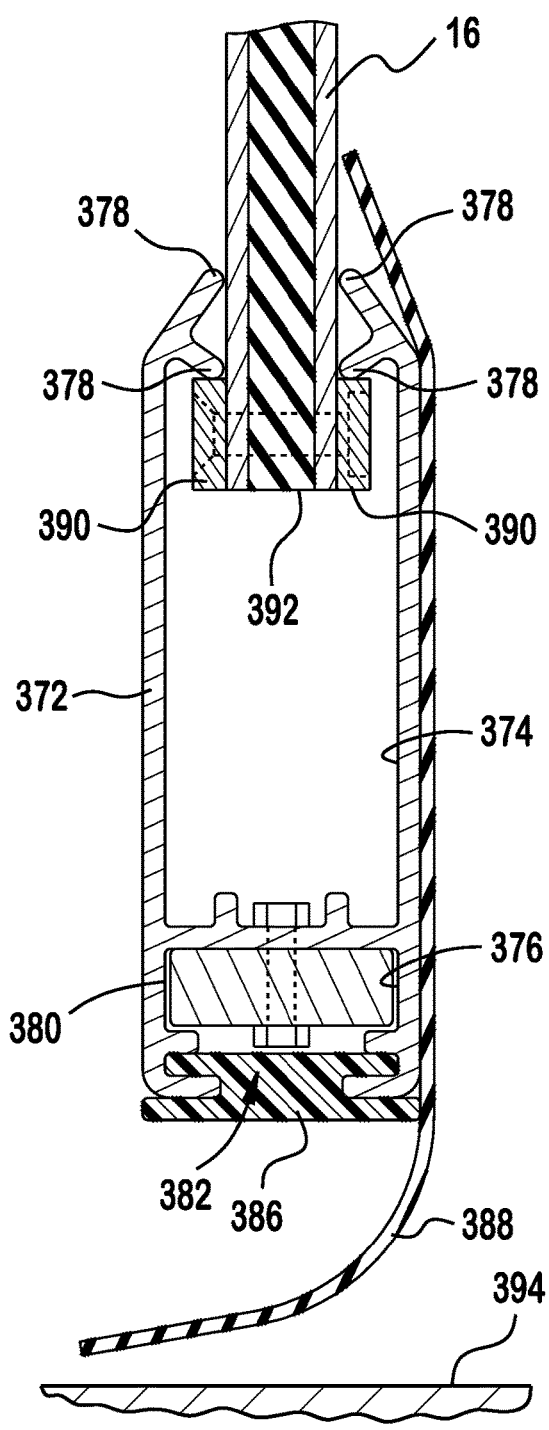
FIG. 62 shows a sectional view of the self-adjusting lateral track of FIG. 60 along line 62-62.
Figure 63:
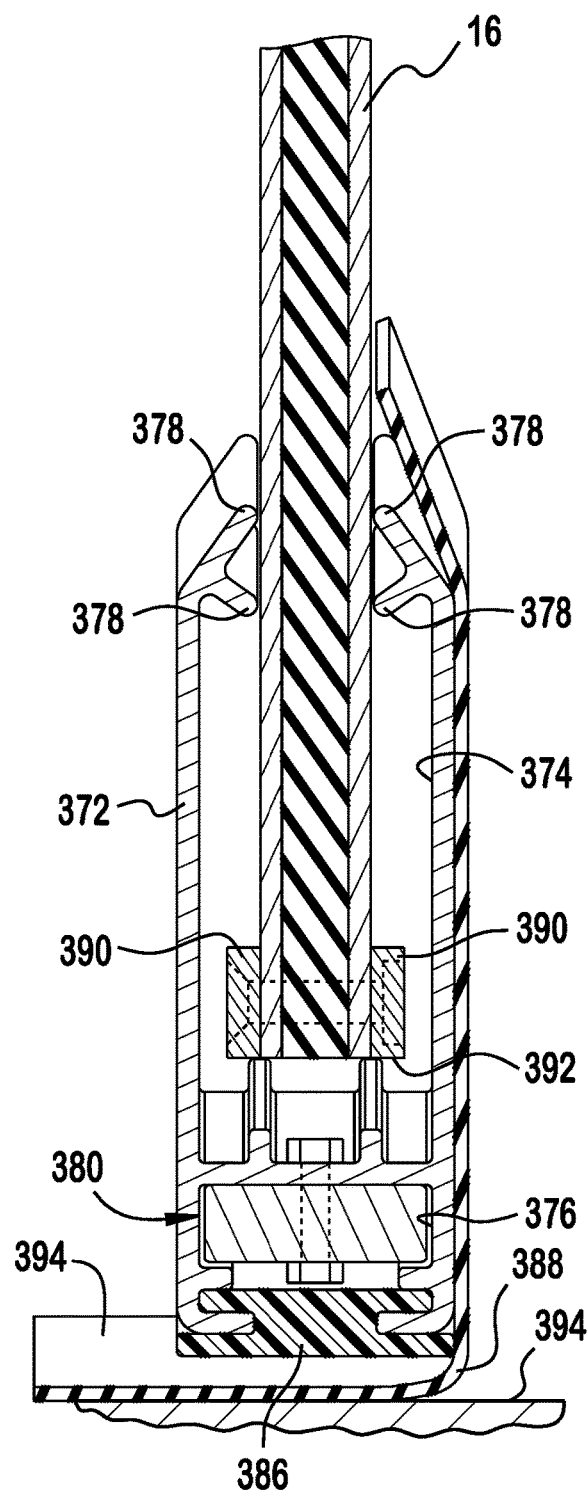
FIG. 63 shows a sectional view of the self-adjusting lateral track of FIG. 63 along line 63-63.
Figure 64:
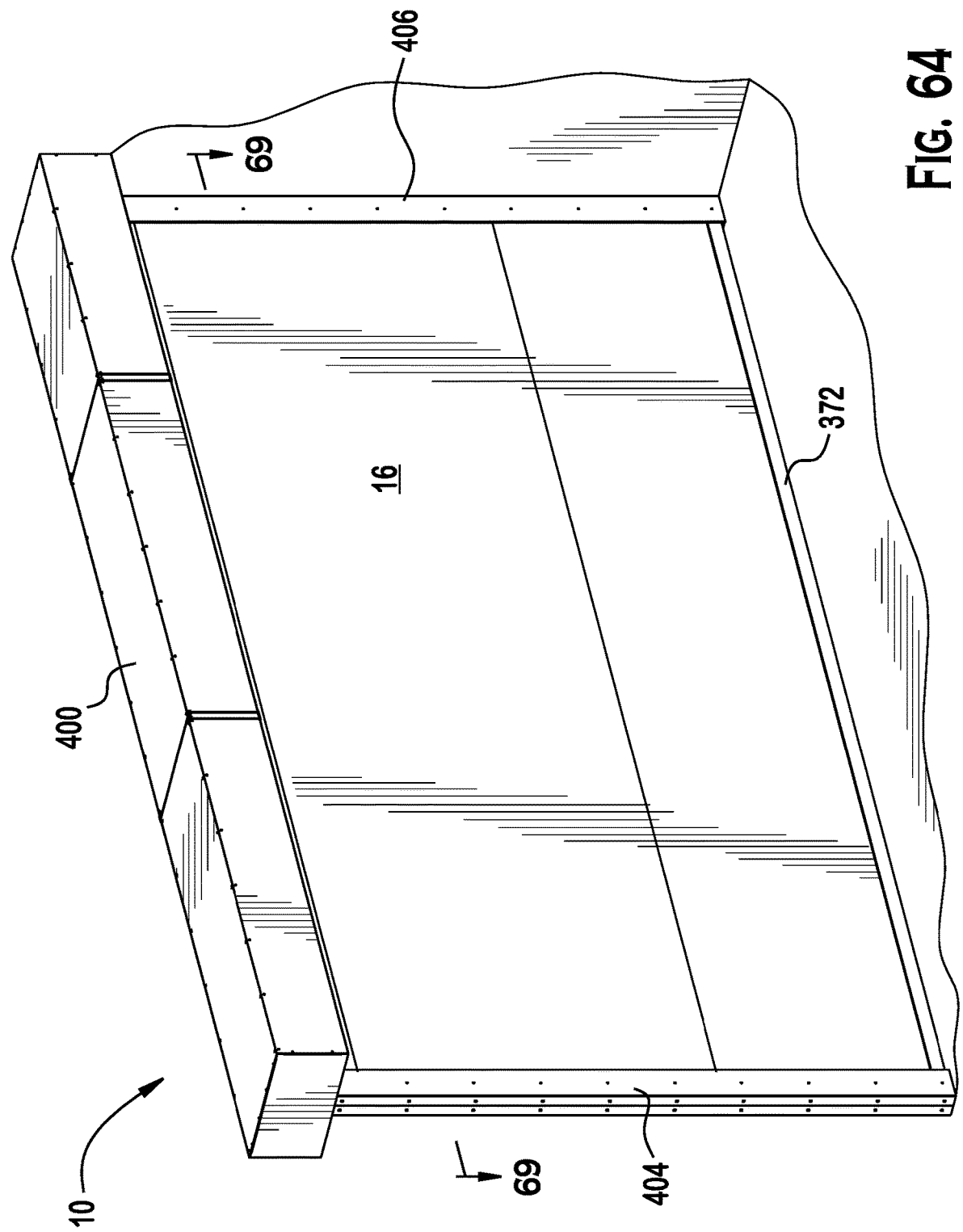
FIG. 64 is a perspective view of another embodiment of a modular wall system in accordance with the present invention.

Referring to FIG. 60 and FIG. 61, the modular wall system 10 may include a lateral track 372. As shown in FIG. 62 and FIG. 63, the lateral track may include an upward facing channel 374 and a downward facing channel 376. The upward facing channel 374 may include opposing fingers 378 which may contact the flexible barrier material 16. Additionally, the downward facing channel 376 may include an interior pocket 380 and a lower pocket 382. The interior pocket 380 may receive a weight bar 384. The weight bar 384 may be a steel bar. The weight bar 384 may weigh approximately three-quarter pounds per square foot. The lower pocket 382 may receive a brush or a bulb seal 386. One side of the lateral track 372 may include a membrane seal 388. The membrane seal 388 may be a strip of mass loaded vinyl or other material. The flexible barrier material 16 may be received in the upward facing channel 374. Steel bars 390 may be fixed to the opposite sides of the bottom edge of the flexible barrier material 16. The steel bars 390 may be bolted together with the flexible barrier material 16 disposed between the steel bars 390. Each steel bar 390 may weigh approximately one-half pound per square foot.

As shown in FIG. 62, when the lateral track 372 is in a raised configuration the steel bars 390 affixed to the flexible barrier material 16 contact the opposing fingers 378 to prevent the flexible membrane material 16 from exiting the upward facing channel 374. Instead, the lateral track 372 hangs from the steel bars 390. By contrast, when the lateral track 372 is in a lowered configuration the steel bars 390 and the bottom edge 392 of the flexible barrier material 16 are positioned inside the upward facing channel 374 below the opposing fingers 378. In this manner, the steel bars 390 may maintain tension in the flexible barrier material 16, may assist in lowering the roll-up wall, and may cooperate with the lateral track 372 to self-adjust to an unlevel surface 394 when the roll-up wall is lowered, as shown in FIG. 61.

Figure 65:
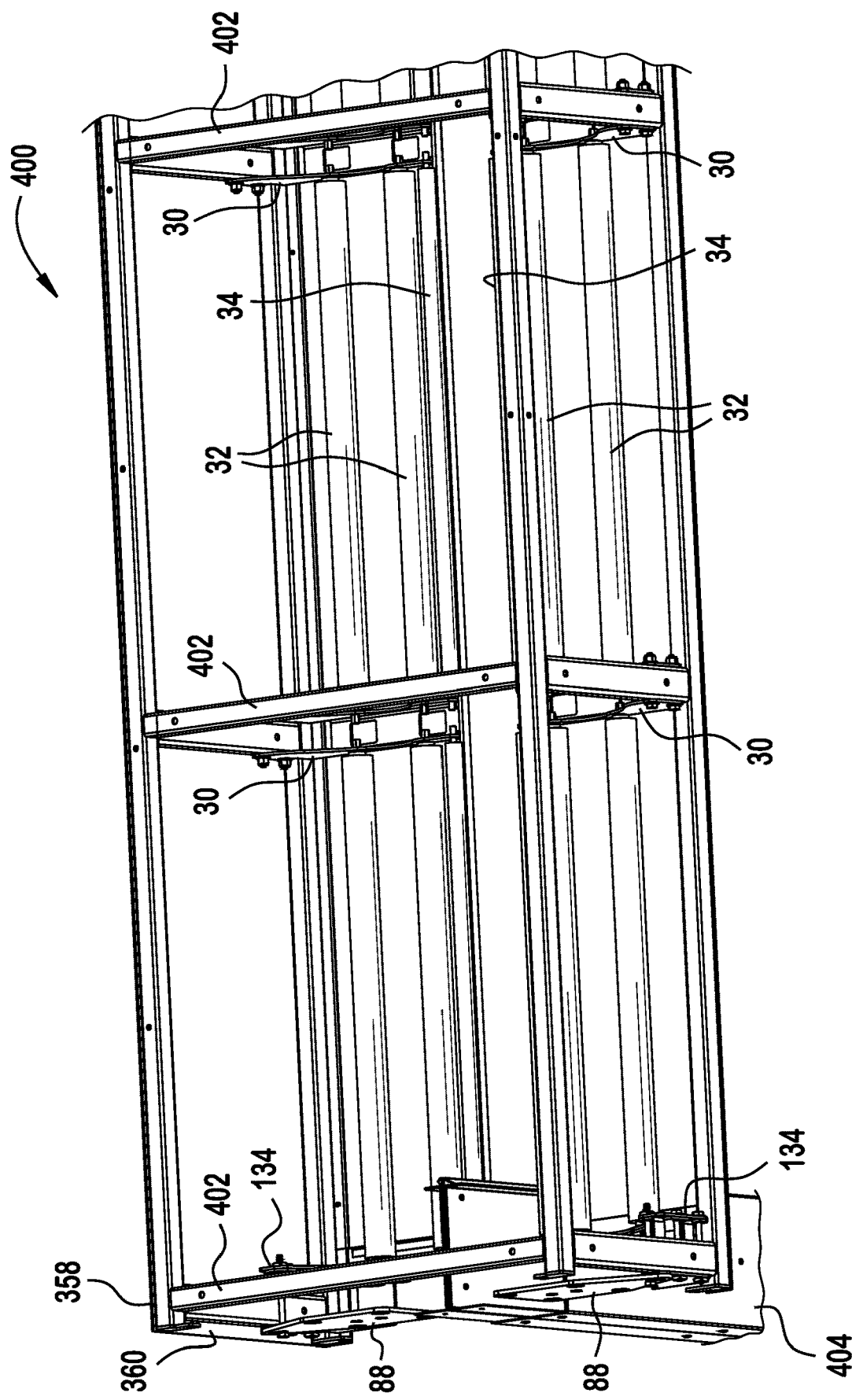
FIG. 65 is a perspective view of components of the modular wall system of FIG. 64, without a tube assembly and flexible barrier material.
Figure 66:
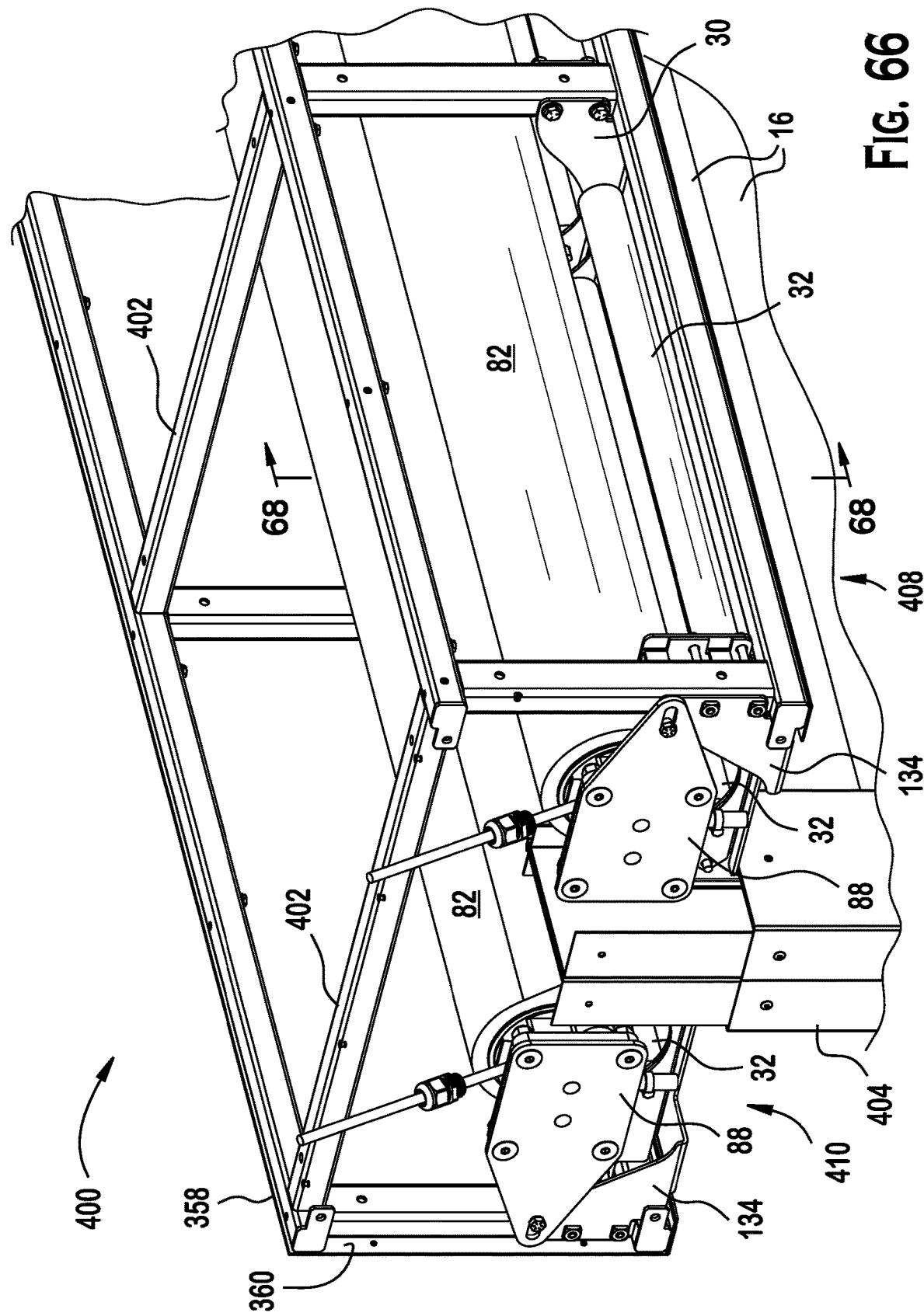
FIG. 66 is a perspective view of components of the modular wall system of FIG. 64, with a pair of tube assemblies.
Figure 67:
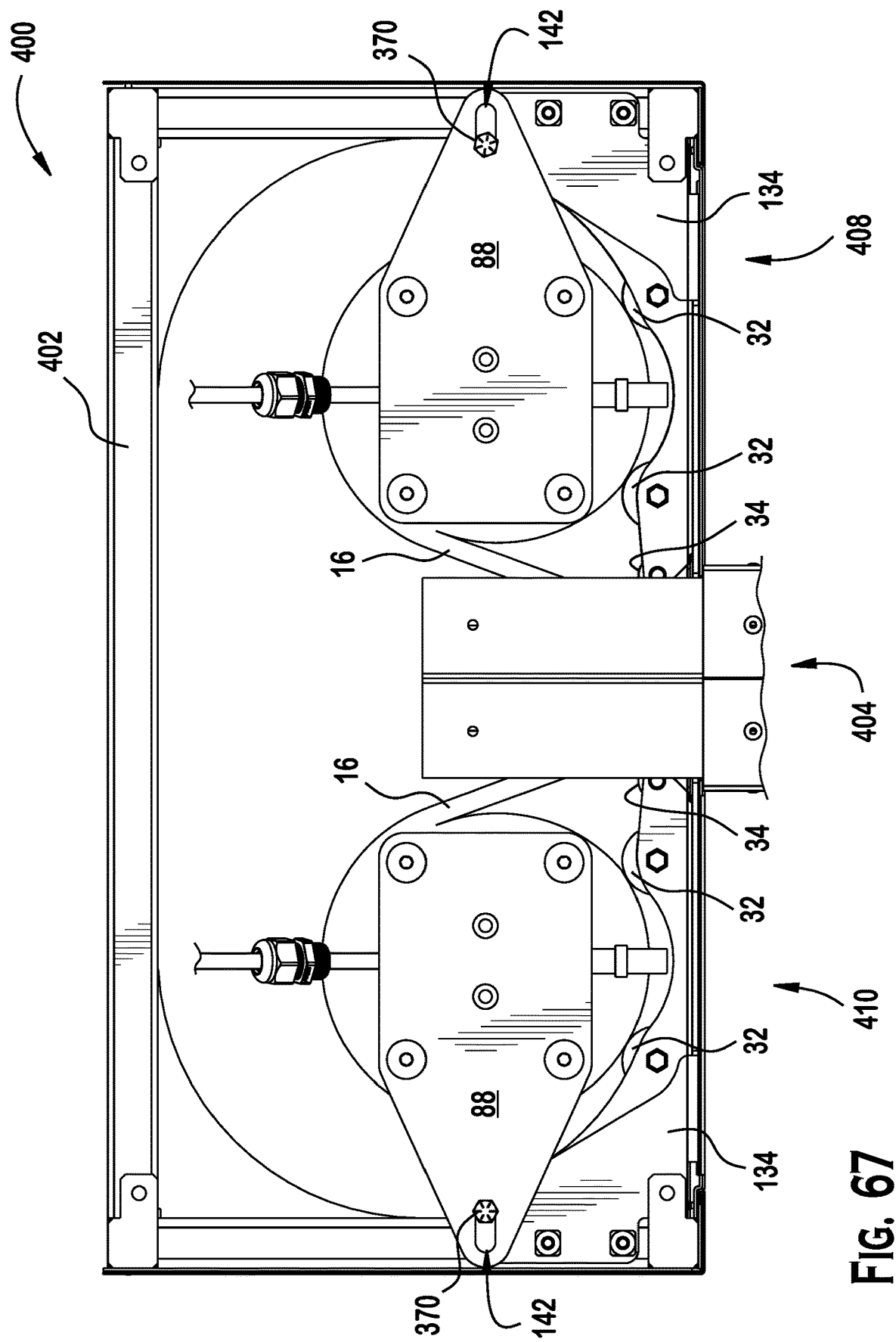
FIG. 67 is a side view of components of the modular wall system of FIG. 64, with a pair of tube assemblies and flexible barrier material.
Figure 68:
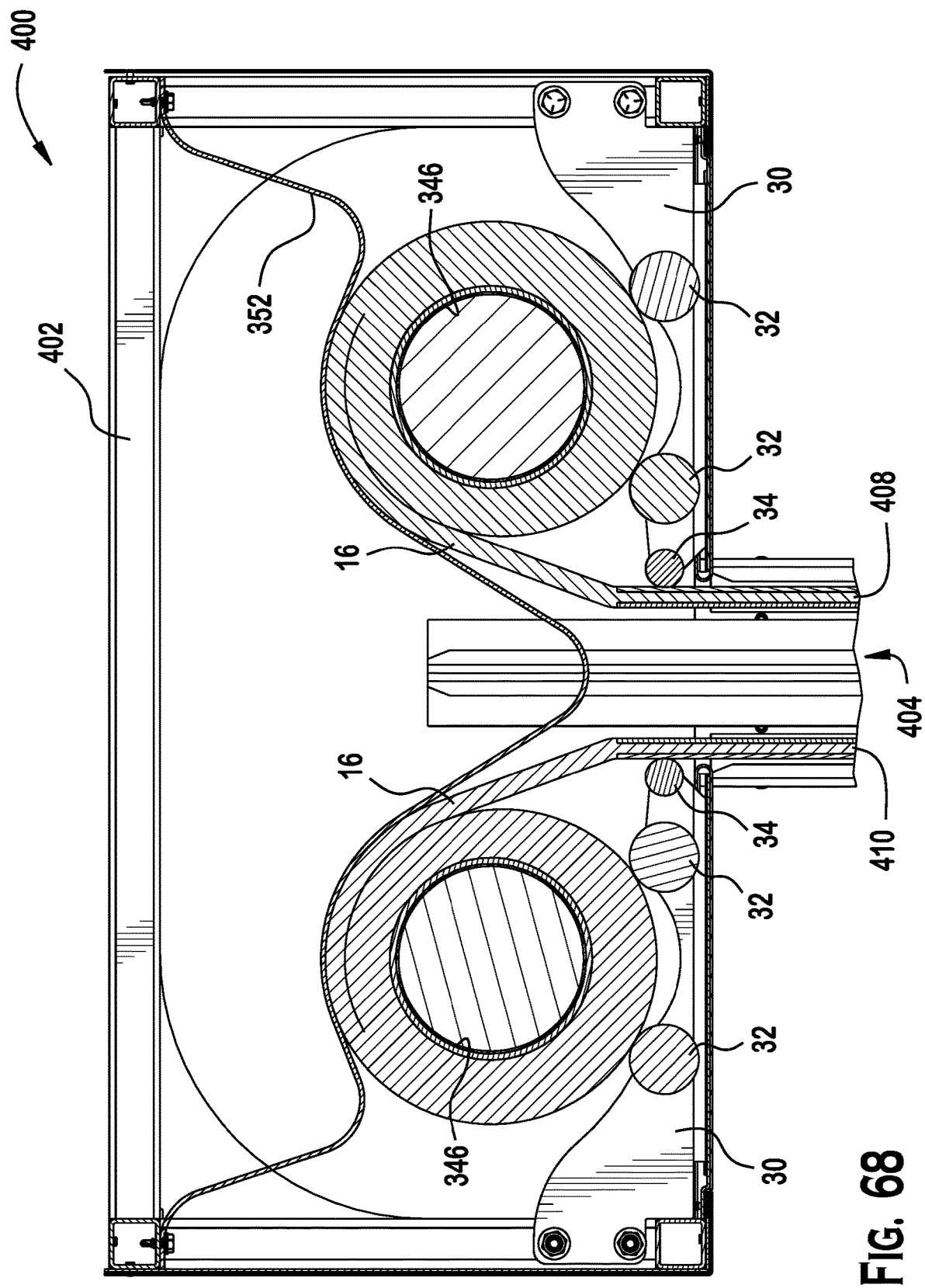
FIG. 68 is a cross-sectional view of components of the modular wall system of FIG. 67.

Referring to FIGS. 64, 65, 66, 67, 68 and 69, a modular wall system 10 may be configured as a double wall system 400. As shown in FIGS. 65, 66 and 67, a wider frame 402 may be constructed such that the wide motor support brackets 134 are located on the same side of the wider frame. In this embodiment, the vertical side posts 404, 406 may include abutting tracks (see e.g., FIG. 69). Referring to FIG. 68 and FIG. 69, in this configuration the distance separating the flexible barrier material 16 of one roll-up wall 408 and the flexible barrier material 16 of the other roll up wall 410 may be approximately 3 inches. The acoustical isolation provided by this double wall configuration in which the flexible barrier material panel 318 is constructed from a core 330 of 1.5 pound per linear foot mass loaded vinyl may be rated approximately 46 STC (Sound Transmission Class).

By contrast, in another embodiment (not shown) the modular wall system may be configured as a double wall system in which a wider frame 402 houses the motor brackets that are located on opposite sides of the frame. In this embodiment, the distance separating the flexible barrier material of one modular wall system and the flexible barrier material of the other modular wall system may be approximately 12 inches. Accordingly, the vertical side posts on the same side of the frame may be spaced from each other. The acoustical isolation provided by such a double wall configuration in which the flexible barrier material panel 318 is constructed from a core 330 of 2.0 pound per linear foot mass loaded vinyl may be rated approximately 53 STC.

In use, a structural opening may be evaluated for receiving a modular wall system in accordance with the present disclosure. The length and height of the structural opening may be measured. Although the embodiments of the modular components disclosed herein may be appropriate for structural openings having a length of approximately 40 ft or less and a height of approximately 14 ft or less, other embodiments of a modular roll-up wall systems in accordance with the present disclosure may be appropriate for structural openings having greater dimensions. Based on the length of the structural opening a frame is assembled. The frame may be assembled by connecting a center frame to a motor frame. Successive center frame components may be added to the motor frame until the desired length is exceeded. The last center frame may be cut to length such that the overall frame is the desired length. The motor support arm and front and rear end supports may then be secured to their respective ends of the frame. Support arms may then be installed approximately every 24 inches, along with the respective 1.375-inch rollers and 0.75 inch rollers. Independently, a tube may be constructed by joining a center tube to the motor tube with a tube coupling. Successive center tube components may be added to the moto tube until the desired length is exceeded. The last center tube may be cut to length such that the overall tube is the desired length. A tube motor having appropriate torque for the application may be installed in the tube. An anti-rotation arm may then be secured to the motor plate with screws. The tube may be placed in the frame between the 1.375-inch rollers such that the side having the tube motor is proximate the motor support arm. The anti-rotation may be secured to the motor support bracket. The components may be enclosed in a wood crate and shipped to the installation site. Segments of flexible barrier material may be prepared. Each segment may be wrapped in packaging paper, marked with identifying indicia, and shrink-wrapped for shipment. The remaining components may be chosen from a pick list and placed into another shipping container for transport to the installation site. At the installation site, the frame may be secured to a structural portion of the building above the structural opening that is to receive the wall system. Electrical power for motor operation and control may be connected to the motor. A strong lightweight banner may then be feed on the tube. The top panel may be zippered to the banner and then wound up onto the tube. Successive panels may be connected and wound up onto the tube in this manner. The bottom edge of the last segment may include two weight bars on opposite sides of the flexible barrier material. The bottom edge of the last segment may be received within the upward facing channel of successive self-adjusting lateral tracks. The motor may be operable from a remote control, wall switch, computer application or phone app to raise or lower the flexible barrier material. In the lowered configuration, the flexible barrier material may form a wall (or barrier) adjacent to the frame within the structural opening Generally, the disclosed embodiment of a modular wall systems may possess a length (e.g., a distance measured along the longitudinal axis of the frame) of approximately 40 feet or less and a height of approximately 14 feet or less. A modular wall system having a single flexible barrier material wall may achieve a Sound Transmission Class rating of 31 STC under testing conducted in accordance with ASTM E 90-09. The single flexible barrier material wall may be constructed with a one and one-half pound per square foot sheet of mass loaded vinyl. Also, a modular wall system having two of these flexible barrier material walls with an air gap of approximately 3 inches may achieve a Sound Transmission Class rating of 46 STC under testing conducted in accordance with ASTM E 90-09. Further still, a modular wall system having two flexible barrier material walls with an air gap of approximately 12 inches may achieve a Sound Transmission Class rating of 53 STC under testing conducted in accordance with ASTM E 90-09. The flexible barrier material walls in this application may be constructed with a two pound per square foot sheet of mass loaded vinyl.

While it has been illustrated and described what at present are considered to be embodiments of the present invention, it will be understood by those skilled in the art that various changes and modifications may be made, and equivalents may be substituted for elements thereof without departing from the true scope of the invention. For example, the modular components such as the frame may be designed and constructed for larger spans. Additionally, features and/or elements from any embodiment may be used singly or in combination with other embodiments. Therefore, it is intended that this invention not be limited to the particular embodiments disclosed herein, but that it have the full scope defined by the language of the following claims, and equivalents thereof.

What is claimed is:

1. A roll-up wall system comprising:
   a frame having a longitudinal axis, the frame comprises
      a first end,
      a second end spaced from the first end along the longitudinal axis,
      a first support arm adjacent the first end,
      a second support arm located between the first support arm and the second end;
   a first roller disposed in the frame, the first roller being supported by the first support arm and the second support arm;
   a second roller disposed in the frame, the second roller being spaced from the first roller along a first axis that is perpendicular to the longitudinal axis, the second roller being supported by the first support arm and the second support arm, the second roller being parallel to the first roller, and the second roller and the first roller being substantially the same;
   a tube disposed in the frame, the tube being spaced from the first roller and the second roller along a second axis, the second axis being perpendicular to the longitudinal axis and the first axis;
   a plate which comprises
      a proximal end surface,
      a distal end surface spaced from the proximal end surface,
      a first side surface, the first side surface facing the tube,
      a second side surface spaced from the first side surface, and
      an elongated opening extending from the first side surface to the second side surface, the elongated opening comprising
         a proximal end located adjacent to the proximal end surface, and
         a distal end located between the proximal end and the distal end surface,
   a fastener arranged through the elongated opening and secured to the first support arm; and
   a screen connected to the tube and supported by the first roller and the second roller, the screen being movable between a first configuration and a second configuration such that in the first configuration the screen is rolled onto the tube, and the tube is spaced a first distance from the first roller along the second axis, and the proximal end is positioned a first length from a first plane, the first plane being parallel to the first axis and the longitudinal axis, and in the second configuration the screen forms a barrier adjacent the frame, the tube is spaced a second distance from the first roller along the second axis, and the proximal end is positioned a second length from the first plane, the second distance being less than the first distance, and the second length being greater than the first length.

2. The roll-up wall system of claim 1, further comprising a tube motor disposed inside the tube.

3. The roll-up wall system of claim 2, wherein the tube motor is a 120 N-m tube motor.

4. The roll-up wall system of claim 2, wherein the tube motor is a 300 N-m tube motor.

5. The roll-up wall system of claim 1, further comprising a plurality of support arms disposed between the second support arm and the second end of the frame.

6. The roll-up wall system of claim 5, wherein each of the plurality of support arms are spaced approximately 24 inches on center.

7. The roll-up wall system of claim 1, wherein the screen comprises mass loaded vinyl.

8. The roll-up wall system of claim 1, wherein the screen comprises a mass loaded vinyl core and a felt overlay.

9. The roll-up wall system of claim 8, wherein the screen further comprises a vinyl fabric that is capable of receiving a print design.

10. The roll-up wall system of claim 8, wherein the screen comprises an upper panel and a lower panel, the upper panel and lower panel being connected by a zipper chain.

11. The roll-up wall system of claim 1, further comprising a second roller system adjacent to the tube.

12. The roll-up wall system of claim 11, further comprising a second screen connected to the second roller system, the second screen comprising a mass loaded vinyl core and a felt overlay.

13. The roll-up wall system of claim 12, wherein the first screen and the second screen provide an acoustic barrier with a Sound Transmission Class rating of 53 STC.

14. The roll-up wall system of claim 1, wherein the frame has a length aligned with the longitudinal axis.

15. The roll-up wall system of claim 14, wherein the length of the frame ranges from approximately 10 to approximately 20 feet.

16. The roll-up wall system of claim 14, wherein the length of the frame ranges from approximately 15 to approximately 30 feet.

17. The roll-up wall system of claim 14, wherein the length of the frame ranges from approximately 35 feet to approximately 40 feet.

18. The roll-up wall system of claim 17, wherein the flexible barrier member comprises a length of approximately 40 feet and a height of approximately 14 feet.

19. The roll-up wall system of claim 1, wherein the modular wall system achieves a Sound Transmission Class rating ranging from approximately 31 STC to approximately 53 STC.

20. The roll-up wall system of claim 1, wherein the plate further comprises a plurality of fastener receiving holes extending from the first side to the second side for securing a tube motor.

21. The roll-up wall system of claim 20, wherein the plurality of fastener receiving holes comprise a plurality of bolt patterns.

22. The roll-up wall system of claim 1, further comprising a motor, the motor being secured to the tube.

23. The roll-up wall system of claim 22, wherein the plate is secured to the motor such that the plate forms an anti-rotation arm.

* * * * *